US007880865B2

(12) United States Patent
Tanaka et al.

(10) Patent No.: US 7,880,865 B2
(45) Date of Patent: Feb. 1, 2011

(54) LASER RADAR APPARATUS FOR THREE-DIMENSIONAL DETECTION OF OBJECTS

(75) Inventors: Hideyuki Tanaka, Toyoake (JP); Masanori Okada, Kariya (JP); Koji Konosu, Kariya (JP); Tadao Nojiri, Oobu (JP); Kunihiko Ito, Chiryu (JP); Hiroaki Mizukoshi, Kitanagoya (JP); Kenichi Yoshida, Nagoya (JP)

(73) Assignee: DENSO WAVE INCORPORATED, Tokyo (JP)

( * ) Notice: Subject to any disclaimer, the term of this patent is extended or adjusted under 35 U.S.C. 154(b) by 348 days.

(21) Appl. No.: 12/071,844

(22) Filed: Feb. 28, 2008

(65) Prior Publication Data

US 2009/0002678 A1 Jan. 1, 2009

(30) Foreign Application Priority Data

| Feb. 28, 2007 | (JP) | ............................. 2007-049970 |
| Sep. 26, 2007 | (JP) | ............................. 2007-248987 |
| Dec. 7, 2007 | (JP) | ............................. 2007-316979 |

(51) Int. Cl.
*G01C 3/08* (2006.01)

(52) U.S. Cl. ....................... 356/4.01; 356/4.1; 356/5.01; 356/5.15

(58) Field of Classification Search ........... 356/3.01–28
See application file for complete search history.

(56) References Cited

U.S. PATENT DOCUMENTS

| 4,161,652 | A |   | 7/1979  | Moreau et al.            |
| 4,302,709 | A |   | 11/1981 | Tichtinsky               |
| 5,388,115 | A | * | 2/1995  | Kawashima et al. .......... 372/24 |
| 5,546,188 | A |   | 8/1996  | Wangler et al.           |
| 5,689,328 | A |   | 11/1997 | Katayama                 |
| 5,724,123 | A | * | 3/1998  | Tanaka ...................... 356/5.01 |
| 5,790,327 | A |   | 8/1998  | Lee et al.               |
| 5,991,083 | A |   | 11/1999 | Shirochi                 |

(Continued)

FOREIGN PATENT DOCUMENTS

EP          0 471 291          2/1992

(Continued)

OTHER PUBLICATIONS

Office Action dated Jul. 18, 2008 in corresponding European patent application No. 08152043.9-2220.

(Continued)

*Primary Examiner*—Thomas H Tarcza
*Assistant Examiner*—Luke D Ratcliffe
(74) *Attorney, Agent, or Firm*—Posz Law Group, PLC

(57) ABSTRACT

In a laser radar apparatus, a laser beam generator that generates a laser beam and an optical detector that detects reflected light that has been reflected by an object in a field to be observed. A deflection performing means, provided with one or more deflection means each rotatable on a given central axis thereof, for enabling the deflection means to deflect the laser beam to the field and to deflect the reflected light toward the optical detector. A drive means driven to rotate the deflection means. A direction changing means changes a direction of the laser beam from the deflection means is changed in a direction of the central axis. A control means controls an operation of the direction changing means.

43 Claims, 35 Drawing Sheets

U.S. PATENT DOCUMENTS

| | | | |
|---|---|---|---|
| 6,366,335 B1 | 4/2002 | Hikmet et al. | |
| 2003/0141466 A1* | 7/2003 | Ohtomo et al. | 250/559.38 |
| 2004/0012771 A1* | 1/2004 | Ehbets | 356/4.01 |
| 2007/0076193 A1* | 4/2007 | Flannigan et al. | 356/155 |

FOREIGN PATENT DOCUMENTS

| | | | |
|---|---|---|---|
| EP | 0645644 | * | 8/1994 |
| EP | 0 645 644 | | 3/1995 |
| EP | 1130416 | | 9/2001 |
| JP | A-H03-175390 | | 7/1991 |
| WO | WO 96/32662 | | 10/1996 |

OTHER PUBLICATIONS

Office Action dated Jun. 12, 2009 from the European Patent Office in the corresponding EP Application No. 08152043.9-2220.

* cited by examiner

LASER RADAR APPARATUS FOR THREE-DIMENSIONAL DETECTION OF OBJECTS

CROSS REFERENCE TO RELATED APPLICATION

The present application relates to and incorporates by reference Japanese Patent application Nos. 2007-49970 filed on Feb. 28, 2007, 2007-248987 filed on Sep. 26, 2007, and 2007-316979 filed on Dec. 7, 2007.

BACKGROUND OF THE INVENTION

1. Field of the Invention

The present invention relates to a laser radar apparatus, and in particular, to a laser radar apparatus that uses a laser beam to detect the distance and direction of an object to be detected.

2. Description of the Related Art

A conventional laser radar apparatus is disclosed by Japanese Patent Publication No. 2789741. The apparatus disclosed by this publication is provided with a laser beam generator, a detector, and an optical isolator through which the laser beam is transmitted. The laser beam generator generates a laser beam and the optical isolator is located on the optical axis of the laser beam from the generator to reflect a reflected light toward the detector that detects reflected light from an object to be detected. In addition, a concave mirror is located on the optical axis of the laser beam such that the concave mirror rotates on its central axis along the optical axis direction of the laser beam. This concave mirror reflects not only the incident laser beam into the air but also the reflected light from the object to be detected toward the isolator, so that horizontal scanning can be performed over 360 degrees.

However, in the case of the technique according to the above publication, the 360-degree horizontal scanning, which is performed by rotating the concave mirror, is confronted with a drawback. As described, the horizontal scanning over 360 degrees makes it possible to detect the whole surrounding of the apparatus by scanning the whole angular detection range (scanning range on the laser beam). However, there is a problem that the detection range is limited to a planer range. Specifically, the laser beam that has been reflected specially from the concave mirror is obliged to scan a given planar (scanned planar), resulting in that regions which are outside the scanned planar cannot be scanned. That is, if objects are shifted from the scanned planar, the objects cannot be detected. In addition, even when the objects exist in the scanned planar, it is impossible to grasp the presence of the objects in the three-dimensional manner.

SUMMARY OF THE INVENTION

The present invention has been made in consideration of the foregoing situations, and it is an object of the present invention to provide the laser radar apparatus that has the capability of three-dimensionally scanning the surrounding field outside the apparatus to detect objects in the field.

In order to achieve the above objects, as one aspect of the present invention, there is provided a laser radar apparatus comprising: a laser beam generator that generates a laser beam; an optical detector that detects reflected light that has been reflected by an object in a field to be observed; a deflection performing means, provided with one or more deflection means each rotatable on a given central axis thereof, for enabling the deflection means to deflect the laser beam to the field and to deflect the reflected light toward the optical detector; a drive means that driven to rotate the deflection means; a direction changing means that changes a direction of the laser beam from the deflection means is changed in a direction of the central axis; and a control means that controls an operation of the direction changing means.

It is preferred that the direction changing means consists of a light deflection means adapted to deflect the laser beam from the laser beam generator toward the deflection means and configured to be swingable (i.e., configured to be able to swing), and the control means consists of a swing control means that controls a swing action of the light deflection means.

As another mode of the present invention, there is provided a laser radar apparatus comprising: a laser beam generator that generates a laser beam; an optical detector that detects reflected light that has been reflected by an object in a field to be observed; a deflection performing means, provided with a deflection means each rotatable on a given central axis thereof, for enabling the deflection means to deflect the laser beam to the field and to deflect the reflected light toward the optical detector; a drive means that rotates and drives the deflection means; wherein the deflection means comprise a plurality of reflection layers laminated one on another at an incident position of the laser beam and produced to reflect the laser beam at different directions, wherein, of the reflection layers, reflection layers other than a lowest reflection layer performs reflection and transmission of the laser beam, a laser beam selecting means that selects only a one laser beam from laser beams reflected by the plurality of reflection layers, the selected one laser beam being emitted into the field for detection of the object, and a control means that controls a selection carried out by the laser beam selecting means so that the selected laser beam is scanned in a direction of the central axis.

It is preferred that the reflection layers other than the lowest reflection layer are formed as half-silvered mirrors.

It is also preferred that the laser beam selecting means comprises a pair of annular light-shielding members arranged around the deflection means to be located along the direction of the central axis with a given space apart from each other so as to produce a slit therebetween, and a displacement means that displaces the pair of annular light-shielding members together, wherein the control means includes means for controlling a displacement to be carried out by the displacement means.

DETAILED DESCRIPTION OF THE PREFERRED EMBODIMENTS

Hereinafter, referring to the accompanying drawings, preferred embodiments of the present invention will now be described.

First Embodiment

Figure 1:
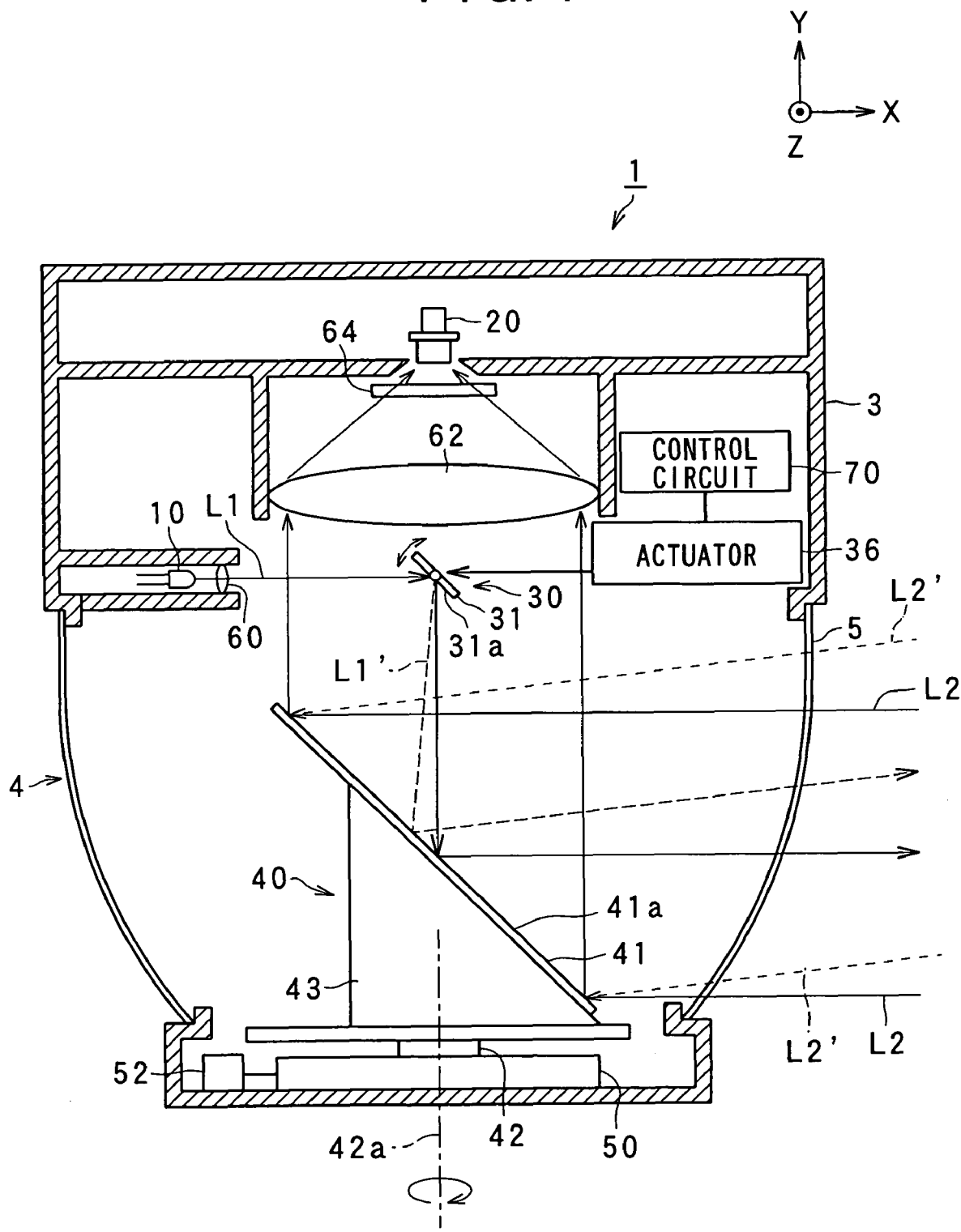
FIG. 1 is a schematic diagram outlining the configuration of a laser radar apparatus according to a first embodiment of the present invention.
Figure 2:
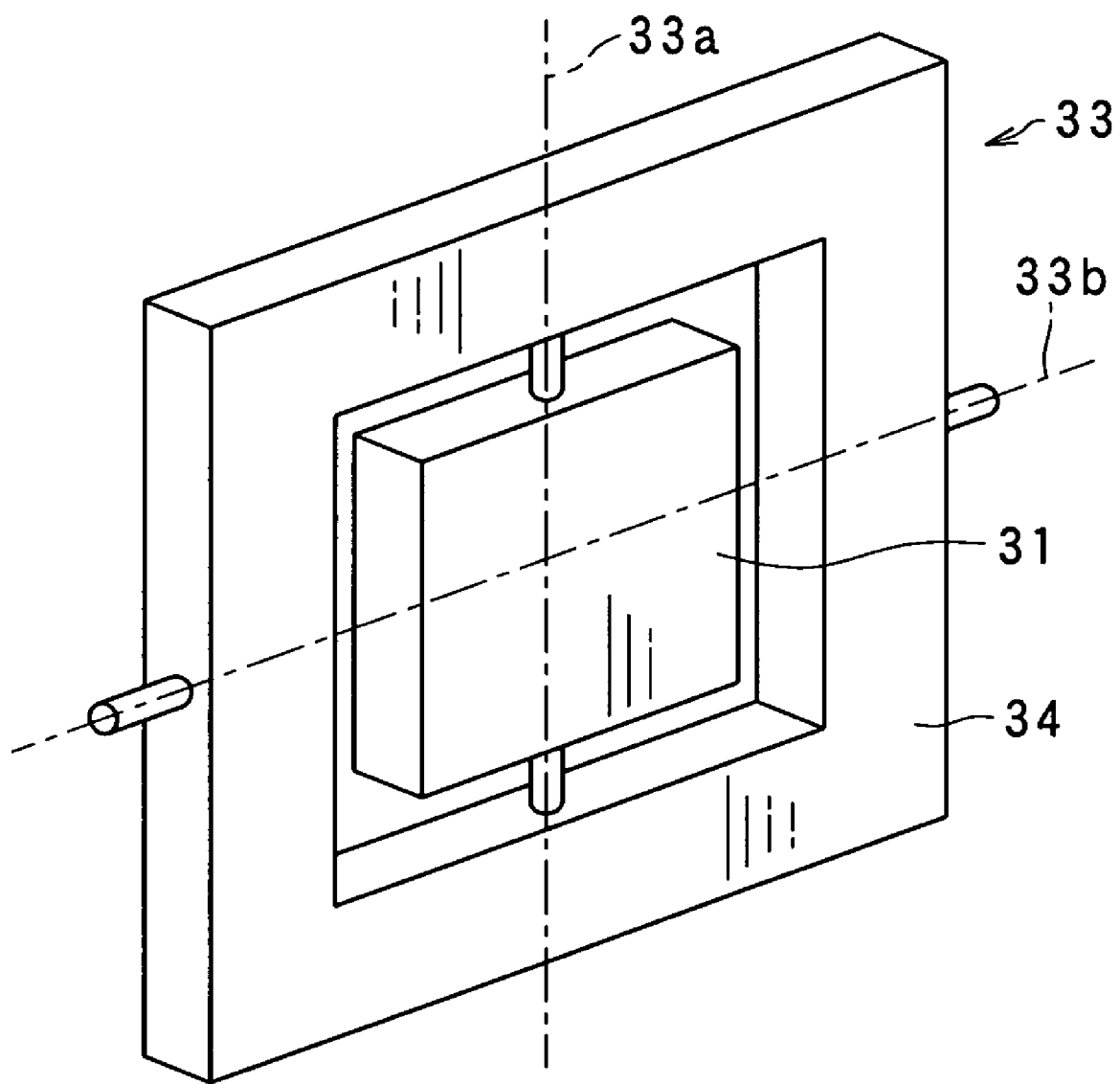
FIG. 2 is a perspective view showing a displacement mechanism used in the first embodiment.

Referring to FIGS. 1 and 2, a laser radar apparatus 1 according to a first embodiment of the present invention will now be described.

FIG. 1 outlines the configuration of the laser radar apparatus 1 according to the first embodiment.

As shown in FIG. 1, the laser radar apparatus 1 is provided with a casing 3 and is configured to detect the distance from the object and the direction of the object. In the casing 3, there are provided a laser diode 10 and a photodiode 20 receiving reflected light L2 from an object to be detected. The laser diode 10 serves as one example of the laser beam generator and is configured to emit a pulsed laser beam L1 in response to a pulsed current supplied from a not-shown drive circuit. The photodiode 20 serves as one example of the optical detector and is configured to detect the reflected light L2 of the laser beam L1, which is reflected by the objects to be detected, and convert the reflected light L2 into an electric signal. The reflected light L2 from the object is composed of light taken from a predetermined angular range. In the example shown in FIG. 1, the laser beam L1 is emitted to pass along a path shown by the solid lines, so that the light taken between two lines L2 composes the reflected light.

As shown in FIG. 1, a lens 60 is arranged at a position on the optical axis of the laser beam L1. This lens 60 is composed of a collimation lens and converts the laser beam L1 from the laser diode 10 into a collimated light.

On the optical path of the laser beam L1 from the lens 60, a swing mirror 31 is arranged which serves as the light deflection means. This swing mirror 31, which corresponds to one example of the direction changing means, is configured to be swingable and to deflect the laser beam L1 from the laser diode 10 toward a rotating deflection mechanism 40. This swing mirror 31 changes the incident angle of the laser beam to a deflection member 41, so that the direction of the laser beam from the deflection member 41 can be changed in the direction of a central axis 42a.

The swing mirror 31 is driven by a mirror driver based on multiple degrees of freedom. This kind of drive technique is known and can be achieved by using for example a galvanomirror, so that a detailed explanation for this technique is omitted here, but an outlined explanation is as follows. The mirror driver can be realized by employing a configuration where the swing mirror 31 is supported by for example a gimbal or a pivot bearing so as to allow the swing mirror 31 to rotate.

FIG. 2 exemplifies the swing mirror 31, in which a displacement mechanism 33 for displacing the swing mirror 31 is shown. The displacement mechanism 33 is provided with a frame (not shown) arranged at a given location in the casing 3 and a mirror support frame 34 rotatably supported on this frame. The swing mirror 31 is supported by the mirror support frame 34 in such a manner that the swing mirror 31 is able to rotate on each of two directions consisting of a first axis 33a and a second axis 33b perpendicular to the first axis 33a. The swing mirror 31 has a reflection surface 31a. The support shown in FIG. 2 allows the reflection surface 31a of the swing mirror 31 to be controlled in terms of its three-dimensional position.

As shown in FIG. 1, the directional relationships are defined such that the emitting direction of the laser beam L1 from the laser diode 10 is assigned to an X-axis direction, the direction of the central axis 42a of the rotating deflection mechanism 40 to a Y-axis direction, and a direction perpendicular to both the X- and Y-axis directions to a Z-axis. Under this directional definition, an angle made between the reflection surface 31a and the XY plane is set to $\alpha$, an angle made between the reflection surface 31a and the YZ plane is set to $\beta$, and an angle made between the reflection surface 31a and the XZ plane is set to $\gamma$. The angles $\alpha$, $\beta$ and $\gamma$ can thus be decided freely by making a control circuit 70 control an actuator 36.

The displacement mechanism 33 is configured to be driven by the actuator 36, as outlined in FIG. 1. The actuator 36 includes a first actuator and a second actuator. The first actuator is for example a motor that controls the mirror support frame 34 to a specified portion relative to the apparatus body. The second actuator is for example another motor to control a relative poison of the swing mirror 31 to the mirror support frame. The actuator 36 is able to respond to control from the control circuit 70. That is, in response to control signals from the control circuit 70, the first actuator sets the position of the mirror support frame 34 and the second actuator sets the position of the swing mirror 31 relatively to the mirror support frame 34, with the result that the tilt angle of the swing mirror 31 relative to the laser beam L1 can be decided. The control circuit 70 includes a microcomputer equipped with a CPU (central processing unit) and functions as the control means.

On the optical axis of the laser beam L1 reflected by the swing mirror 31, the rotating deflection mechanism 40 is arranged which shows one example of the rotation/deflection means. This rotating deflection mechanism 40 is provided with the deflection member 41 consisting of a mirror having a flat reflection surface 41a, a support base 43 supporting the deflection member 41, an axial member 42 connected to the support base 43, and a not-shown bearing rotatably supporting the axial member 42. The deflection member 41 deflects not only the laser beam to the space but also the reflected light toward the photodiode 20. This deflection member 41, which consists of part of the rotating deflection mechanism 40, is rotatable on the central axis 42a and functions as the deflection means.

In the present laser radar apparatus 1, a deflection range provided by the deflection member 41 so as to deflect the reflected light, i.e., the area of the reflection surface 41a, is made to be larger than a deflection range given by the swing mirror 31 so as to deflect the laser beam, i.e., the area of the reflection surface 31a of the swing mirror 31.

Furthermore, to rotate the rotating deflection mechanism 40, a motor 50 is provided which functions as the drive means. The motor 50 is driven to rotate the axial member 42, resulting in the rotation of the deflection member 41 connected to the axial member 42. In this embodiment, the motor 50 is a stepping motor. Various types of stepping motors are available, in which the smaller the angle per step, the finer the angle control. As the motor 50, drive means other than the stepping motor may be adopted. By way of example, a servo motor or a motor that rotates continuously may be employed. In the continuous-rotating motor, a pulsed laser beam is outputted in synchronization with the time when the deflection member 41 is orientated in a direction to be measured in its distance, whereby the detection is performed in a desired direction.

In the present embodiment, as shown in FIG. 1, there is provided an angular sensor 52 to detect the angular position of the axial member 42 of the motor 50 (i.e., the angular position of the deflection member 41). Any type of angle detecting means, such as a rotary encoder, may be usable, provided that the angular position of the axial member 42 is detected. In addition, the type of the motor 50 may also be limited to special ones.

On the optical path of the reflected light from the rotating deflection mechanism 40 to the photodiode 20, a collecting lens 62 to collect the reflected light and direct it to the photodiode 20 is located. Further, between the collecting lens 62 and the photodiode 20, a filter 64 is located. The collecting lens 62 functions as the light collecting means. The filter 64 is located at a given position on the optical path between the rotating deflection mechanism 40 in order to make the reflected light transmit the filter 64, but to remove light other than the reflection light. The filter 64 thus functions as the light selecting means. To be specific, the filter 64 is composed by a wavelength selecting filter that makes it possible that only light having wavelengths belonging to a specific wavelength range which corresponds to the reflected light L2 is allowed to pass through this filter.

In the present embodiment, the casing 3 accommodates therein the laser diode 10, photodiode 20, light deflection member 30, lens 60, rotating deflection mechanism 40, motor 50 and others, with such components protected from dust and shocks. Around the deflection member 41 in the casing 3, as part of the casing 3, a light-passing portion 4 is arranged to enclose the deflection member 41, but makes it possible to pass the laser beam L1 and the reflected light L2. The light-passing portion 4 is formed into an annular shape. Thus this portion 4 covers a light transmission/reception view over an approximately 360 degrees. This light-passing portion 4 is sectioned by a light transmission plate 5 made of glass for example, which is oblique, over its circumstance, to a plane perpendicular to the light axis of the laser beam L1 entering the deflection member 41. That is, the laser beam L1 deflected from the deflection member 41 always crosses the plate 5 at an oblique angle. Hence, thanks to this oblique crossing configuration, the light L1 reflected from the light transmission plate 5 has a good resistance against optical noise components.

The present laser radar apparatus 1 will now be described from its operations.

When the pulsed current is supplied to the laser diode 10, the laser diode 10 emits pulsed laser light whose duration agrees with the pulse width of the pulse current. This laser light is emitted as diffusion light with a certain level of spread angle, and converted into parallel light (i.e., laser beam L1) by passing the lens 60. The produced laser beam L1 is then reflected by the swing mirror 31 placed at the light deflection member 30 to enter the deflection member 41, before being reflected by the deflection member 41 to be radiated to the space.

The laser beam L1, which has been reflected by the deflection member 41, is then reflected by an object to be detected, if those objects exist. Part of the reflected light becomes reflected light L2 returns to enter the deflection member 41.

Thus the reflected light L2 reflects from the deflection member 41 toward the photodiode 20. This reflected light L2 is then collected by the collecting lens 62 and is made to enter the photodiode 20 via the filter 64.

The photodiode 20 responds to the light reception by outputting an electric signal whose voltage corresponds to the received reflected light L2, for instance. Hence, measurement of a time interval starting from the output of the laser beam L1 from the laser diode 10 to the detection of the reflected light L2 by the photodiode 20 provides a distance from the apparatus to each object. Additionally, the combination between the displacements of the swing mirror 31 and the displacement of the deflection member 41 makes it possible to calculate the direction of each object. In other words, when the angle α between the reflection plane 31a of the swing mirror 31 and the XY plane, the angle β between the reflection plane 31a and the YZ plane, and the angle γ between the reflection plane 31a and the XZ plane are known and the rotating angular position of the deflection member 41 is known, it is possible to uniquely decide the direction of the light beam L1 emitting from the deflection member 41, whereby the direction of each object can be calculated.

When the swing mirror 31 is made to be displaced in a controlled manner, the optical path of the laser beam changes as follows.

FIG. 1 exemplifies the rotating deflection mechanism 40 which is rotated until a given angle on its central axis 42a. In this rotated state, when the swing mirror 31 takes a swing attitude shown in FIG. 1, the laser beam L1 passes a path shown by solid lines, resulting in that the reflection light existing a range spatially sectioned by two solid lines shown by the reference L2. On the other hand, when the swing mirror 31 is swung so as to reflect the laser beam L1 along a dashed line L1', the incident angle of the laser beam L1 to the deflection member 41 is changed from the former incident angle. Thus a displacement in the swinging attitude of the swing mirror 31 results in a change in the reflection angle of the laser beam at the swing mirror 31, as exemplified by the dashed line L1'. This reflection angle change will cause the laser beam deflected by the deflection member 4 to change upward in the XY plane in FIG. 1. In this case, the corresponding reflection light paths are also changed as shown by dashed lines L2'. The reflection light, which has been reflected by the deflection member 41, enters the collecting lens 62 and is subjected to the process at the filter 64 and detection by the photodiode 20, as described.

As described, in the laser radar apparatus 1 according to the present embodiment, the deflection member 41 is rotated on its given central axis 42a in a controlled manner, so that the laser beam L1 to be emitted to the air and the reflected light L2 from an object to the photodiode 20 are deflected throughout the 360 degrees along the XZ plane. In addition to this, the direction of the laser beam L1 from the deflection member 41 is changed by the swing mirror 31 relative to the central axis 42a, that is, each of the planar directions each including the central axis 42a (in FIG. 1, the XY plane). It is therefore possible that, in FIG. 1, the laser beam L1 is scanned (i.e., swung) in the XZ planar direction perpendicular to the central axis 42a as well as the XY planer direction including the central axis 42a. Hence the detection of the objects can be made three-dimensionally.

In the present embodiment, the swing mirror 31 is adopted, so that the laser beam L1 from the deflection member 41 can be scanned along the XY planar direction without a complex configuration.

The deflection area of the deflection member 41, in which the reflection light L2 is deflected, is set to be larger than the deflection area of the swing mirror 31, in which the laser beam L1 is deflected. For this reason, the reflection light can be detected in a wider spatial range, thereby enhancing accuracy in the detection.

Moreover, the collection lens 60 is located on the optical path of the reflection light L2 between the rotating deflection mechanism 40 and the photodiode 20. Hence, without making the photodiode 20 lager in its size, the detection can be performed on the reflection light detected from a wider special range.

The filter 64 is located on the optical path of the reflection light L2 between the rotating deflection mechanism 40 and the photodiode 20. Hence noise components in the reflected light L2 can be removed effectively.

Second Embodiment

Figure 3:
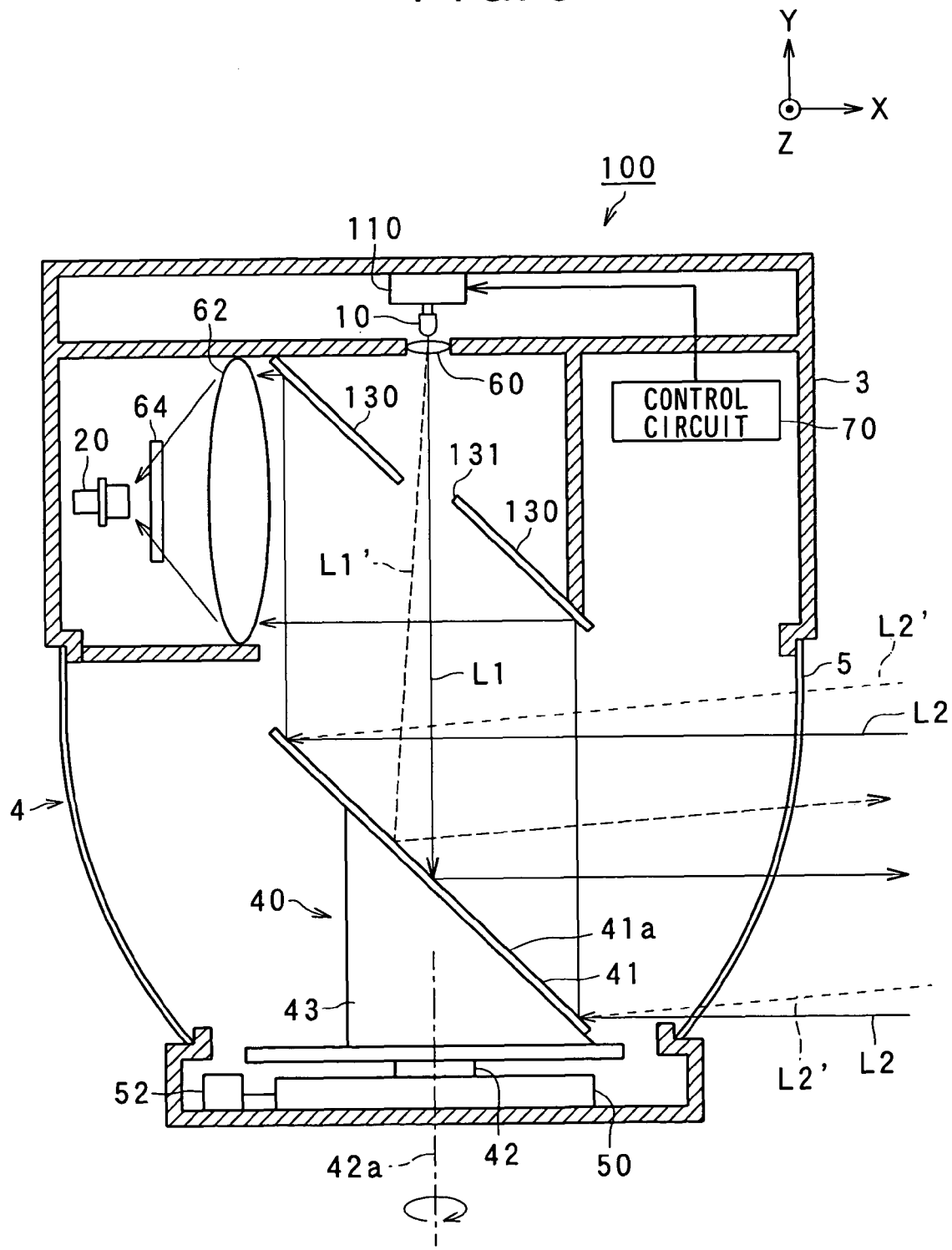
FIG. 3 is a schematic diagram outlining the configuration of a laser radar apparatus according to a second embodiment of the present invention.

Referring to FIG. 3, a laser radar apparatus according to a second embodiment of the present invention will now be described.

In the second embodiment and successive embodiments, the similar or equivalent components to those in the first embodiment will be given the same reference numerals as those explained in the first embodiment for the sake of a simplified explanation.

The second embodiment concerns with a geometrical modification of the laser diode 10 and the photodiode 20.

FIG. 3 shows an outlined configuration of a laser radar apparatus 100 according to the second embodiment, in which, as described later, there is provided a mirror 130. The XYZ orthogonal coordinate system is given to the configuration shown in FIG. 3 such that the X- and Y-axis directions are assigned to the reflecting direction at the mirror 130 (i.e., the light receiving direction at the photodiode 20) and the direction of the central axis 42a of the rotating deflection mechanism 40, respectively.

In the present laser radar apparatus 100, like the first embodiment, there are provided the laser diode 10, the photodiode 20, the deflection member 41 rotatable on its central axis 42a, the rotating deflection mechanism 40 for the deflection of the laser beam L1 and the reflected light L2 in the same way as the foregoing, and the motor 50 to drive the mechanism 40.

The laser radar apparatus 100 is additionally provided with an emitting-direction deflection member 110 to change the emitting direction of the laser beam L1 by displacing the laser diode 10 itself. This emitting-direction deflection member 110 functions as the direction changing means and the emitting-direction changing means. This deflection member 110 actions to change the incident direction of the laser beam L1 to the deflection member 41, so that the laser beam L1 from the deflection member 41 can be scanned in its direction along the planar directions each including the central axis 42a.

The emitting-direction deflection member 110 can be realized by a variety of types of actuators as long as those actuators have the capability of changing the laser diode 10. For instance, oscillating means such as oscillators may be adopted to oscillate the laser diode 10. The laser diode 10 may be mounted in a displacement apparatus (such as the displacement mechanism 33 and the actuator 36, shown in FIG. 2) which is able to displace the laser diode at multiple degrees of freedom, in which the mounting plane is subjected to bidirectional rotation. In this configuration, the control circuit 70 is allowed to control the oscillation means and the displacement apparatus in terms of their amounts to be displaced, so that the control circuit functions as the displacement control means.

In the laser radar apparatus 100 according to the second embodiment, the laser beam (light) L1 emitted from the laser diode 10 in the given direction is converted to the parallel light by the lens 60. After passing the lens 60, the laser beam L1 enters the deflection member 41 without passing any components, and reflected to the air by this member 41. The laser beam L1, which has been reflected by the deflection member 41, is reflected by an object to be detected, before part of the reflected light L2 returns to the deflection member 41. The deflection member 41 reflects the returned reflected light L2 toward the mirrors 130. The reflected light L2 then passes the mirror 130 to reach the photodiode 20.

The mirror 130 is obliquely arranged between the laser diode 10 and the rotating deflection mechanism 40 and has a through-hole 131 to make the laser beam L1 pass therethrough. The opening area given by the through-hole 131 is sufficiently small compared to all the reflection surface of the mirror 130. The reflection light L2 reflected by the deflection member 41 is again reflected by the reflection surface of the mirror 130, which is other than the through-hole 131 toward the photodiode 20. In this configuration, when the emitting direction of the laser diode 10 is changed to allow the laser beam to trace a path shown by the a dashed line L1' for example, the reflection light L2 is controlled to pass along a path shown by a dashed line L2' and enter the photodiode 20.

In the present embodiment, the collecting lens 62 stated in the first embodiment is also located on the optical path of the reflected light L2 between the mirror 130 to the photodiode 20. In addition, the filter 64 stated in the first embodiment is also located on the optical path between the mirror 130 and the photodiode 20.

According to the present embodiment, the laser diode 10 and its associated components make it possible to change the direction of the laser beam L1 from the deflection member 41 in each of the planar directions each including the central axis 42a (In FIG. 3, the XY planar direction).

Third Embodiment

Figure 4:
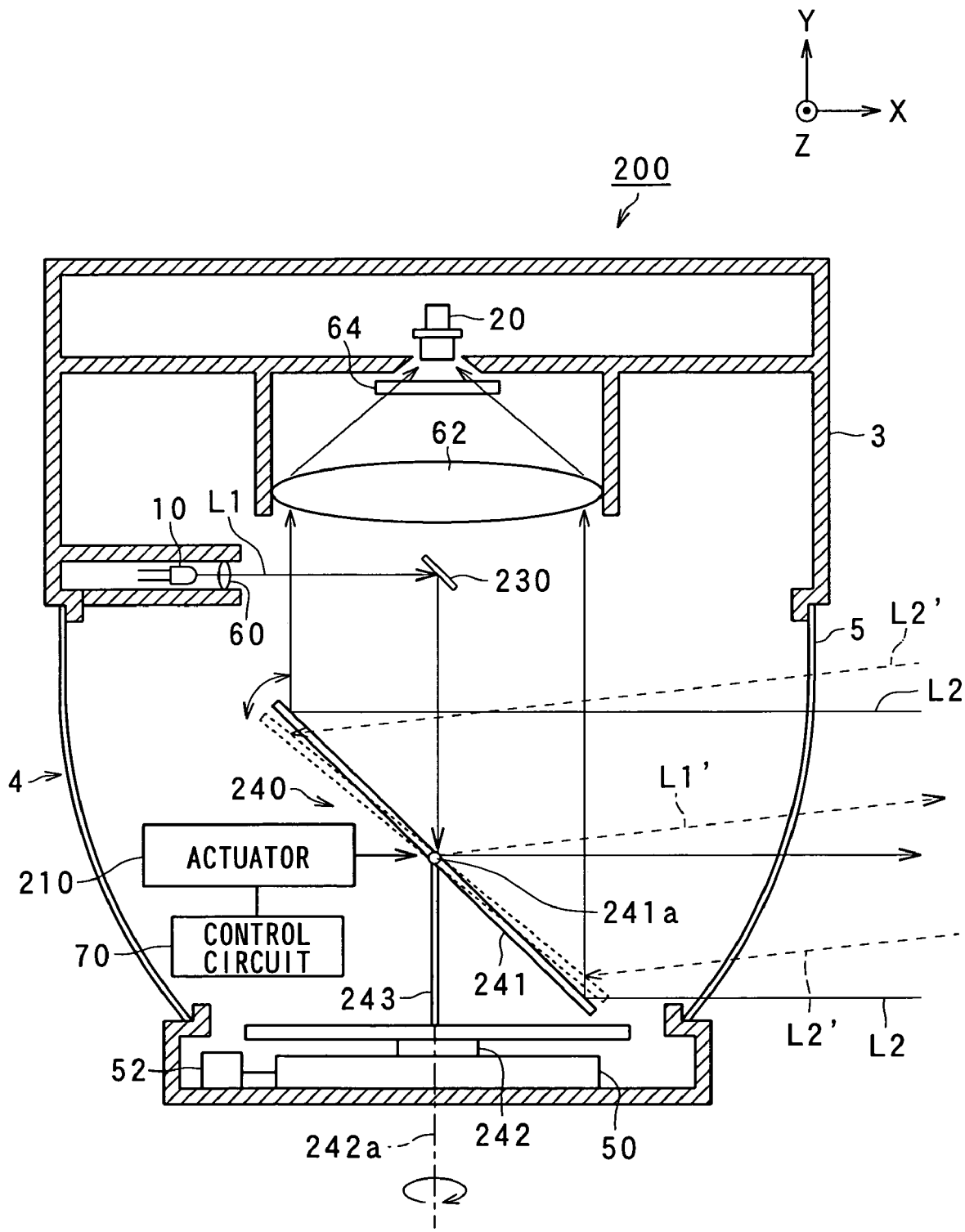
FIG. 4 is a schematic diagram outlining the configuration of a laser radar apparatus according to a third embodiment of the present invention.

Referring to FIG. 4, a laser radar apparatus according to a third embodiment of the present invention will now be described.

The third embodiment concerns with a geometrical modification of the laser diode 10 and the photodiode 20.

FIG. 4 shows an outlined configuration of a laser radar apparatus 200 according to the third embodiment, in which, as described later, there is provided a rotating deflection mechanism 240 having a central axis 242a. The XYZ orthogonal coordinate system is given to the configuration shown in FIG. 4 such that the X- and Y-axis directions are assigned to the emitting direction of the laser beam L1 from the laser diode 10 and the direction of the central axis 242a of the rotating deflection mechanism 240, respectively.

In the present laser radar apparatus 200, like the first embodiment, there are provided the laser diode 10 and the photodiode 20.

The present laser radar apparatus 200 differs from the laser radar apparatus 1 according to the first embodiment in the configuration of the rotating deflection mechanism 240. This mechanism 240 has a deflection member 241 produced as a mirror and rotatable on both the given central axis 242a and a given axis 241a perpendicular to the central axis 242a.

Practically, the rotating deflection mechanism 240 is equipped with a support base 243 including a pillar portion which supports the deflection member 241, a shaft member 242 supporting the support base 243, and an actuator 210 such as a motor. The deflection member 241 is rotatably supported by the support base 243 such that the member 242 is rotatable on the axis 241a along the XZ plane. The actuator 210 is used to drive the rotation angle relative to the support base 243 in a controlled manner. The displacement given by the actuator 210 is controlled by the control circuit 70. The support base 243 is connected to the shaft member 242 driven by the motor 50 stated in the same way as that in the first embodiment.

In the present laser radar apparatus 200, the deflection member 241 provides the function to deflect not only the laser beam L1 to the air but also the reflected light L2 toward the photodiode 20. Further the actuator 210 is able to tilt the whole deflection member 241 about the axis 241a perpendicularly crossing the central axis 242a. This tilt action makes it possible that the incident direction of the laser beam L1 to the deflection member 241 is controlled to change the direction of the laser beam L1 from the deflection member 241 along each of the planar directions each including the central axis 242a. The actuator 210 tilting the deflection member 241 serves as both the direction changing means and the tilt means and the control circuit 70 serves as both the control means and the tilt control means.

In the present embodiment, the collecting lens 62 is located on the optical path of the reflected light L2 between the rotating deflection mechanism 240 and the photodiode 20 so as to collect the reflected light L2 onto the photodiode 20. The filter 64 is located as well in the same manner as that in the first embodiment.

It is therefore possible that the present embodiment provides the configuration to change the direction of the laser beam L1 along each of the planar directions each including the central axis 242a, without making the configurations other than the changing means complex.

Fourth Embodiment

Figure 5:
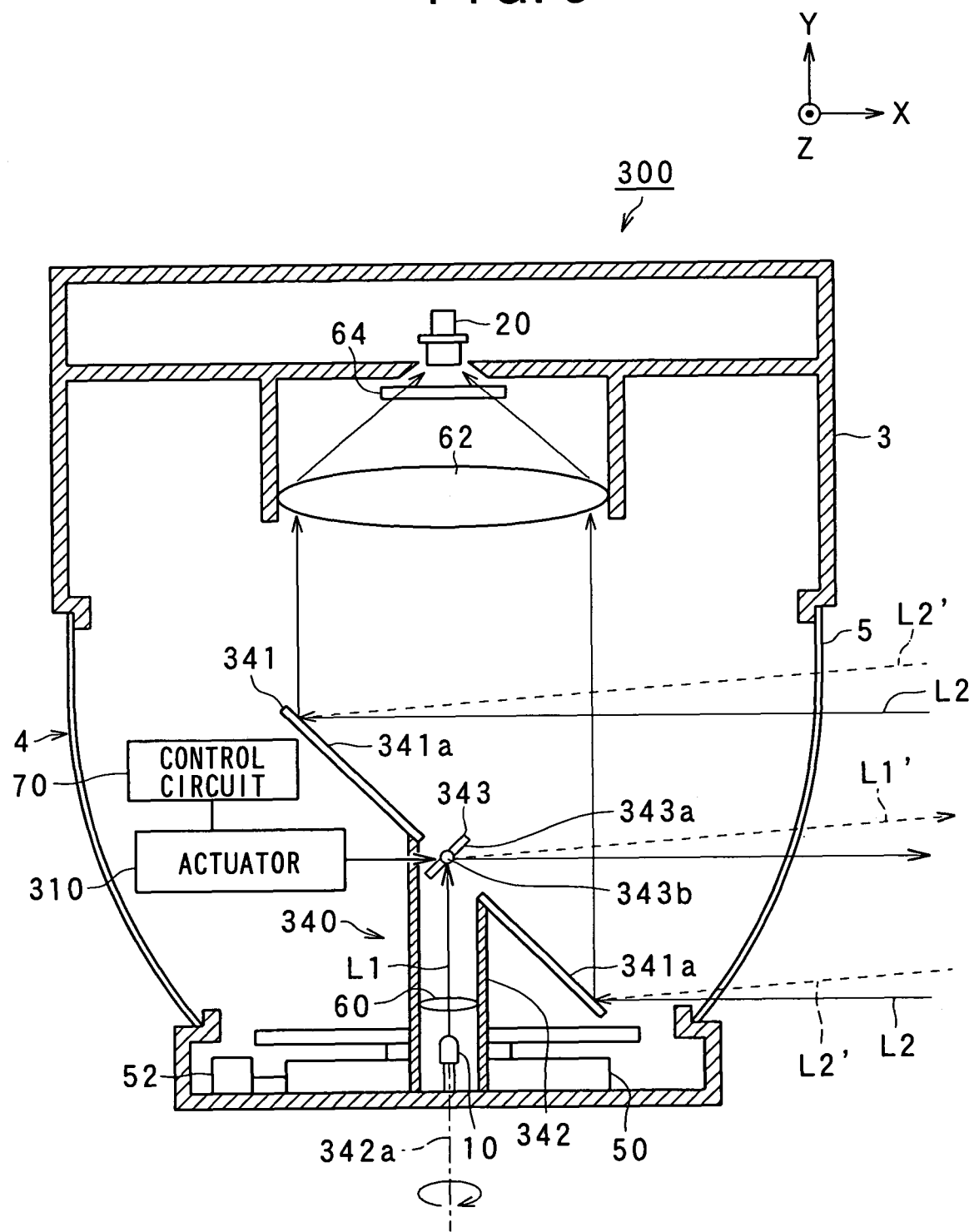
FIG. 5 is a schematic diagram outlining the configuration of a laser radar apparatus according to a fourth embodiment of the present invention.

Referring to FIG. 5, a laser radar apparatus according to a fourth embodiment of the present invention will now be described.

The fourth embodiment concerns with a geometrical modification of the laser diode 10 and the photodiode 20.

FIG. 5 shows an outlined configuration of a laser radar apparatus 300 according to the fourth embodiment, in which, as will be described later, there is provided a rotating deflection mechanism 340 having a central axis 342a. The XYZ orthogonal coordinate system is given to this configuration shown in FIG. 5 such that the X- and Y-axis directions are assigned to the central axis 342a and the direction perpendicular to the central axis 342a.

Like the first embodiment, the laser radar apparatus 300 according to the fourth embodiment is provided with the laser diode 10, the photodiode 20, and the rotating deflection mechanism 340.

The rotating deflection mechanism 340 is different from that explained in the first embodiment. This mechanism 340 functionally includes a cylindrical shaft 342, the changing means which is composed of a first deflection member 343 and a second deflection member 341. The first deflection member 343 is configured as a mirror and to deflect the laser beam L1 from the laser diode 10, thus the first deflection member 343 functions as the first deflection member. Likewise, the second deflection member 341 is configured as a mirror and to deflect to the reflected light L2 from an object, thus the second deflection member 341 functions as the second deflection means.

The second deflection member 341 is fixedly arranged on the top of the cylindrical shaft 342 in a tilted attitude, as shown in FIG. 5, while the first deflection member 343 is tiltably supported on the top of the cylindrical shaft 342. The cylindrical shaft 342, to which the central axis 342a is given, is rotatable on the central axis 342a and driven to rotate by the motor 50, so that the first deflection member 343 and second deflection member 341 are rotatable on the central axis 342a.

Specifically, the first deflection member 343 is tiltable independently of the second deflection member 341. The first deflection member 343 is supported by a not-shown bearing on the top of the cylindrical shaft 342 and is able to be displaced in rotation directions around an axis 343b perpendicular to the central axis 342a. In addition, the first deflection member 343 is driven by an actuator 310 in FIG. 5. The type of the actuator 310 is not limited to a particular one. For example, the actuator 310 may be a component including a motor to rotate the member 343 for the control of its rotated angle. An alternative actuator may be applied to the deflection member 343 which is partly composed of a magnetic member and configured to have a coil on the cylindrical shaft 342. The coil is subjected to the supply of current to generate electromagnetic force that displaces the first deflection member 343 in a controlled manner.

In the present laser radar apparatus 300, the first deflection member 343, which composes part of the deflection means, realizes the function of deflecting the laser beam L1 to the air. Furthermore, the second deflection member 341, which composes part of the deflection means, realizes the function of deflecting the reflected light L2 toward the photodiode 20.

The actuator 310 operates to rotate the first deflection member 343 on the axis 343b perpendicular to the central axis 342a of the first deflection member 343. This makes it possible that the incident direction of the laser beam L1 to the first deflection member 343 is changed and the direction of the laser beam L1 from the first deflection member 343 is changed along each of the planar directions each including the central axis 342a (in the case of FIG. 5, along the XY plane). Thus the actuator 310 serves as the direction changing means and the tilt means, while the control circuit 70 serves as the control means and the tilt control means.

In the present embodiment, the second deflection member 341 has a reflection area 341a which functions as a deflection area to deflect the reflected light L2 at this member 341, while the first deflection member 343 has a reflection area 343a which functions as a deflection area to deflect the laser beam L1 at this member 343. The second deflection member 341 is larger in the deflection area than the first deflection member 343.

Further, as illustrated in FIG. 5, on the central axis 342a of the rotating deflection mechanism 340, the laser diode 10 and the photodiode 20 are arranged to be faced to each other with the deflection member 343 therebetween. In this geometrical configuration, the laser beam L1 is generated by the laser diode 10 which is located within the inner space of the cylindrical shaft 342. The laser beam L1 is then reflected by the first deflection member 343 to be directed to the spatial field for scanning. The laser beam L1 is reflected by objects in the scanning spatial field to yield reflection light L2. This reflection light L2 returns to the apparatus and is reflected by the second deflection member 341 to be directed toward the photodiode 20. In this beam and light transmission paths, when the deflection member 343 is displaced, the path of the laser beam is changed to, for example, another path shown by a dashed line L1'. Responsively to this path change, the reflected light comes to the second deflection member 341 along another path shown by a dashed line L2'.

Like the first embodiment, the collecting lens 62 and the photodiode 20 are located in turn on the optical path of the reflected light L2 between the rotating deflection mechanism 340 and the photodiode 20.

In this way, only selectively displacing part of the deflection means makes it possible to change the emitting direction of the laser beam.

In addition, the deflection area of the second deflection member 341, which deflects the reflected light, is larger than that of the first deflection member 343, which deflects the laser beam. Therefore, the reflected light can be detected in a wider view, thus enhancing accuracy in the detection.

The laser diode 10 and the photodiode 20 are opposed to each other with the deflection member 343 located therebetween on the central axis of 342a of the rotating deflection mechanism 340. Hence the arrangement can be done effectively, being less in the space.

Fifth Embodiment

Referring to FIGS. 6-9, a laser radar apparatus according to a fifth embodiment of the present invention will now be descried.

Figure 6:
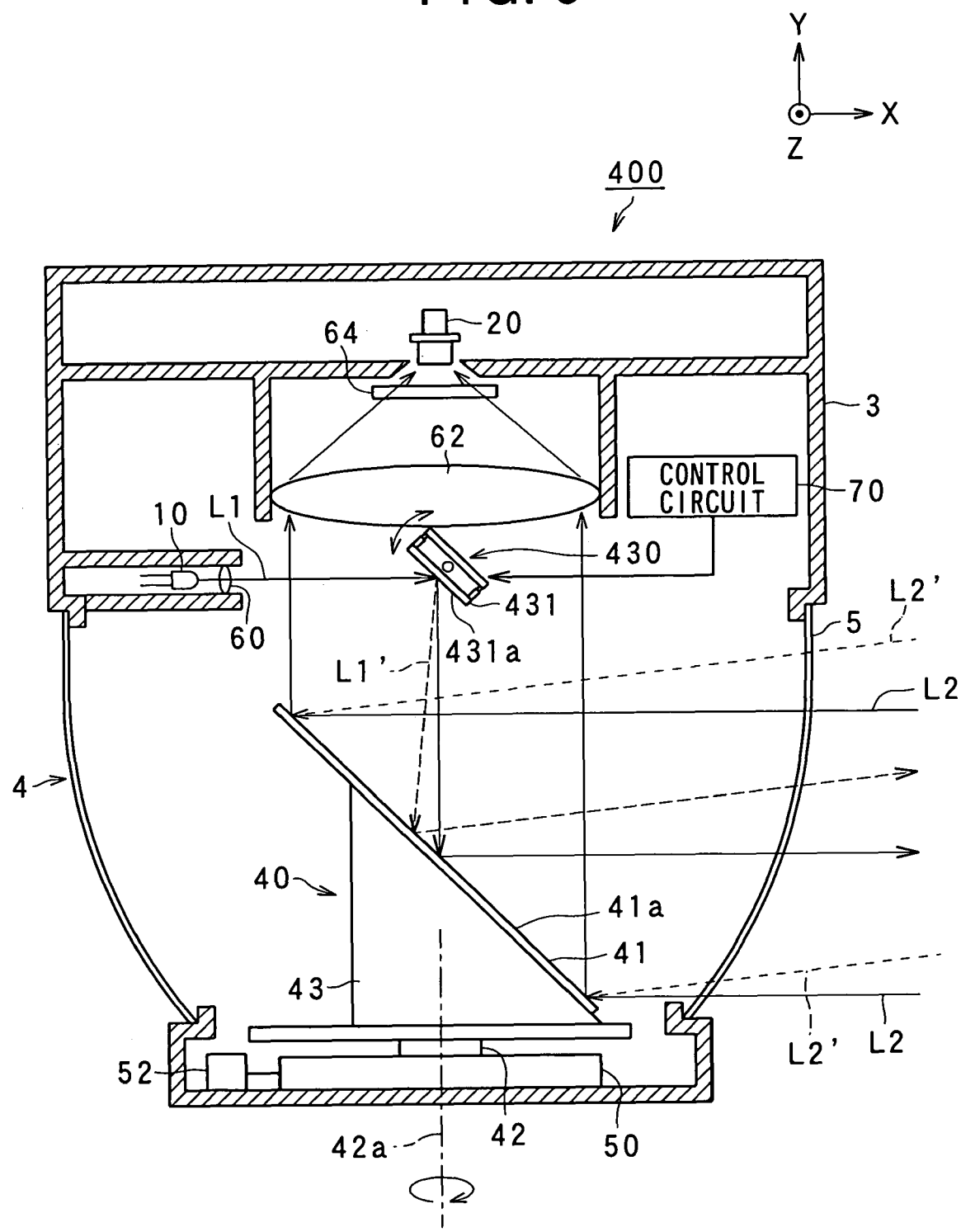
FIG. 6 is a schematic diagram outlining the configuration of a laser radar apparatus according to a fifth embodiment of the present invention.

FIG. 6 outlines the configuration of a laser radar apparatus 400 according to the fifth embodiment.

As shown in FIG. 6, the laser radar apparatus 400 is provided with the casing 3, light-passing portion 4, light transmission plate 5, laser diode 10, lens 60, photodiode 20, filter 64, collecting lens 62, rotating deflection mechanism 40, motor 50, rotation angle sensor 52, and control circuit 70, which are the same as those in the first embodiment. As shown, the Y-axis direction is given to the direction of the central axis 42a of the deflection member 41, while the X-axis is given to the emission direction of the laser beam from the laser diode 10.

Like the apparatus explained in the first embodiment, the laser radar apparatus 400 includes the laser diode 10, photodiode 20, rotating deflection mechanism 40 provided with the deflection member 41 having the central axis 42a, and motor 50, which are operative in the same manner as those in the first embodiment.

The laser radar apparatus 400 is provided with a light deflection member 430 in place of the swing mirror 30 in the first embodiment. This light deflection member 430, which functions as the direction deflection means and light deflection means, receives the laser beam from the laser diode 10 and deflects it toward the rotating deflection mechanism 40. This member 430 is configured to be swingable. Thus, the light deflection mechanism 430 is able to change the incident direction of the laser beam L1 to the deflection member 41, so that the direction of the laser beam L1 from the deflection member 41 can be changed in the Y-axis direction, that is, along each of the planar directions including the central axis 42a (in the case of FIG. 6, along the XY plane).

Figure 7:
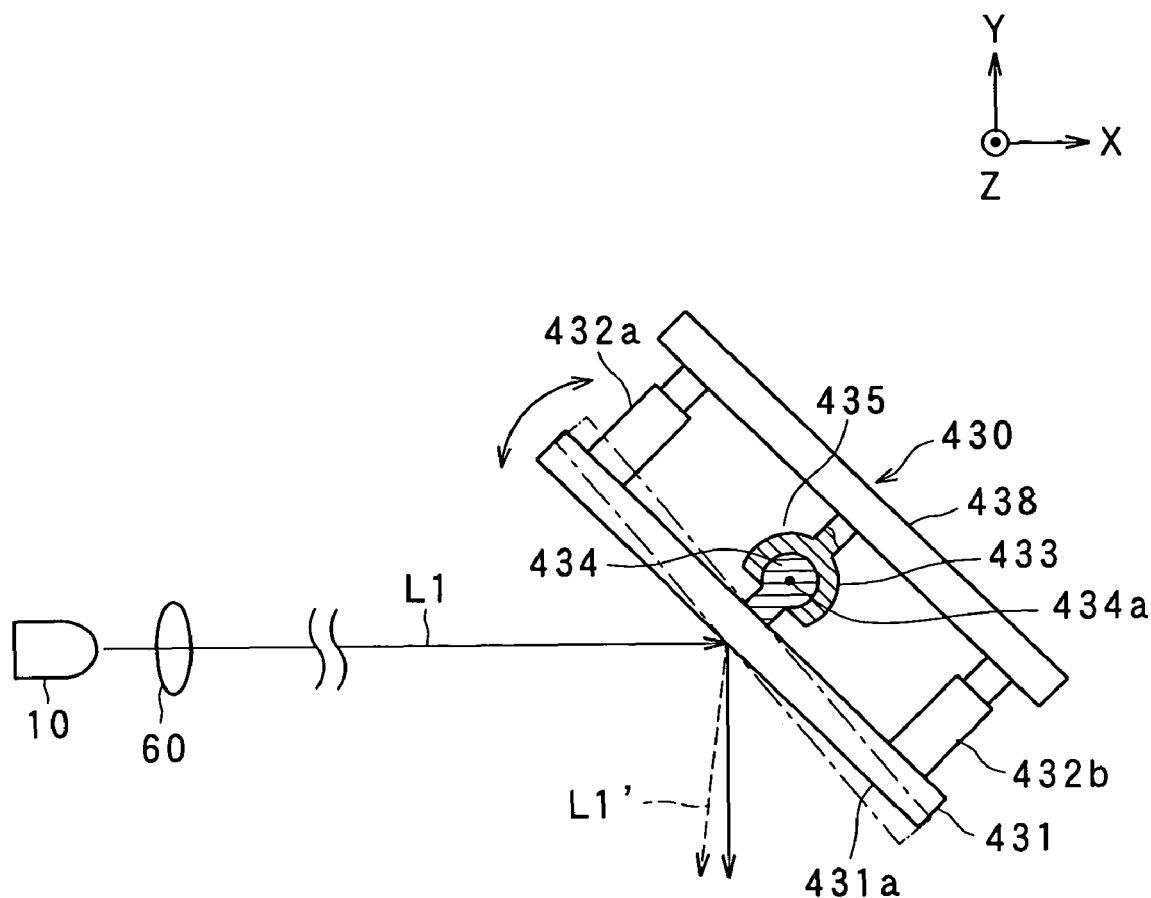
FIG. 7 is a side view showing a light deflection member used in the fifth embodiment.
Figure 8A:
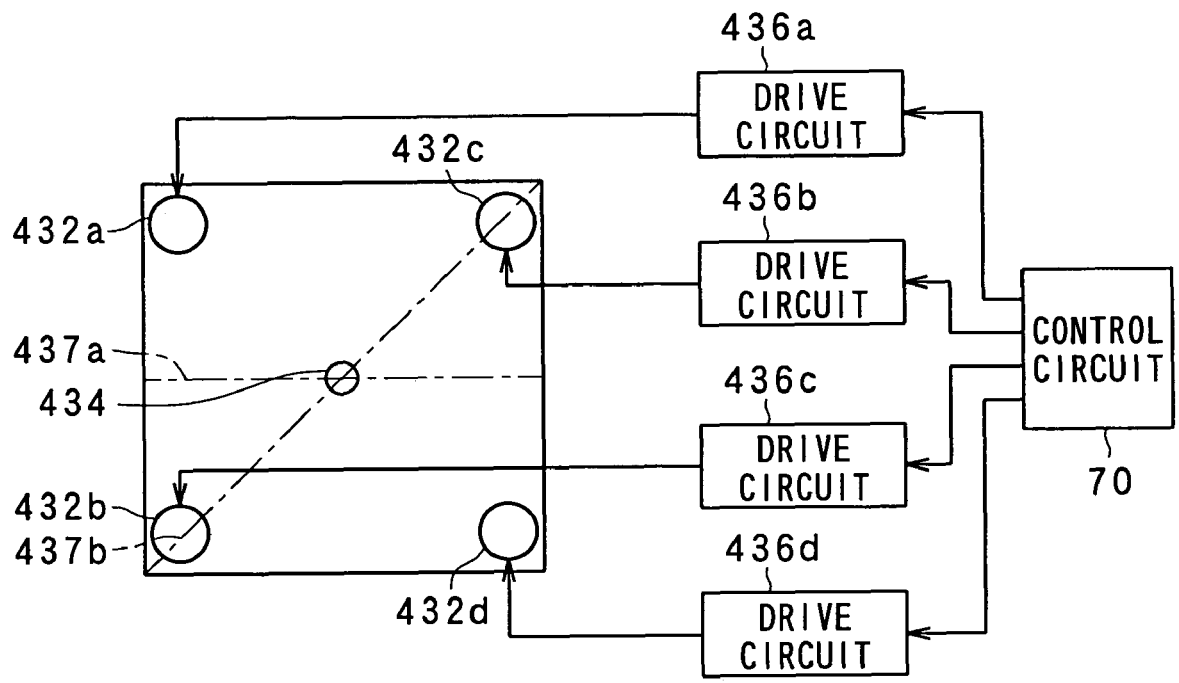
FIG. 8A shows how to drive a mirror.
Figure 8B:
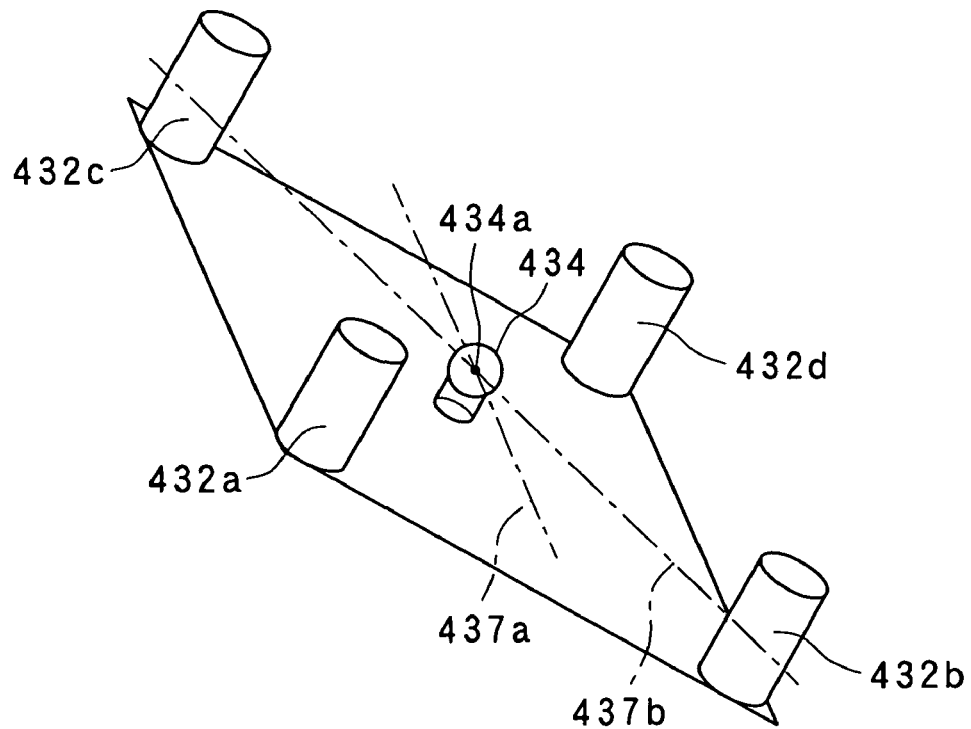
FIG. 8B shows the mirror on which piezoelectric actuators are mounted.

As shown in FIGS. 7, 8A and 8B, the light deflection member 430 is provided with a square mirror 431 reflecting the laser beam, a support mechanism 435 swingably supporting the mirror 431 (i.e., supporting the mirror 431 in a manner that the mirror can be swung), and four piezoelectric actuators 432a, 432b, 432c and 432d. These piezoelectric actuators are provided to drive the mirror 431 supported by the swing mechanism 435. The mirror 431 corresponds to part of the deflection member deflecting the laser beam and the piezoelectric actuators 432a, 432b, 432c and 432d are one example of the actuator according to the present invention.

Any of the four piezoelectric actuators 432a, 432b, 432c and 432d is known, which is able to extend and contract in response to voltage to be applied. The square mirror 431 has a frontal reflection surface 421 and a rear surface opposed to the reflection surface. One end of each piezoelectric actuator is secured to the rear surface of the mirror 431 at each of the four corners (specific positions) thereof. The other end of each piezoelectric actuator is fixedly secured to a support plate 438. The support plate 438 is fixed to the casing 3 to be positioned in place within the space enclosed by the casing 3. The respective piezoelectric actuators 432a, 432b, 432c and 432d are fixed on this support plate 438 are extended and contracted depending on the voltage applied to each actuator. Hence, this extension and contraction allows the mirror 431 to have a tilt to the support plate 438, as exemplified by a chain double-dashed line in FIG. 7.

The control circuit 70, which functions as the control means and the swing control means, is provided to control the drive of the piezoelectric actuators 432a-432d. This drive is for the tilt of the mirror 431, that is, the swung state of the light deflection member 430. As illustrated in FIG. 8A, the respective piezoelectric actuators 432a, 432b, 432c and 432d are electrically connected to piezoelectric-actuator drive circuits 436a, 436b, 436c and 436d, respectively. These drive circuits 436a-436d is given a command signal from the control circuit 70. The command signal indicates an amount to be controlled with regard to the displacement of each actuator. In reply to this command signal, each drive circuit 436a (-436d) provides each piezoelectric actuator 432a (-432d) with voltage according to the command signal value, i.e., the amount to be controlled.

In addition, the swing mechanism 435 is provided with a ball joint that coupling the mirror and the support plate 438. The ball joint, which has a spherical bearing stud and socket, comprises a spherical portion 434 coupled to the mirror 431 and a spherical shell portion 433 coupled to the support plate 438. Both the spherical portion 434 and the spherical shell portion 433 are jointed with each other such that the spherical portion 434 provides a center 434a fixed located at the same position and the spherical portion 434 contained in the spherical shell portion 433 can be rotated in multiple ways.

Accordingly, the swing mechanism 435 allows the tilted state of the mirror 431 to the laser beam L1 to be changed depending on the extended and contacted states of the piezoelectric actuators 432a-432d, in the state where the distance between the reflection surface 431a and the center 434a of the spherical portion 434 is kept constant any time. Hence the extension and contraction of each piezoelectric actuator 432a (-432d) is controlled by the control circuit 70, with the result that the tilting attitude of the mirror 431 to the laser beam L1 is controlled.

The detection process for objects, which is carried out by the laser radar apparatus 400, will now be detected.

Figure 9:
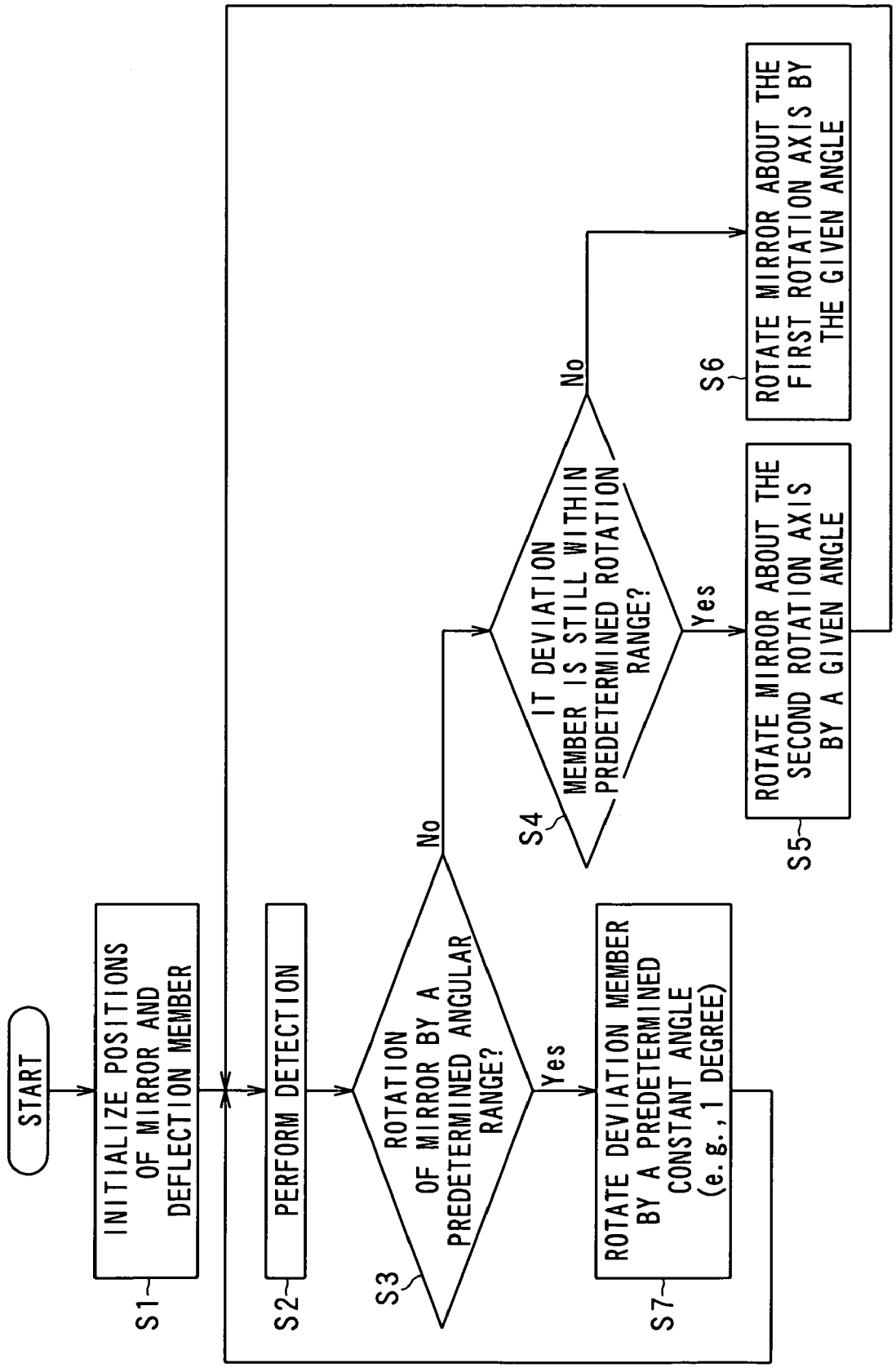
FIG. 9 is a flowchart performed by a control circuit used in the fifth embodiment.

FIG. 9 is a flowchart which explains the detection process, which is also carried out by the control circuit 70. In other words, the control circuit 70 is responsible for detecting objects as a processor as well as controlling the actuators 432a-432d and motor 50 as a controller. To realize these functions, computer readable programs for those functions are installed in the control circuit 70 in advance.

The detection process explained by FIG. 9 starts responsively to the power-on operation or a predetermined user's operation to the control circuit, for instance. First, the mirror 431 and the deflection member 41 are positionally located at their initial positions (step S1). In the present embodiment, those initial positions are indicated by solid lines in FIGS. 6 and 7. Thus the motor 50 and the piezoelectric actuators 432a-432d are controlled to enable the mirror 431 to take such an initial tilt position. As a modification, this initial setting of both the deflection member 41 and the mirror 431 may be set to their initial tilt positions during a waiting state before staring up the detection process. In this case, the process at step S1 can be omitted.

In this initial positioning state (or the current positioning state at the second and successive calculation timings), the detection process of objects is performed (step S2). Concretely, the control circuit 70 orders the photodiode 10 to emit a laser beam and reads out an electric signal from the photodiode 20. Then the control circuit 70 determines whether or not there are objects in the current scanning direction decided by the current extension and contraction of the piezoelectric actuators 432a-432d (that is, the current tilt of the mirror 431). When the electric signal from the photodiode 20 shows an amplitude higher than a given level, the control circuit 70 will calculate a distance from each object on the basis of a time interval between the laser beam emission from the laser diode 10 to the reflected light reception at the photodiode 20. Additionally, using the current extension and contraction of the piezoelectric actuators 432a-432d, the direction (orientation) of the laser beam L1 emitted from the deflection member 41 is calculated. The calculated distance and direction can be outputted to a not-shown display for visual observation.

The control circuit 70 then determines whether or not the mirror 431 has rotated by a predetermined angular range (step S3). In the present embodiment, under the control of the control circuit 70, the motor 50 is able to rotate the deflection member 41 every predetermined constant angle (for example, every one degree). Every time the deflection member 41 is rotated every predetermined constant angle (i.e., every one degree), the mirror 431 is subjected to the rotation through a "given angular range." Hence, at each rotated position of the motor 50, that is, the deflection member 41, the scanning is made by the laser beam L1 through a given lateral view range in the X-axis direction including the central axis 42a. When the determination at step S3 reveals the completion of rotation by the given angular range, that is, the scanning in the X-axis direction has been completed (YES at step S3), the processing is made to proceed to step 57.

Meanwhile, when the determination at step S3 reveals the non-completion of rotation through the given angular range, that is, the scanning in the X-axis direction has not been completed (NO at step S3), the processing is shifted to step S4. At this step S4, it is determined whether or not the deflection member 41 is still within a "predetermined rotation range." In the present embodiment, the predetermined rotation range is set to a rotation range in which the angle α made between an imaginary straight line in parallel with the emitting direction of the laser beam from the laser diode 10 and an imaginary plate in parallel with the reflection surface 41a of the deflection member 41 is less than a given threshold. When the deflection member 41 exists to fall into the predetermined rotation range, the determination at step S4 is YES, so that the processing is shifted to step S5. In contrast, the determination at step S4 is NO, the processing is shifted to step S6.

When performing the swing control, the control circuit 70 controls the swing of the light deflection member 430 based on the rotated position of the deflection member 41. That is, in cases where the deflection member 41 is not within the predetermined rotation range, the angle α is over the given threshold (for example, 10 degrees), whereby the determination NO comes out at step S4. Thus, at step S6, the control circuit 70 controls the extension and contraction of the piezoelectric actuators 432a-432d so as to rotate the mirror 431 by a predetermined angle about a first rotation axis 437a extending in the Z-axis direction, with the reflection surface 431a still being perpendicular to the XY plane. Thus, the direction of the laser beam L1 from the mirror 431 to the deflection member 41 is changed along the XY plane, as shown in FIG. 7, where the mirror 431 is rotated from the rotated position shown by the solid line to a new rotated position shown by the two-dot chain line about the first rotation axis 437a. At this new rotated position, the laser beam passes as shown by a broken line L1' (refer to FIGS. 6 and 7).

For rotating the mirror 431 about the first rotation axis 437a, the four piezoelectric actuators 432a-432d are controlled as follows. When the piezoelectric actuators 432a and 432c are extended, the remaining two piezoelectric actuators 432b and 432d are made to contract by an amount corresponding to the extended amount. In contrast, when piezoelectric actuators 432b and 432d are extended, the remaining two piezoelectric actuators 432a and 432c are made to contract by an amount corresponding to the contracted amount. In both cases, the amounts of extension/contraction of the two piezoelectric actuators 432a and 432c are set to be the same and those of the remaining two piezoelectric actuators 432b and 432d are also set to be the same.

On the other hand, in cases where the deflection member 41 is within the predetermined rotation range, the piezoelectric actuators 432a-432d are controlled to extend and contract so as to rotate the mirror 431 by a given angle about a second rotation axis 437b crossing the first rotation axis 437a (step S5; refer to FIGS. 5A and 8B). The second rotation axis 437b crosses with all the XY plane, YZ plane and ZX plane, and in the present embodiment, set as an axis along a diagonal line of the mirror 431. By rotating the mirror about the second rotation axis 437b, the direction of the laser beam from the mirror 431 toward the deflection member 41 can be changed along a plane crossing the XY plane.

In cases where the mirror 431 is rotated about the first rotation axis extending in the Z-axis direction, changes of the laser beam emitting from the deflection member 41 are made smaller in the direction of the central axis 42a (longitudinal direction), as the foregoing angle α becomes smaller. Thus, in the present embodiment, when the deflection member 41 is within the predetermined rotation range, the mirror 431 is subject to rotation about the second rotation axis 437b along the diagonal line, instead of rotation about the first rotation axis 437a. Hence, even if the angle α becomes smaller, it is secured that the laser beam can be changed largely in the longitudinal direction along the central axis 42a. For this control, for example, the amount of extension/contraction of the piezoelectric actuators 432b and 432c are made to be the same, the piezoelectric actuator 432d (or 432a) is made to contract by an amount corresponding to the extension of the piezoelectric actuator 432a (or 432d).

Returning to FIG. 9, when being shifted to step S7, by the control circuit 70, the motor 50 is driven to further rotate the deflection member 41 by the predetermined constant angle (one degree). After this, the processing is returned to step S2, so that at the new rotated state of the deflection member 41, the foregoing processing on steps S2-S7 is repeated, thereby scanning in the longitudinal direction again. Incidentally, the predetermined constant angle, on which the deflection member 41 rotates step by step, is not limited to one degree, but may be larger or smaller than one degree.

As described, in the present embodiment, the mirror 431 supported by the swing mechanism 435 is driven by the piezoelectric actuators 432a-432d and the drive is controlled by the control circuit 70. Thus the swinging action of the mirror 431 to deflect the laser beam can be controlled at higher accuracy. Further, the light deflection member 430 can be made compact.

In addition, controlling the four piezoelectric actuators 432a-432d at the four corners of the mirror 431 leads to the attitude control of the mirror 431. This control simplifies the swing control configuration for the mirror 431, so that the structure is made compact.

The ball joint is used to rotatably couple the mirror 431 and the support plate 438 supporting the mirror 431. This contributes to stably supporting the mirror 431 and smooth swinging actions of the mirror 431.

Further, based on the rotated positions of the deflection member 41, the swing control is the light deflection member 430 is changed. Thus the swing control can be made proper depending on the rotated positions of the deflection member 41.

Like the first embodiment, the collecting lens 62 is arranged, whereby the reflection light can be utilized for the object detection in a wider view, without making the detecting means larger in its size.

The filter 64 is also arranged as shown in the first embodiment, whereby the noise in the reflected light can be removed effectively.

Sixth Embodiment

Figure 10:
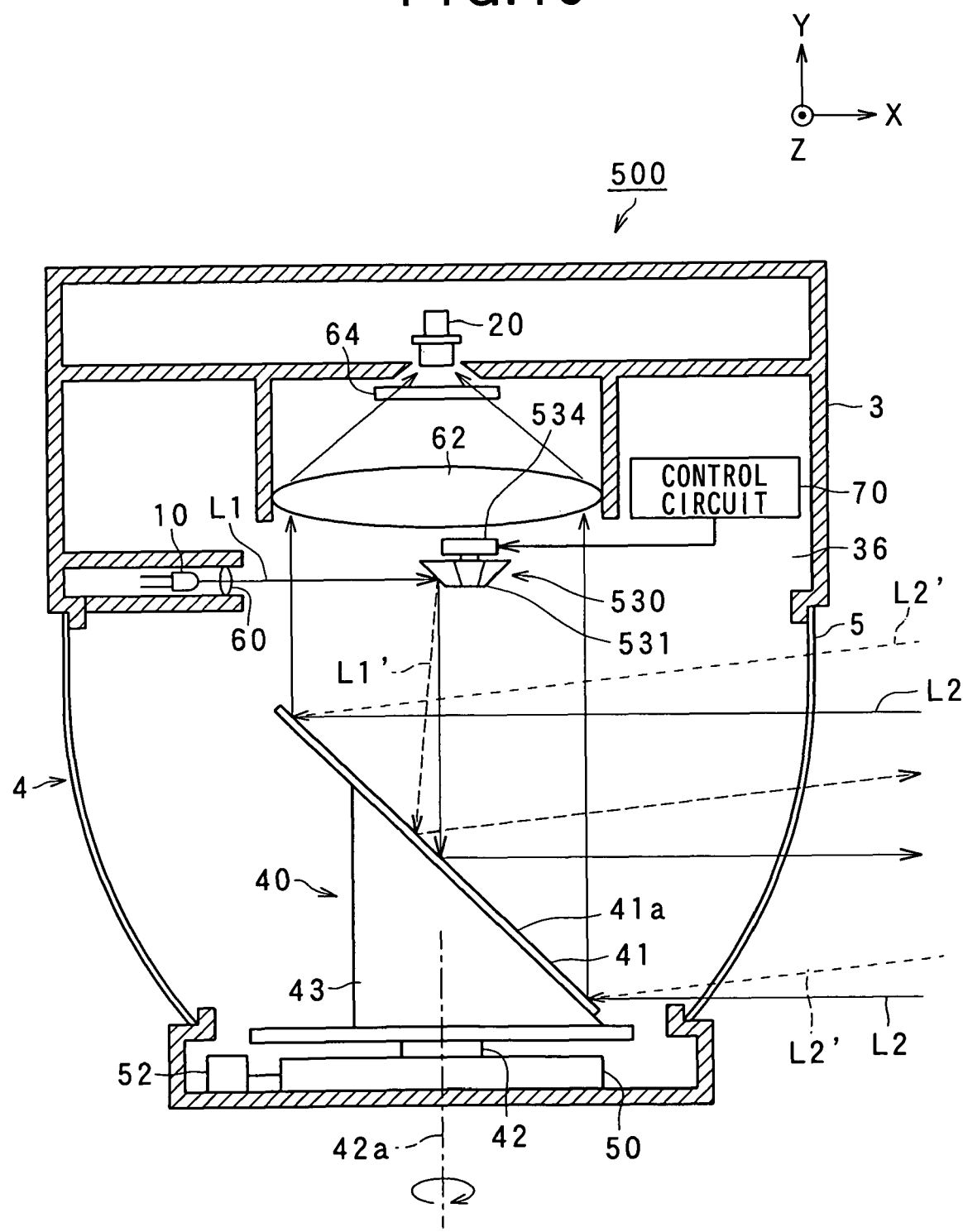
FIG. 10 is a schematic diagram outlining the configuration of a laser radar apparatus according to a sixth embodiment of the present invention.
Figure 11A:
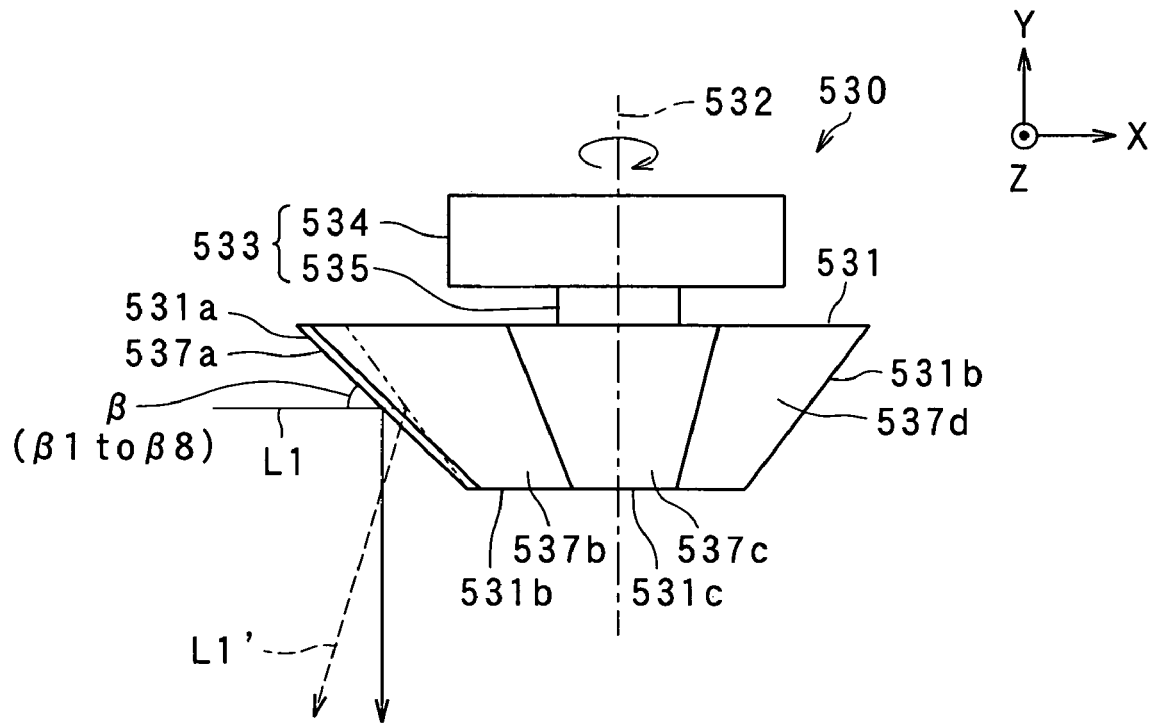
FIGS. 11A and 11B show a light deflection member used in the sixth embodiment.
Figure 11B:
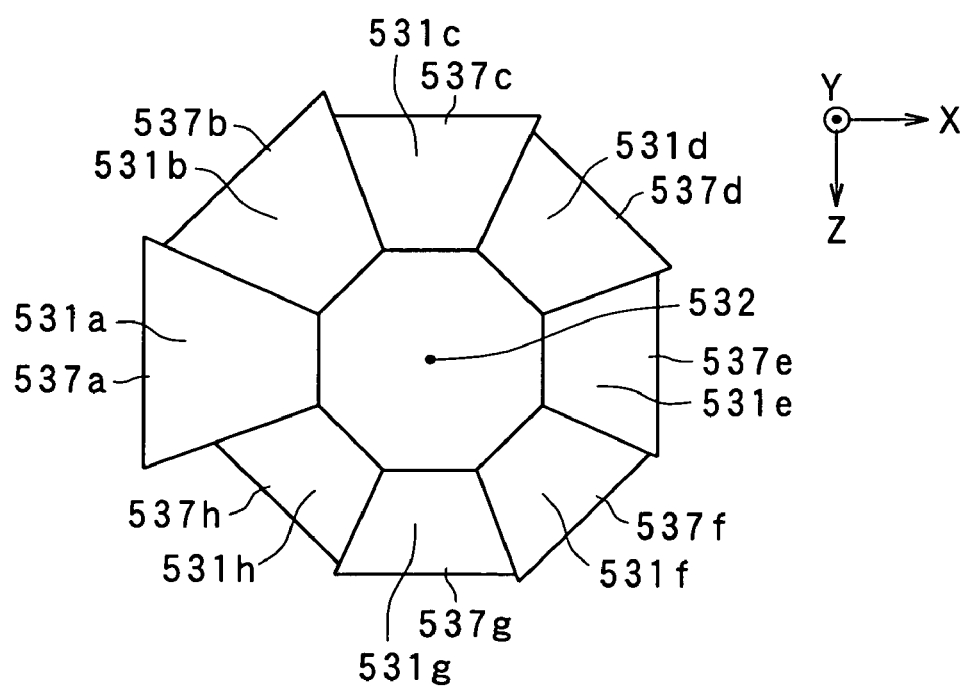
Figure 12:
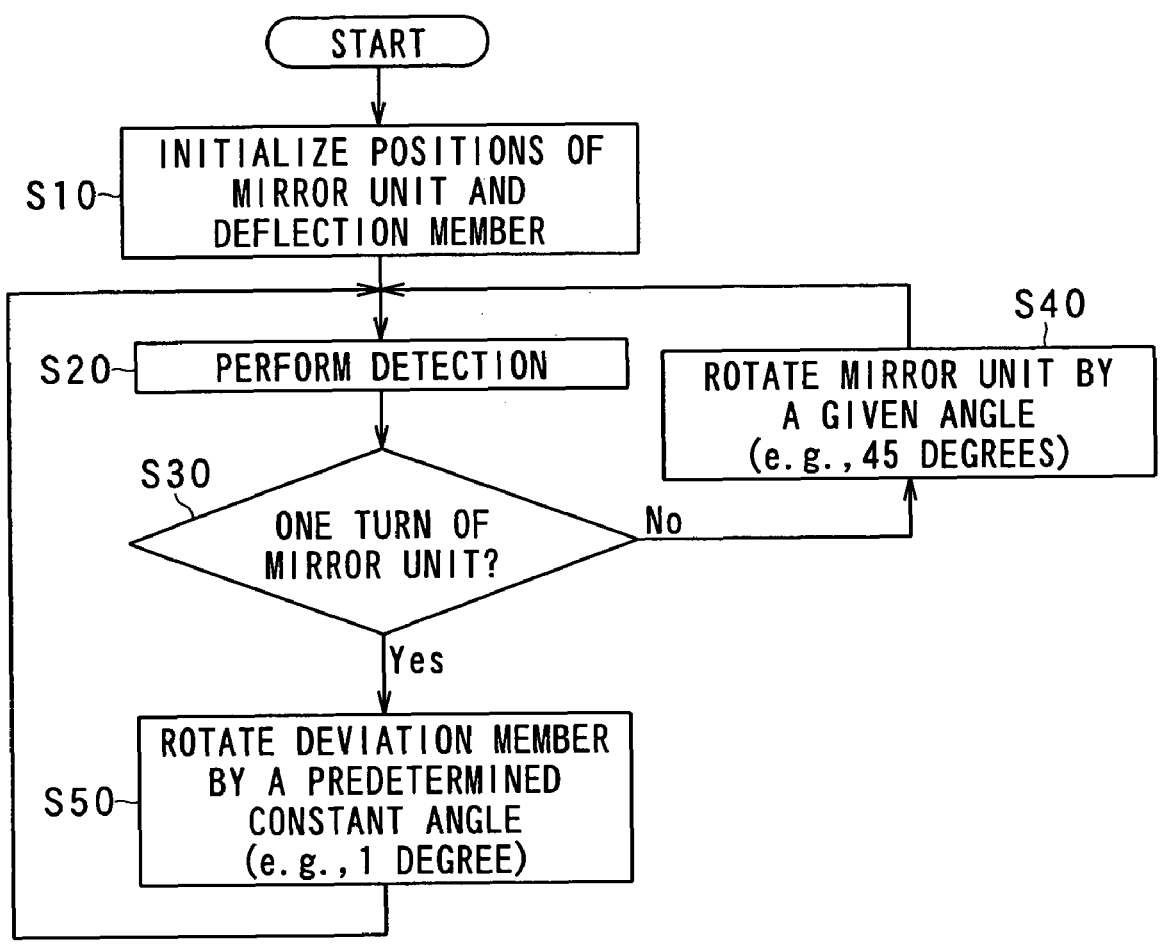
FIG. 12 is a flowchart performed by a control circuit used in the sixth embodiment.

Referring to FIGS. 10-12, a laser radar apparatus according to a sixth embodiment of the present invention will now be described.

As shown in FIG. 10, a laser radar apparatus 500 according to the present embodiment includes the casing 3, light-passing portion 4, light transmission plate 5, laser diode 10, lens 60, photodiode 20, filter 64, collecting lens 62, rotating deflection mechanism 40, motor 50, rotation angle sensor 52, and control circuit 70, which are the same or similar as or to the members described in the first embodiment. The XYZ orthogonal coordinate system is also applied to this apparatus 500.

In this apparatus 500, instead of the light deflection member 30 explained in the first embodiment, another light deflection member 530 is provided as shown in FIG. 10. This member 530 functions as the direction deflecting means and light deflection means.

FIGS. 11A and 11B detail the light deflection member 530. As shown, this member 530 is provided with a mirror unit 531 and a rotation mechanism 533 which is able to displace the mirror unit 531. The rotation mechanism functions as a displacement mechanism. The mirror unit 531 is provided with a plurality of mirrors 531a-531h, which are combined together into one unit. The mirror unit 531 is configured to be rotatable on a rotation axis 532 which is parallel with the central axis 42a (i.e., the Y-axis direction) of the rotating deflection mechanism 40. The plurality of mirrors have flat reflection surfaces 537a-537h, respectively, and are arranged around the rotation axis 532 to establish a ring-like form. The tilt angles of the respective reflection surfaces 537a-537h to the rotation axis 532 are different from each other.

The rotation mechanism 533, which is produced to rotate the mirror unit 531 on the rotation axis 532, comprises a motor 534 and an shaft member 535 coupling the motor 534 and the mirror unit 531. The motor 534 is of any type of motor including a stepping motor, as long as its rotated position can be controlled. In this rotation mechanism 533, the mirror unit 531 is driven to locate, in turn, the plural mirrors 531a-531h at a beam-incident position onto which the laser light L1 from the laser diode 10 comes. As described, since the reflection surfaces 537a-537h of the mirrors 531a-531h which are located at the beam-incident position are different from each other, the laser beams are reflected at mutually different angles on the reflection surfaces.

The control circuit 70, which functions as the control means, controls the drive of the rotation mechanism 533 to sequentially locate the mirrors 531a-531h at the beam-incident position. When being located at the beam-incident position, each of the reflection surfaces 537a-537h is set to be perpendicular to the XY plane.

The tilt angles of the reflection surfaces 537a-537h can be set in various modes. In the present embodiment, the first mirror 531a is adopted as a reference mirror. That is, the reflection surface 537a of this first mirror 531a has an angle β1 of 45 degrees relative to the laser beam L1, when the mirror 531a is located at the beam-incident position. The reflection surface 537b of the second mirror 531b has an angle β2 (e.g., 47 degrees) larger than the angle β1 relative to the laser beam L1, when the mirror 531b is located at the beam-incident position. Likewise, the reflection surface 537c of the second mirror 531c has an angle β3 (e.g., 49 degrees) larger than the angle β2 relative to the laser beam L1, when the mirror 531c is located at the beam-incident position. In this way, the angles of the respective reflection surfaces 537a-537h of all the eight mirrors 531a-531h differ from each other relative to the incident laser beam L1.

Hence, in the present laser radar apparatus 500, the reflecting directions of the laser beam L1 from the mirrors 531a-531h are also different from each other. The control circuit 70 controls the drive, i.e., the rotation of the mirror unit 531 in a predetermined speed, so that the direction of the reflected laser beam L1 from the mirror unit 531, that is, the incident direction toward the deflection member 41, is changed. This means that the direction of the laser beam L1 deflected (reflected) by the deflection member 41 is changed in the lateral direction (i.e., the Y-axis direction) along the central axis 42a. Thus, a lateral field outside the apparatus can be scanned by the laser beam L1.

FIGS. 10 and 11A explain this scanning. In those figures, a solid line shows the reflection of the laser beam L1 by the mirror 531a, while a dashed line (L1') shows the reflection of the laser beam L1 by the next mirror 531b.

Referring to FIG. 12, the detection process carried out by the control circuit 70 will now be descried.

First, the control circuit 70 starts by locating the mirror unit 531 and the deflection member 41 at their initial positions, respectively (step S10). Hence, the initial positions pictorially shown by the solid line in FIGS. 10 and 11A are realized by controlling the drive of both motors 534 and 50. Incidentally, this positional initialization step can be performed before the detection process, but in the waiting state for the detection process.

Then the control circuit 70 performs the detection of objects in the current scanning state (including the initial scanning state) provided by the current driven state of the motors (step S20). This processing is almost similar to that described in step S2 in FIG. 9, except that, instead of the light deflection member 430, the current setting state (the current mirror angle) of the mirror unit 531 is taken into the calculation of a direction along which the laser beam L1 travels (i.e., the direction in which an object exists).

The control circuit 70 then determines whether or not the mirror unit 531 has been rotate one turn. In the present embodiment, under the control of the control circuit 70, the motor 50 rotates the deflection member 41 every predetermined constant angle (i.e., 1 degree). Accordingly, whenever the deflection member 41 has rotated by the constant angle, the mirror 531 is rotated by one turn so that the plural mirrors 531a-531h are subjected, in sequence, to be located at the beam-incident position and to reception of the laser beam L1. Thus the direction of the laser beam reflected by the mirror unit 531 is changed in turn at intervals. In this way, at every stepping angle of the motor 50, the laser beam L1 emitted from the apparatus scans the outer field in the lateral Y-axis direction.

When the mirror unit 531 has finished it one turn, the determination at step S30 is YES, and the processing is shifted to step S50. Meanwhile, the determination is NO at step S30, the processing is shifted to step S40, where the control circuit 70 controls the drive of the mirror unit 531 to be rotated by the given angle (in the present embodiment, 45 degrees), thus locating the next mirror at the beam-incident position. The processing then returns to step S20 to repeat the detection process at the new scanning angle.

Meanwhile, at step S50, the control circuit 70 controls the drive of the motor 50 to further rotate the deflection member 41 by the constant angle (in the present embodiment, 1 degree), before returning the processing to step S20. Thus, at the next rotation angle along the XY lateral plane, the new longitudinal Y-axis directional view in the outside filed is scanned for detecting objects.

In the present embodiment, the angle of 1 degree is exemplified as the predetermined constant angle, but this is not a decisive list. This predetermined constant angle, which corresponds to each rotation step of the deflection member 41, may be smaller or larger than 1 degree. In addition, the number of mirrors arranged to the mirror unit 531 is not limited to eight, but may be smaller or larger than eight.

In the present embodiment, the mirror unit 531 is driven and controlled such that the plural mirrors 531a-531h are located in sequence at the beam-incident position of the laser beam L1 from the laser diode 10. Hence the direction of the laser beam L1 to the deflection member 41 can be changed using the relatively compact mirror structure. Simply controlling the mirror unit 531 so as to sequentially locate the mirrors 531a-531h makes it possible to change the incident direction of the laser beam toward the deflection member 41. Thus, without employing a complex control, the laser beam L1 emitted from the apparatus can be scanned in the lateral Y-axis direction in the outside field.

In addition, rotating the mirror unit 531 results in switchovers among the plural mirrors at the beam-incident position of the laser beam L1, whereby the switchover action can be speeded up and performed with accuracy.

The deflection member 41 is rotated, step by step, every predetermined constant angle, and at each stepping angle of the deflection member 41, all the plural mirrors 531a-531h are located in sequence at the beam-incident position for scanning the longitudinal direction. It is not necessary to the deflection member 41 largely at a time, but the three-dimensional scanning can be made reliably for three-dimensionally detecting objects in the outer filed. Thus, the rotating deflection mechanism 40 and motor 50 are suppressed from being loaded heavily.

Seventh Embodiment

Referring to FIGS. 13-16, a laser radar apparatus according to a seventh embodiment of the present invention will now be described.

Figure 13:
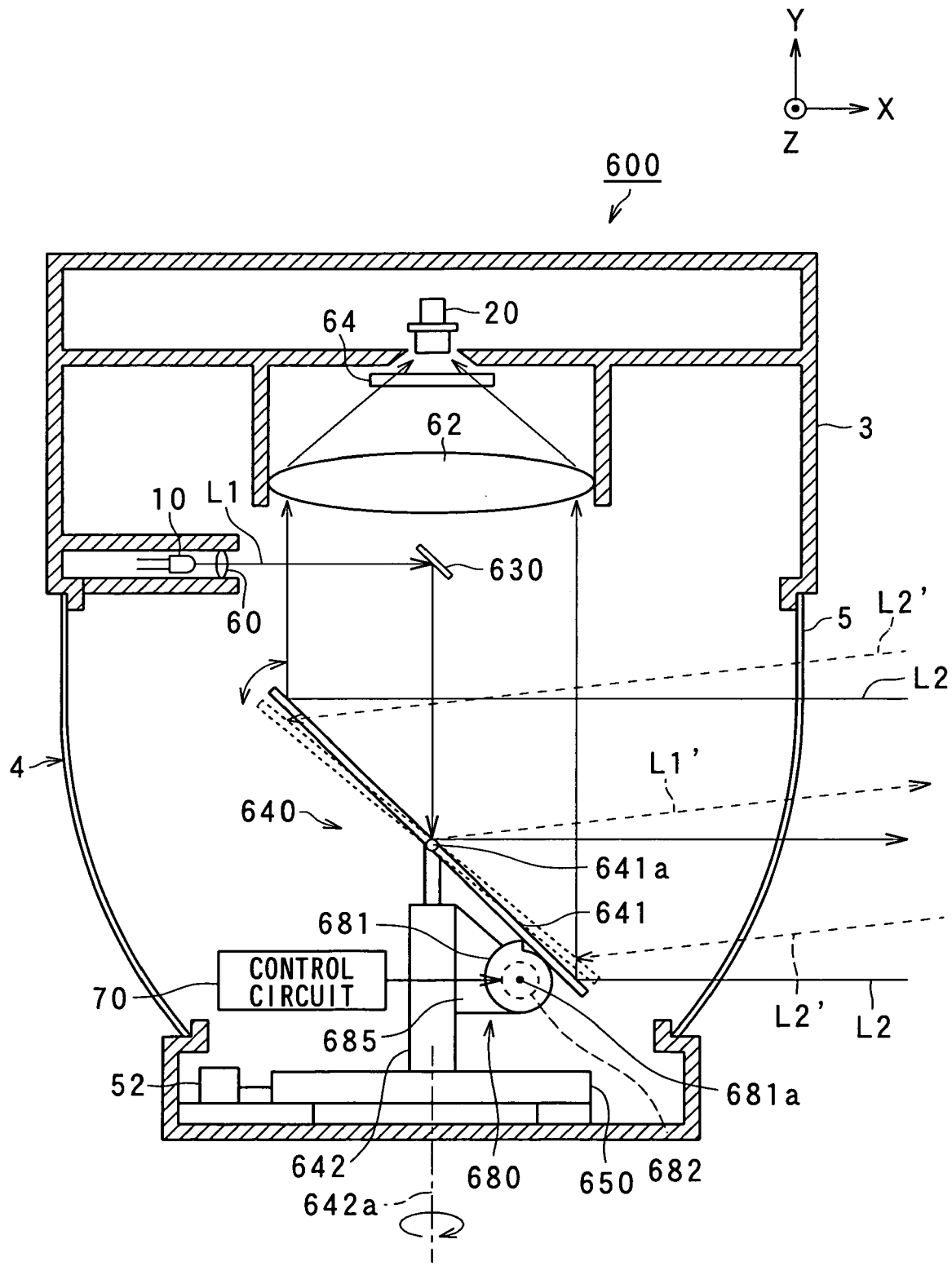
FIG. 13 is a schematic diagram outlining the configuration of a laser radar apparatus according to a seventh embodiment of the present invention.

As shown in FIG. 13, a laser radar apparatus 600 according to the present embodiment includes the casing 3, light-passing portion 4, light transmission plate 5, laser diode 10, lens 60, photodiode 20, filter 64, collecting lens 62, rotation angle sensor 52, and control circuit 70, which are the same or similar as or to the members described in the first embodiment. In addition, the laser radar apparatus 600 includes a mirror 630, a rotating deflection mechanism 640 having a central axis 642a, a motor 650, and a shaft member 642, which are different from those in the first embodiment.

Figure 14A:
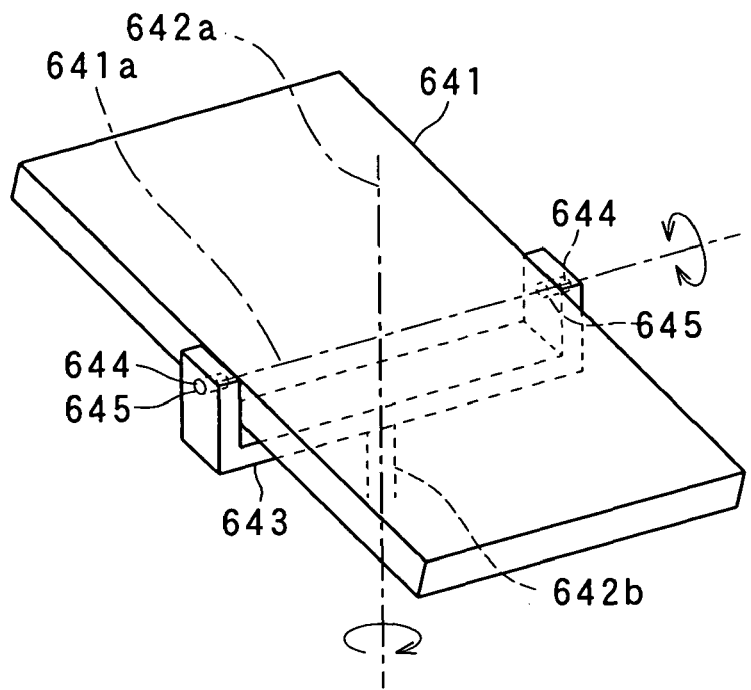
FIG. 14A shows a deflection member used in the seventh embodiment.
Figure 15A:
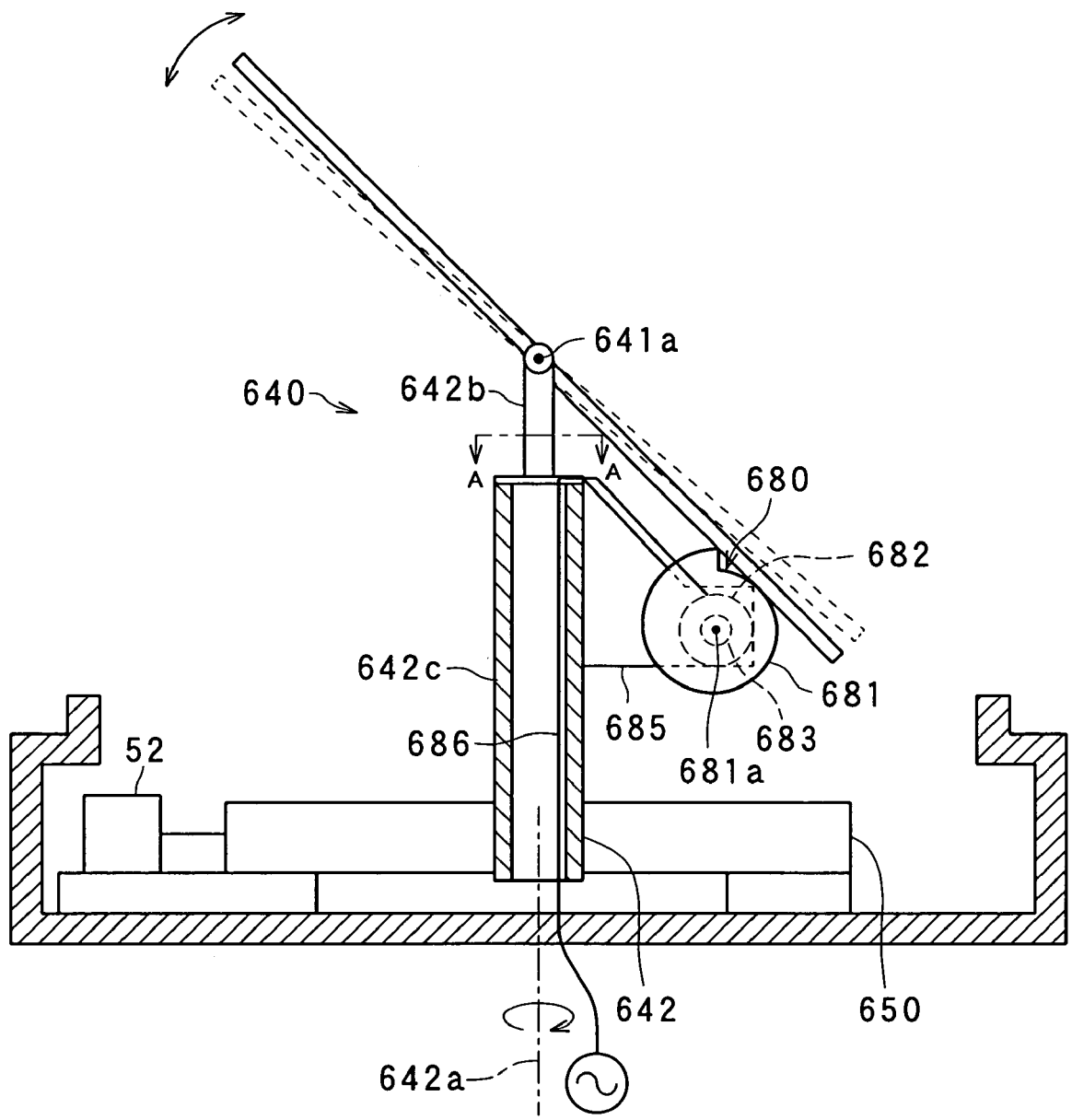
FIG. 15A explains the operations of the deflection member and the cam mechanism.

For the sake of a simplified explanation, the XYZ orthogonal coordinate system is applied to this apparatus 600, in which the Y-axis direction is set to the central axis 642a, which is conceptually shown in FIGS. 13, 14A and 15A, and the X-axis direction is set to the emitting direction of the laser beam from the laser diode 10.

In the laser radar apparatus 600, the laser beam L1 from the laser diode 10 is reflected substantially perpendicularly by the mirror 630 to reach a central portion of a deflection member 641 arranged to the rotating deflection mechanism 640. The deflection member 641, functioning as the deflection means, is rotatable on the central axis 642a and reflects not only the laser beam L1 toward an external field view to be observed but also reflected light from objects toward the photodiode 20. The combination of the motor 650 and the control circuit 70 compose the drive means.

Practically the rotating deflection mechanism 640 differs largely in its construction from that in the first embodiment. The deflection member 641 is formed into a flat-plate mirror rotatable on the central axis 642a and on an axis 641a perpendicular to the central axis 642a. The axis 641a agrees to the Z-axis direction in the view shown in FIG. 13. The shaft member 642, which is part of the rotor of the motor 650, extends along the Y-axis direction. The deflection member 641 is also rotatably supported at the top of the shaft member 642 and rotatable on the axis 641a which is along the XZ plane in the view shown in FIG. 13.

Though the deflection member 641 can be supported in various ways by the shaft member 642, such an example may be shown in FIG. 14A. As shown, the shaft member 642 has a distal portion 642b on which a support frame 643 is secured. A pair of bearings 645 are arranged at the support frame 643. The deflection member 641 has protrusions 644 protruding from both sides thereof, and the protrusions 644 are engaged with the bearings 645 in a rotatable manner, respectively. The shaft member 642 and the support frame 643 compose one example of the tilting mechanism, which tiltably supports the deflection member 641 on the axis 641a perpendicular to the central axis 642a. FIG. 13 and the other drawings conceptually render the configuration of the tilting mechanism.

Further, as shown in FIG. 14A, the laser radar apparatus 600 is provided with a cam 681 which rotates while coming into contact with a given position of the deflection member 641 (a position close to an end thereof) and a shaft member 683 coupling a motor 682 with the cam 681. The cam 681 and the shaft member 683 compose a cam mechanism 680, in which the rotation of the cam 681 gives a liner motion to the deflection member 641 at the given position thereof. The motor 682 is arranged to rotate the cam mechanism 680, and exemplifies the cam mechanism drive means. The cam mechanism and the motor 682 compose the oscillation means.

Figure 14B:
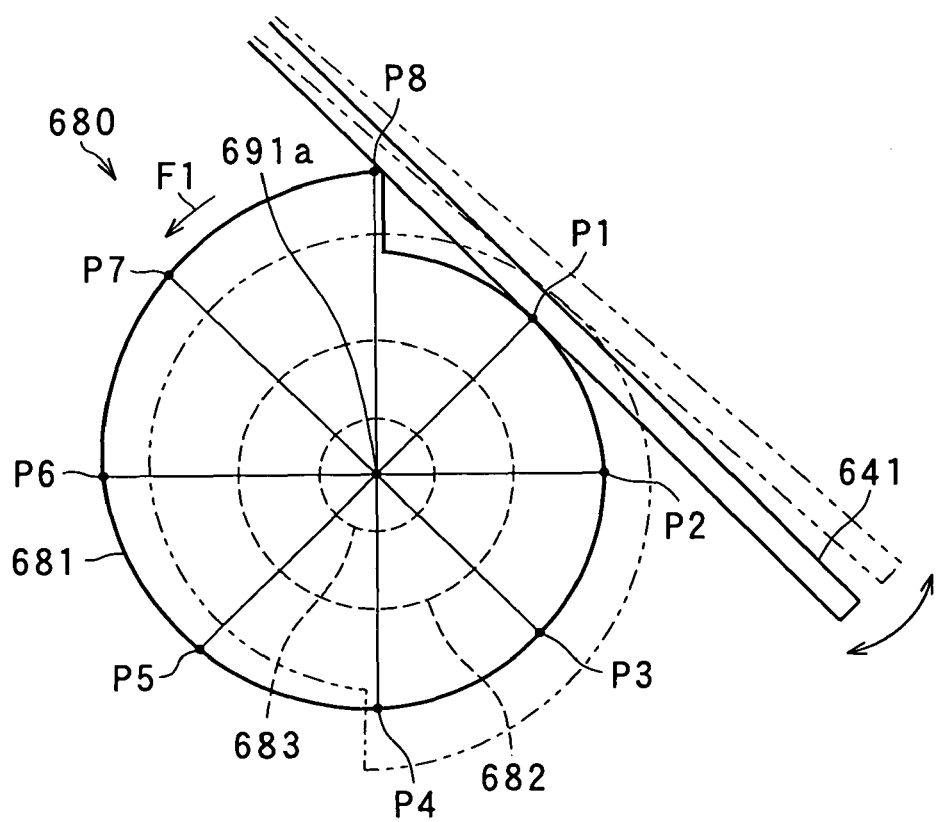
FIG. 14B shows a cam mechanism used in the seventh embodiment.

As shown in FIG. 14B, the cam 681 is able to support the deflection member 641 at a plurality of support positions P1-P8 given on the outer edge of the cam. Which support position of the cam 681 supports the deflection member 641 will decide the tilt angle of the deflection member 641. The distance from the cam rotation center 681c to each support position P1 (-P8) differs from one another, every support point. Hence, as the support position changes in the order of, for example, P1, P2, P3, . . . , P8, the support point is separated farther away from the rotation center 681a little by little, gradually changing the tilt of the deflection member 641. The outer circumference of the cam 681 is curved except for the section from the last support point P8 to the first support point P1 and the curvature radii at the support positions P1-P8 are different from each other, that is, become larger gradually in this order. The motor 682 is driven to rotate the cam 681 in a direction shown by an arrow F1, so that the cam 681 is made to slide on the deflection member 641 to sequentially change the support position in the order of, for example, P1, P2, P3, . . . , P8, P1, P2, . . . .

Using this cam mechanism 680, the rotated position of the cam 681, which is driven by the motor 682, can be decided. This decision gives the cam 681a contact position with the deflection member 641, thus deciding the tilt angle of the deflection member 641.

Furthermore, the combination of the oscillation means (i.e., the cam mechanism 680 and the motor 682) and the tilting mechanism (i.e., the shaft member 642 and the support frame 643) function as the direction changing means and the tilting means. These means are able to tilt the whole deflection member 641 about the axis 641a which is set to be perpendicular to the central axis 642a (i.e., the Y-axis direction). The motor 682 operates under the control of the control circuit 70, which functions as the control means and the tilt control means. The control circuit 70 controls the drive of the motor 682 such that the given position (the position close to the end) of the deflection member 641 can oscillates.

The cam mechanism 680 and the motor 682 are fixed to a frame 685 attached to the shaft member 642 and rotatable as one unit with the deflection member 461. The motor 682 is powered by an external power supply which is positionally fixed, in which such external power supply is for example a commercial power supply 687 placed outside of the apparatus 600, as shown in FIG. 15A.

Figure 15B:
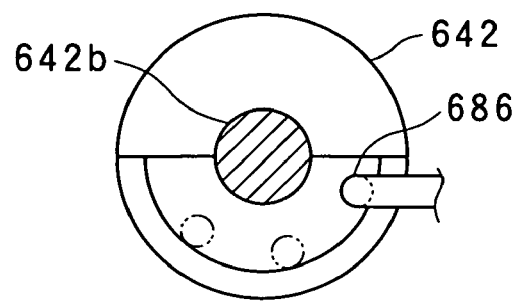
FIG. 15B is a sectional view showing wiring of a power line.

Practically, as shown in FIGS. 15A and 15B, the shaft member 642 includes a cylindrical hollow pillar 642c to which the foregoing distal portion 642b is linked. A power line 686 to power the motor 682 passes through the inside of the cylindrical hollow pillar 642c to connect the commercial power supply 687 and the motor 682. Though not shown in FIG. 15A, necessary electric components such as a power circuit and a rotatable electric connector are arranged between the commercial power supply 687 and the motor 682. Further, various types of motors such as stepping motors, can be employed as the motor 650, so the motor 650 can accompany parts other than the axial member 642, such as rotor parts and stator parts, though not shown in FIG. 15A.

When the shaft member 642 rotates, the power line 686 can move inside the cylindrical hollow pillar 642c, as shown by chain double-dashed lines in FIG. 15B.

Figure 16:
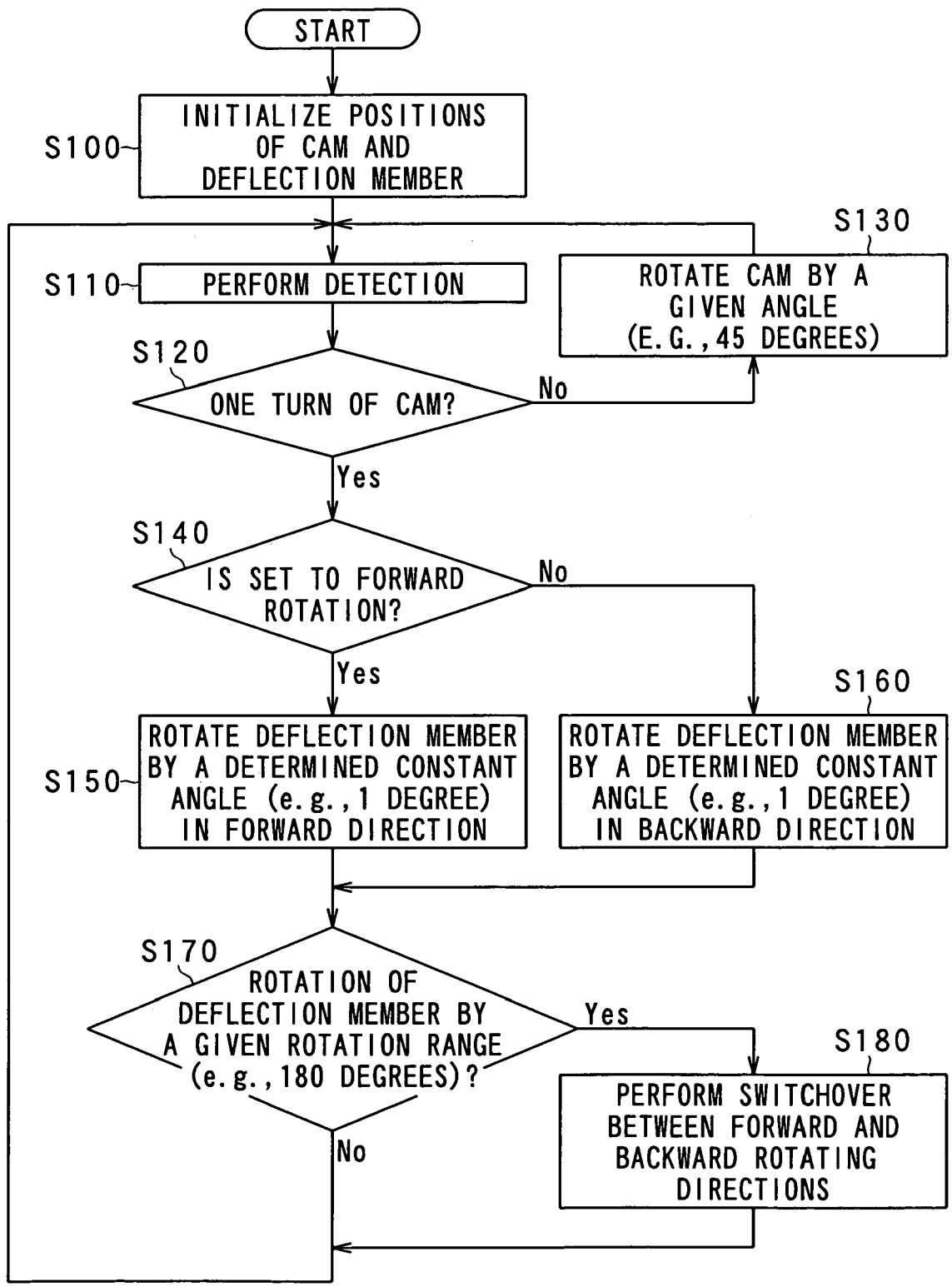
FIG. 16 is a flowchart performed by a control circuit used in the seventh embodiment.

Referring to FIG. 16, the detection carried out by the control circuit 70 in the present embodiment will now be described.

First, the control circuit 70 initializes the positions of the cam 681 and the deflection member 641 (step S100). In this case, the initialized positions are shown by solid lines in FIG. 13 and FIG. 15A and can be given by rotating the motors 682 and the 650 under a predetermined procedure. This initialization process may be performed before starting the detection process.

Then the control circuit 70 performs the detection of objects in the current scanning state (including the initial scanning state) provided by the current driven state of the motors (step S110). This processing is almost similar to that described in step S2 in FIG. 9, except that instead of the light deflection member 430, the current setting state (the current tilt angle and the current rotated angle) of the deflection member 641 is taken into the calculation of a direction along which the laser beam L1 travels (i.e., the direction in which an object exists). That is, the control circuit 70 calculates the emitting direction (scanning direction) of the laser beam L1 from the deflection member 641 on the basis of information showing the rotated positions of both the motors 682 and 650. The distance from the object is also calculated by the control circuit 70 in the same way stated already. The calculated distance and direction is presented by a not-shown display or other means.

After the detection step S110, the processing is made to proceed to the determination whether or not the cam 681 has been finished its one turn (step S120). Like the forgoing, the motor 650 is driven by the control circuit 70 to rotate the deflection member 641a predetermined constant angle (1 degree in the present embodiment). And at each rotated angle of the deflection member 641, the motor 682 is driven to rotate the cam 681 one turn. In other words, whenever the deflection member 641 is rotated by the constant angel on the central axis 642a (the Y-axis direction), the laser beam L1 scans the external field in the longitudinal direction (the Y-axis direction).

When it is determined that the cam 681 has finished its one turn (YES at step S120), it is recognized that the longitudinal scanning has been finished at the current rotated position of the motor 650 (i.e., the deflection member 641) along the XY plane. Thus the processing is shifted to step S140. Meanwhile it is determined that the cam 681 has not been finished its one turn yet (NO at step S120), the processing is shifted to step S130, where the control circuit 70 controls the motor 682 to rotate the cam 681 by a given angle (in the present embodiment, 45 degrees). Then the processing is returned to step S110, where at the new tilt angle of the deflection member 641, the detection is repeated.

At step S140, it is determined whether or not the motor 650 is currently set to the forward rotation (step S140). In the present embodiment, when being viewed in FIG. 14B, the rotation in the clockwise direction is set to the forward rotation, while the rotation in the counterclockwise direction is set to the backward rotation. When being set to the forward rotation, the processing is shifted to step S150, where the deflection member 641 is rotated forward by the predetermined constant angle (1 degree). In contrast, when the rotation is set to the backward rotation, the processing is shifted to step S160, where the deflection member 641 is rotated backward by the predetermined constant angle. Incidentally, the rotation of this motor 650 is set to the forward rotation by default setting, but is switched to the opposite one at step S180 described later.

On completion of the process at step S150 or S160, it is determined at step S170 whether or not the deflection member 641 has been rotated by a given rotation range (in the present embodiment, a angular range of 180 degrees) in either the forward rotation or the backward rotation. If the determination is made such that the deflection member 641 has completed the rotation through the given rotation range on the central axis 642a, the processing is shifted to step S180 for performing a setting switchover process. This switchover process is prepared for a switchover to the backward rotation if the current setting is the forward rotation and for a switchover to the forward rotation if the current setting is the backward rotation. Information indicating the forward/backward rotation is always kept at a memory in the control circuit 70, and the determination at step S140 uses the information. In consequence, by controlling the drive of the motor 650, the rotating deflection mechanism 640 is driven to reciprocate the deflection member 641 by the given rotation range.

When the determination at step S180 is NO, the processing is returned to step S110, where the newly rotated angle of the deflection member 641 at step S150 or S160 is subjected to the scanning and detection of objects.

The predetermined constant angle is not always limited to 1 degree, but may be smaller or larger than this angle. The rotation step angle of the cam 681 is also not always be limited to 45 degrees, but may be smaller or larger than this angle.

In this way, in the present embodiment, the deflection member 641 is tiltably supported, and oscillated by the cam mechanism 680 to be oscillated by a given tilting angle range in a controlled manner. Hence, the deflection member 641 can be supported stably and controlled in its tilt action.

Furthermore, the cam mechanism 680 and the motor 682 compose the oscillation means which is controlled by the control circuit 70. Thus the oscillation means can be produced in a relatively simplified and compact structure, while still oscillating the deflection member 641 reliably.

The oscillation means (the cam mechanism 680 and the motor 682) and the deflection member 641 are unified and rotated together, and the motor 682 is powered by the external power supply which is not rotated together with such unified unit. Thus the rotated portion including the deflection member 641 can be simplified in its construction. Additionally, the power line 686 electrically connects the motor 682 and the external power supply and the deflection member 641 is reciprocated by the given rotation range. Therefore, though the oscillation means is adopted, this means is powered well from the external power supply.

Eighth Embodiment

Referring to FIGS. 17-18A and 18B, a laser radar apparatus according to an eighth embodiment of the present invention will now described.

Figure 17:
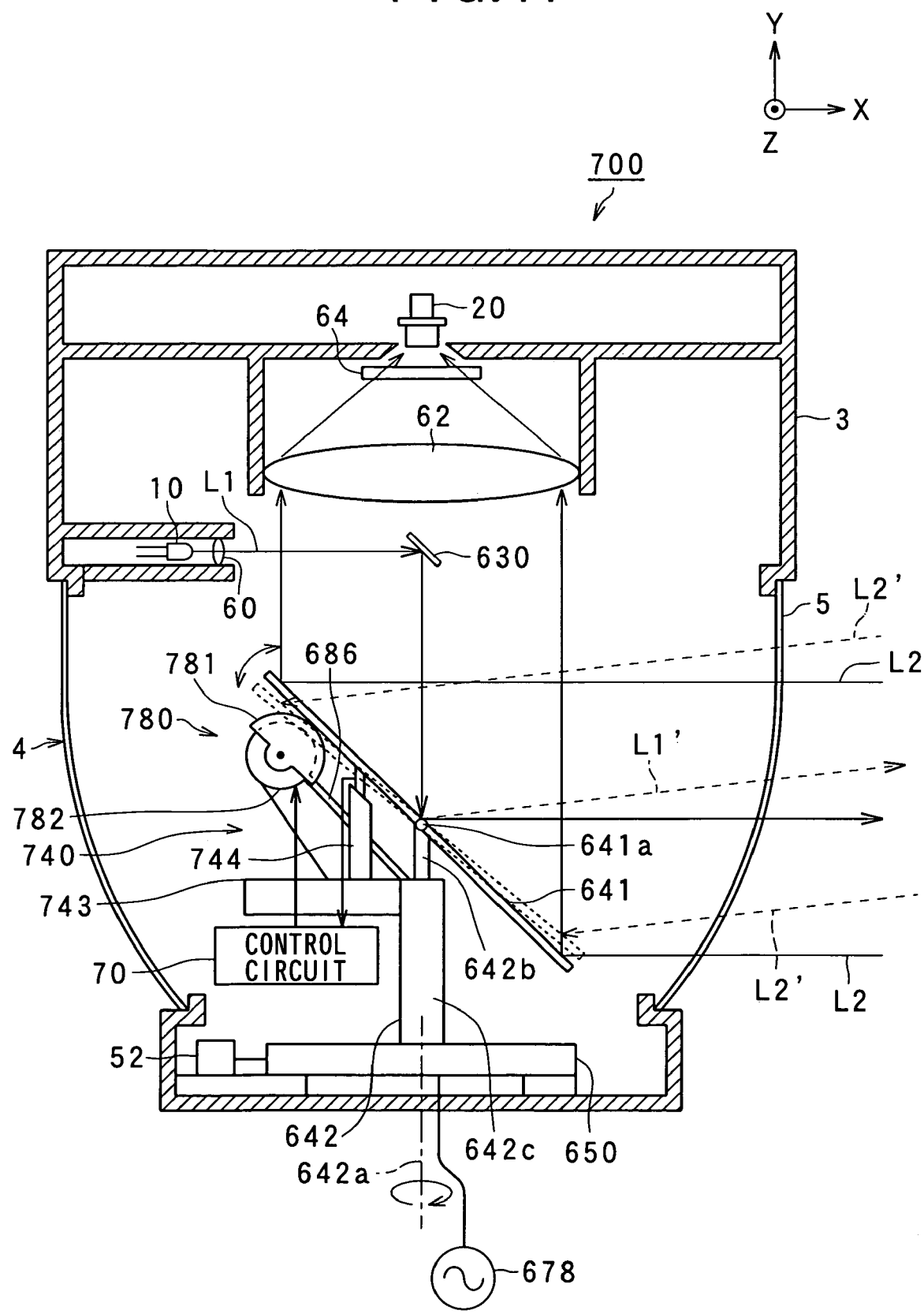
FIG. 17 is a schematic diagram outlining the configuration of a laser radar apparatus according to an eighth embodiment of the present invention.

FIG. 17 shows an outlined configuration of a laser radar apparatus 700 according to the present embodiment. The laser radar apparatus 700 is provided with a rotating deflection mechanism 740 including an oscillation unit 780, instead of the foregoing rotating deflection mechanism 640. The remaining components are the same or identical to those employed by the seventh embodiment, so the explanation will center on the oscillation unit 780.

The laser beam L1 from the laser diode 10 is reflected substantially at the right angle by the mirror 630, and is radiated to a central area of the deflection member 641 of the rotating deflection mechanism 740. In this mechanism 740, the deflection member 641 is rotatable on both the central axis 642a and the axis 641a perpendicular to the central axis 642a. The deflection member 641 acts as the deflection means for the incident light beam L1 and the incident reflected light from objects, which are the same as the described. The deflection member 641 is driven by the motor 650 to rotate.

Figure 18A:
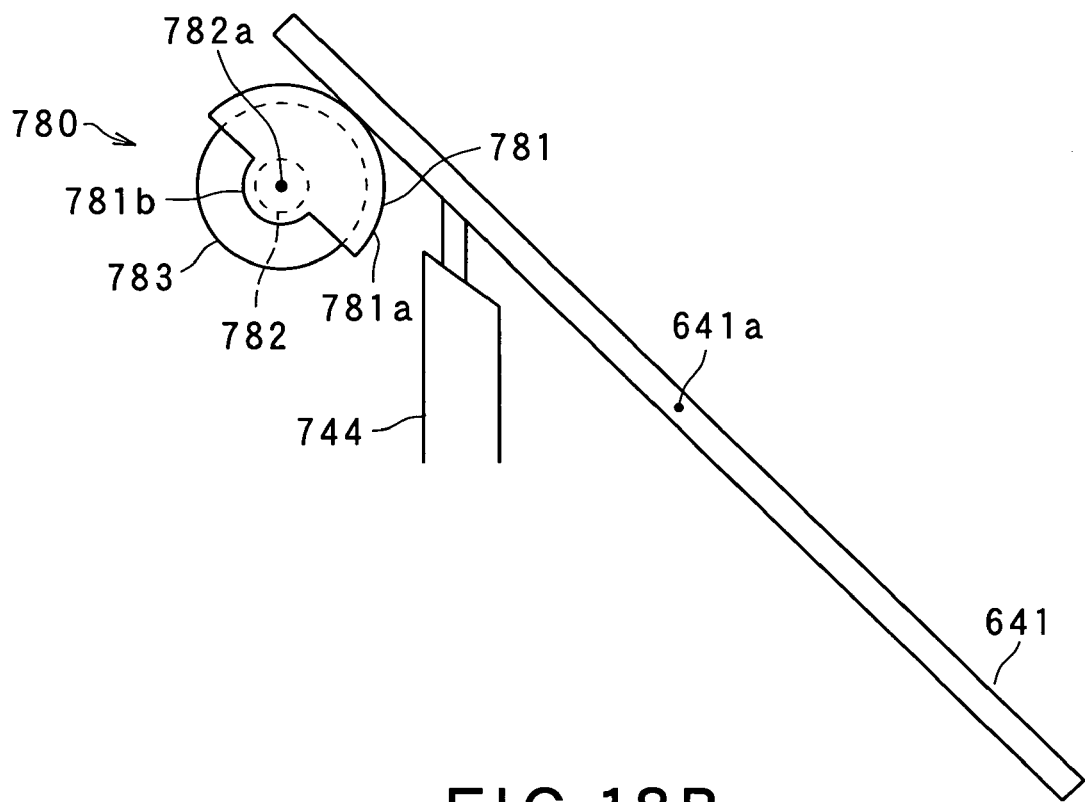
FIGS. 18A and 18B show the structures and operations a deflection member and an oscillation unit used in the eight embodiment.

As shown in FIG. 18A, the oscillation unit 780, which functions as the oscillation means, is provided with a rotation member 781 and a motor 782 rotating the rotation member 781 on the rotation shaft 783 of the motor 782. The rotation member 781 consists of two parts, but unified together so as to be rotatable on the rotation shaft as an axis. Such two parts are a large-radius part 781a of which radium is larger and a small-radium part 781b of which radium is smaller. As shown in FIG. 18A, the large-radium part 781a, which can come in contact with an end of the deflection member 641, and lifts up the end for the support when the contact is achieved. In contrast, as shown in FIG. 18B, the small-radium part 781b, which can come in contact with the end of the deflection member 641, and lifts down the end for the support when the contact is achieved.

Thus, the rotation of the motor 782 allows the oscillation unit 780 to realize a switchover between two stages. In one state, the large-radium part 781a supports the end of the deflection member 641 at a higher spatial position, as shown in FIG. 18A. In the other stage, the small-radium part 781b supports the end of the deflection member 641 at a lower spatial position, as shown in FIG. 18B. Thus the end of the deflection member 641 oscillates up and down. Since the deflection member 641 is supported to be rotatable on the axis (shaft) 641a located at the longitudinal center thereof, the oscillation of the end of the deflection member 641 permits the whole deflection member 641 to move in the tilting direction. The oscillation unit 780 is part of the direction changing means and the tilt means.

The drive of the motor 782 is controlled by the control circuit 70, so that the oscillation of the end of the deflection member 641 is controlled by the control circuit 70. Various motors such as a stepping motor or DC motors can be applied to the motor 782.

Figure 18B:
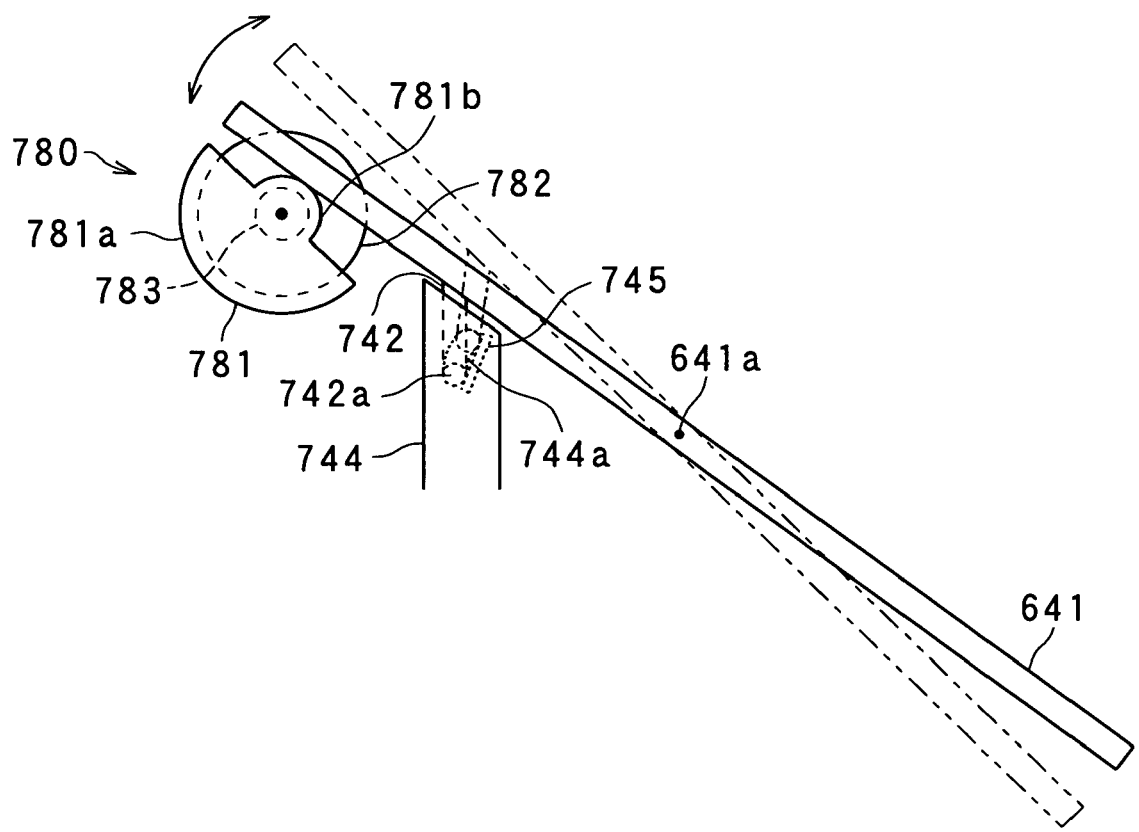

Furthermore, as shown in FIG. 18B, a extending member 742 is extended from the lower face of the deflection member 641. This extending member 742 is displacably engaged with a guide member 744 fixed to a frame 743 on the shaft member 642. Specifically, a protrusion 742a is formed on the end of the extending member 742, and a guide groove 744a is obliquely formed in the guide member 744. The protrusion 742a is fit with the guide groove 744a and guided therealong. The extending member 742 and the guide member, which function as a limiting means, are to limit the supported end of the deflection member 641 from oscillating outside a given oscillation range. In FIG. 17, the extending member 742 and the guide member 744 are omitted from being depicted.

To detect the tilt of the deflection member 641, a sensor 745 is placed. This sensor 745 is a known position sensor to detect the poison of the protrusion 742a. Because the position of the protrusion 742a is found, the tilt of the deflection member 641 can be decided uniquely, the tilt of the deflection member 641 can be detected by detecting the position of the protrusion 742a.

The oscillation unit 780 is rotated together with the deflection member 641 and powered by the commercial power supply 687 placed externally so as not to rotate. The power line 686 also electrically connects the commercial power supply 687 and oscillation unit 780 for the power transmission. The power line 686 is arranged in the same way as that explained in the previous embodiment. The remaining configurations are also the same as those in the previous embodiment.

In the present embodiment, the deflection member 641 is rotated every predetermined constant angle (for example, 1 degree) on the central axis 642a, so that the longitudinal (Y-axis directional) laser beam scanning in the external field is made at each rotated angle position. The longitudinal scanning is carried out by making the oscillation unit 780 oscillate the deflection member 641.

In other words, when the deflection member 641 is oscillated, the deflection member 641 changes its tilt positions between two tilted states shown by solid lines and dashed lines in FIG. 17. When the photodiode 20 detects the reflected light, the control circuit 70 reads a signal from the position sensor 745 to understand the tilt of the deflection member 641.

The control circuit 70 constantly monitors the rotated position of the motor 650, and understands it when the photodiode 20 detects the reflected light. Hence, by the control circuit 70, on the basis of both the signal from the signal from the sensor 745 and the rotated position of the motor 650, the direction of an object calculated. The distance from the object to the apparatus is also calculated in the same way as described.

In the present embodiment, the rotating deflection mechanism 740 is provided, so the laser beam L1 can be scanned three-dimensionally in the external field outside the present laser radar apparatus 700.

In particular, the deflection member 641 is tiltably supported by the tilt member and the given position (the end) of the deflection member 641 is oscillated by the oscillation unit 780 in a controlled manner under the control of the control circuit 70. Thus the deflection member 641 is held stably and the tilt of the deflection member 641 is controlled reliably.

Further, the limit means limits the deflection member 641 from oscillating through the given oscillation range. Thus it is not necessary to change the incident direction of the laser beam to the deflection member beyond a necessary angle range, while still controlling the emitting direction of the laser beam from the deflection member 641 through the necessary desired angular range in the longitudinal direction, that is, the Y-axis direction along the central axis 642a.

The oscillation unit 780, which is able to rotate together with the deflection member 641, can be powered from the external power supply positionally fixed. Thus, as to this powering system, the advantages stated in the previous embodiment are gained in the present embodiment.

Ninth Embodiment

Figure 19:
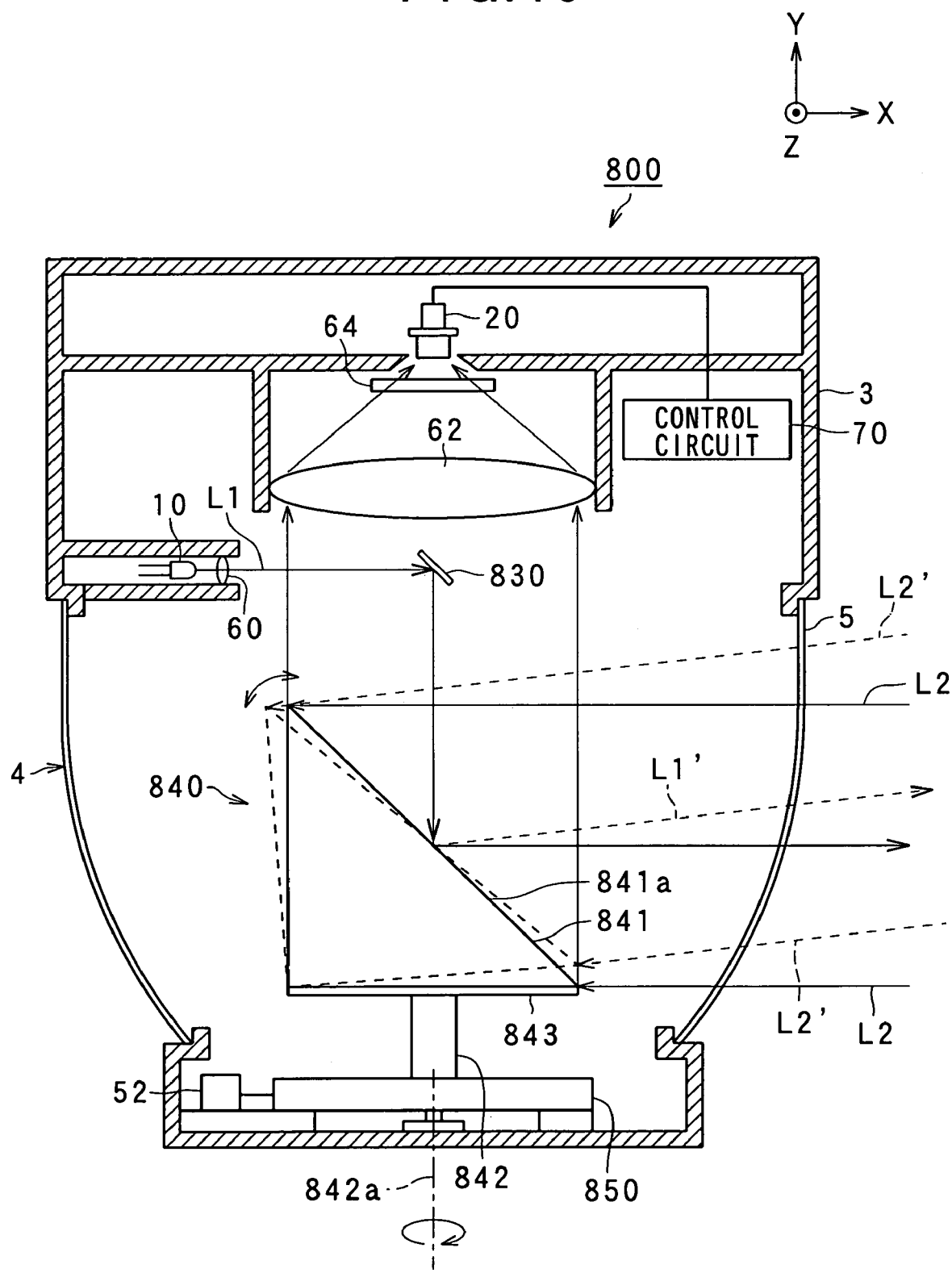
FIG. 19 is a schematic diagram outlining the configuration of a laser radar apparatus according to a ninth embodiment of the present invention.
Figure 20:
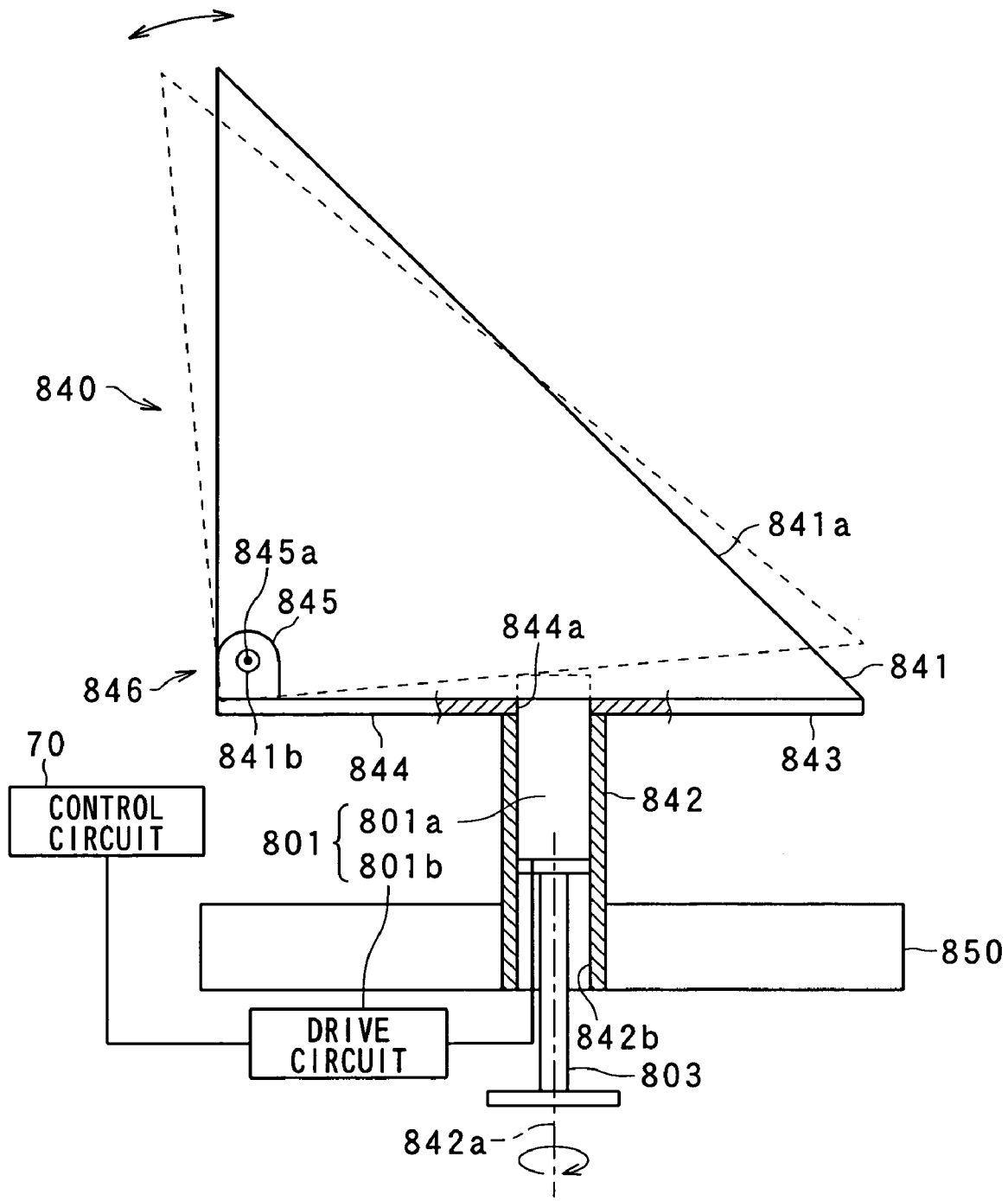
FIG. 20 explains a rotating deflection mechanism used in the ninth embodiment.
Figure 21:
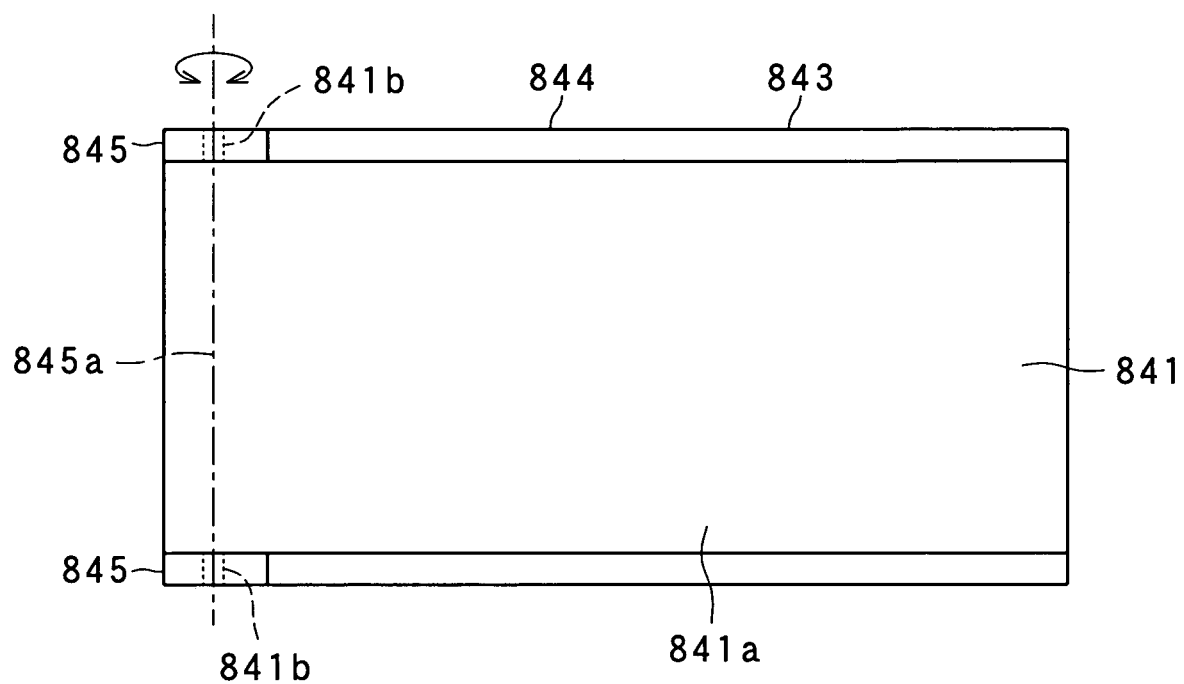
FIG. 21 is a plan view showing a deflection member.

Referring to FIGS. 19-21, a laser radar apparatus according to a ninth embodiment of the present invention will now described.

The present embodiment concerns another modification of how the deflection member is supported.

FIG. 19 outlines the configuration of a laser radar apparatus 800 according to the present embodiment. As shown, the present laser radar apparatus 800 is provided with a mirror 830, a rotating deflection mechanism 840 and a motor 850, in place of the mirror 630, the rotating deflection mechanism 740, and the motor 650 explained in the seventh and eighth embodiments. The control circuit 70 is also provided, but components to be controlled by this control circuit 70 and how to control such components are different from the previous configuration.

Of the replaced components, the motor 850 is coupled with a shaft member 842 which is different from the previous one.

The rotating deflection mechanism 840 has a central axis 842a on which this mechanism 840 is rotatable. In the same manner as the previous ones, the Y-axis is given to the direction of this central axis 842a and the same XYZ orthogonal coordinate system as that described is assigned to this apparatus 800.

The rotating deflection mechanism 840 is provided with a deflection member 841. Thus, the laser beam L1 emitted from the laser diode 10 in the X-axis direction is reflected almost perpendicularly by the mirror 830, and enters a central part of the deflection member 841 functioning as the deflection means. This member 841 is also rotatable on the central axis 842a. The deflection member 841 referents (i.e., deflects) the incident laser beam L1 toward a field observed outside the apparatus 800 and receives reflected light L2 from objects in the field. The deflection member 841 also reflects (i.e., deflects) the reflected light L2 toward the photodiode 20. The rotating deflection mechanism 840 is driven to rotate by the motor 850. The motor 850 and the control circuit 70 are combined to form the drive means to rotate the deflection member 841.

In the present laser radar apparatus 800, the rotating deflection mechanism 840 differs largely from that in the first embodiment, though its shape is similar to that in the first embodiment. As shown in FIGS. 20 and 21, this rotating deflection mechanism 840 is provided with the foregoing deflection member 841 which is a mirror, a support base 843 supporting the deflection member 841 thereon and a cylindrical shaft member 842 coupled with the support base 843. The deflection member 841 has a reflection surface 841a oblique to the central axis 842 serving as the rotation center of the deflection member 841. The deflection member 841 is rotatably supported by the support base 843 so as to be rotatable about a rotation center shifted from the central axis 842b.

The cylindrical shaft member 842, which is formed as the rotation shaft or a shaft coupled the rotation shaft of the motor 850, is cylindrical and an end coupled with the support base 843. The support base 843 is provided with a square plate member 844 and a pair of bearings 845 disposed on both width-directional ends at one length-directional end of the plate member 844. The plate member 844 is arranged perpendicularly to the central axis 842b. A hole 844a is formed at a position of the plate member 844 therethrough, in which the position is subjected to coupling with the cylindrical shaft member 842 so as to make the hole 844a communicate with a cylindrical bore 842b of the shaft member 842. A piezoelectric actuator 801 is arranged within the bore 842b to protrude upward therefrom.

On both width-directional sides of the deflection member 841, two protrusions 841b are fixedly formed to protrude outward. The protrusions 841b are held by the bearings 845, so that deflection member 841 is rotatable around a rotation shaft 845a. The bearings 845 and the protrusions 841b compose a rotating deflection mechanism 846, which functions as the tilt mechanism tiltably supporting the deflection member 841 around the rotation shaft 845a. The deflection member 841 and the support base 843, which are coupled with each other by the rotating deflection mechanism 846, can be rotated as one unit by the rotation of the cylindrical shaft member 842 driven by the motor 850.

The piezoelectric actuator 801 is a known actuator with a piezoelectric element which extends and contact in response to voltage to be applied. This piezoelectric actuator 801 has a piezoelectric driving element 801a and a drive circuit 801b which drives the driving element 801a. The drive circuit 801b is electrically connected to the control circuit 70 so that the drive circuit 801b applies voltage to the driving element 801a in reply to a command signal from the control circuit 70. The command signal from the control circuit 70 gives the applied voltage an amount to be controlled of the motion of the element 801a.

The piezoelectric driving element 801a is rotatable independently of the deflection member 841 and gives the oscillating action to the deflection member 841 at the fixed position in the laser radar apparatus 800. This element 801a is fixed on a support member 803 within the cylindrical shaft member 842. The support member 803 is secured on the casing directly or via any other members. And the cylindrical shaft member 842 is rotatable independently of the piezoelectric driving element 801a.

As shown in FIG. 20, the driving element 801a contained in the cylindrical shaft member 842 extends or contacts in response to the voltage to be applied, thus pushing the deflection member 841 or stopping the push to the deflection member 841. Thus, the command signal is able to oscillate the given part (i.e., the position pushed by the element 801a) of the deflection member 841.

Thus, in the rotating deflection mechanism 840, depending on the command signal in which the amount to be controlled is reflected, the protruding (extension/contraction) amount of the driving element 801a is adjusted. In response to this adjustment, the deflection member 841 is tilted around the rotation shaft (axis) 845a perpendicular to the central axis 842b. This tilting action causes the incident direction of the laser beam L1 to the reflection surface 841a to change relatively to the laser beam L1, resulting in that the direction of the laser beam from the deflection member 841 is changed (i.e., scanned) in the cognitional (Y-axis) direction along the central axis 842b. This scanning is illustrated by solid lines L2 and dashed lines L2'. The solid lines L2 and dashed lined L2' show the travel of the laser beam and the reflected light, which is obtained when the deflection member 841 takes a tilted attitude shown by a solid line and a tilted attitude shown by a dashed line, respectively. The Y-axis directional width between the solid lines L2 or dashed lines L2' shows a range through which the reflected light is taken in.

Depending on the protruded length (extension/contraction) of the piezoelectric driving element 801a, the degree of tilt of the deflection member 841 is decided. Thus, controlling the command signal leads in a precise control of the tilt of the deflection member 841. The control circuit 70 is responsible for controlling the motor 850, so that this circuit 70 knows information showing the rotated state of this motor 850. Hence, the control circuit 70 is able to calculate the rotated position of the cylindrical shaft member 842, thereby calculating the three-dimensional direction of the laser beam emitted form the deflection member 814 into a field to be observed. The distance from an object to the apparatus can be calculated as well in the same way explained.

In the present embodiment, the part of the deflection member 841 is given the push force by the piezoelectric driving element 801a which responds to the drive signal from the drive circuit 801b which is the under control of the control circuit 70. That is, the extension and contraction of this element 801a cause the deflection to be tilted and not to be tilted in a controlled manner. This tilting action allows the laser beam L1 from the apparatus 800 to be scanned in the longitudinal direction. Moreover, this longitudinal scanning can be performed at each angular position on the XY plane, thereby a three-dimensional high-precision scanning action in the field outside the apparatus 800.

For scanning the longitudinal direction, it is enough that only part of the deflection member 841 is pushed or not pushed, which is relatively simple in its structure and accurate in controlling the push, that is, the oscillating action.

Further, the extension/contraction means is realized by using the piezoelectric element, thus preventing the means from being excessively large in size, but still maintaining the oscillation control at higher level.

(Modifications)

Figure 22:
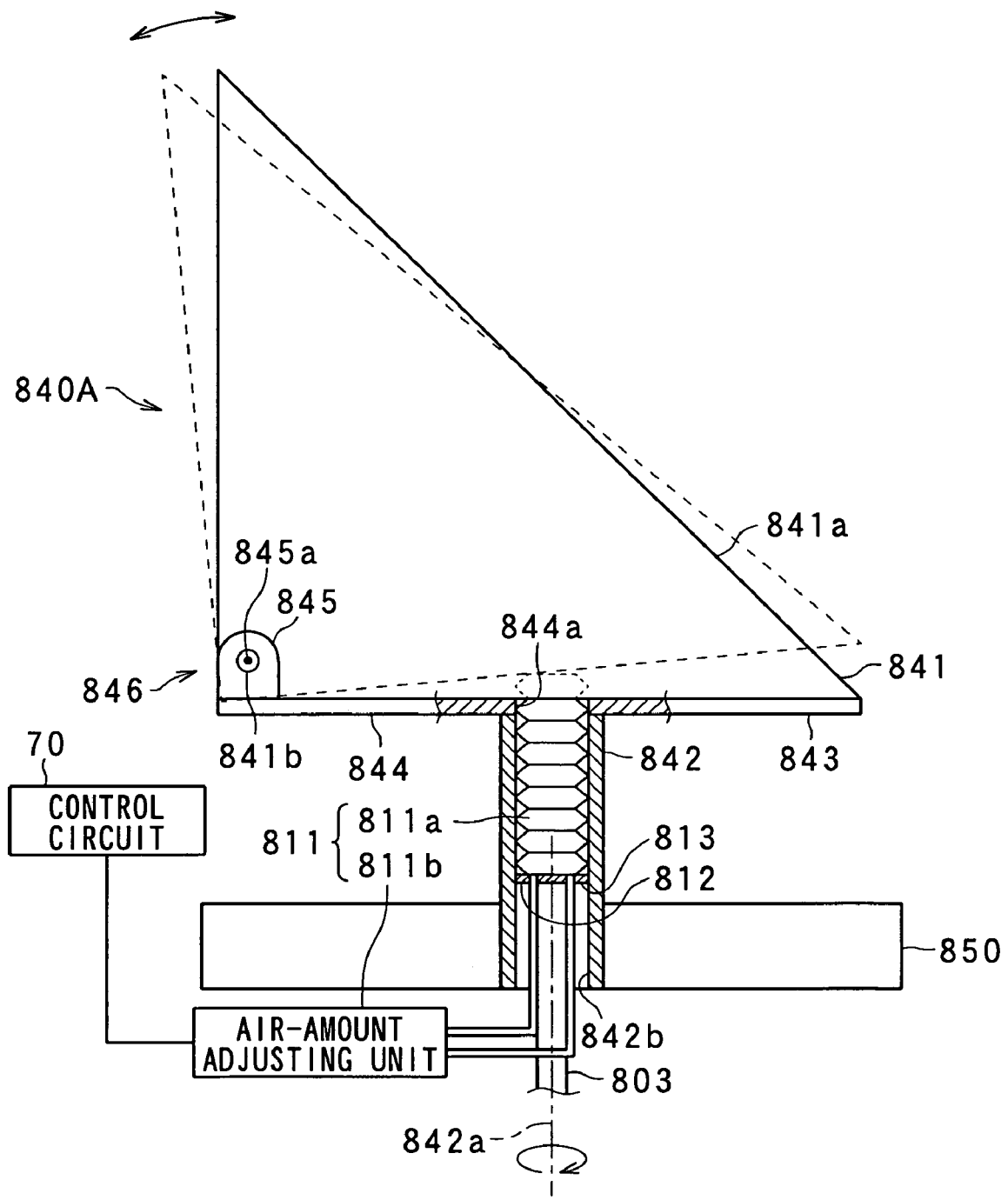
FIG. 22 explains a rotating deflection mechanism according to a first modification of the ninth embodiment.
Figure 23:
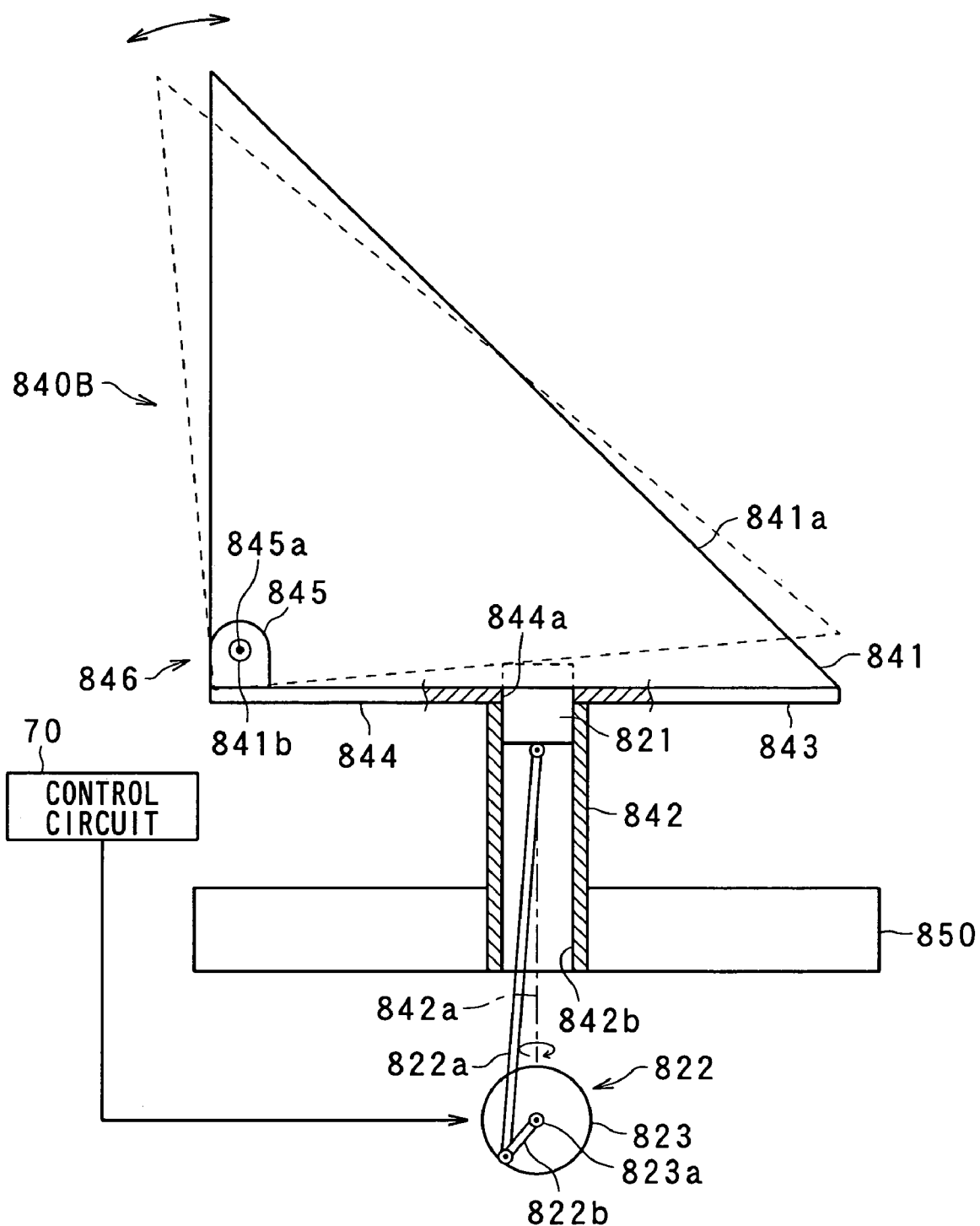
FIG. 23 explains a rotating deflection mechanism according to a second modification of the ninth embodiment.

Referring to FIGS. 22-23, modifications of the ninth embodiment will now be described.

(First Modification)

FIG. 22 shows a first modification, in which there is provided another type of rotating deflection mechanism 840A.

As shown in FIG. 22, this rotating deflection mechanism 840A is different from the previous one 840 in that a size-changeable member 811a is adopted as the extension/contraction member, instead of the piezoelectric driving element 801a and an air-amount adjusting unit 811b is adopted as the extension/contraction-member drive means, instead of the drive circuit 801b. The remaining members are the same at those in the ninth embodiment. Controlling the drive of the air-amount adjusting unit 811b allows a given part of the deflection member 841 to be controlled in its oscillation. The given part is pushed by the size-changeable member 811a.

The rotating deflection mechanism 840A is constructed in the same way as that in FIG. 20.

The size-changeable member 811a is contained in the cylindrical bore 842b of the cylindrical shaft member 842 so as to intrude in the hole 844a of the plate member 844. The outer size of this member 811a can be changed in accordance with the amount of air to be charged therein, so that this change appears as a change in the protrusion form the plate member 844. This size-changeable member 811a has an accordion-shaped outer appearance and two ports consisting of a charge port 812 and a discharge port 813 located on both ends. The charge port 812 is for supplying this member 811a with air discharged by the air-amount adjusting unit 811b. The discharge port 813 is used when the air contained in the member 811a is discharged into the air-amount adjusting unit 811b.

The control circuit 70 is configured to command the air-amount adjusting unit 811b to adjust the amount of air to be charged or discharged using a command signal to the unit 811b.

The air-amount adjusting unit 811b, which functions as the gas-amount adjusting means, includes a first flow amount sensor detecting an amount of air supplied to the size-changeable member 811a via the port 812, a second flow amount sensor detecting an amount of air discharged from the member 811a via the port 813, an air supply device, such as an air pump and an air compressor, supplying the air, and electromagnetic valves or others selectively opening and closing air supply passages and air discharge passages.

In the configuration according to this modification, the deflection member 841 is rotatable independently of the size-changeable member 811a, which oscillates the deflection member 841 at the given location in the apparatus. This member 811a is fixed on the support member 803 within the cylindrical shaft member 842 in the same manner as that described in FIG. 20. Thus, this member 842 is rotatable around the size-changeable member 811a.

In this modification, depending on the amount of air contained in the size-changeable member 811a, the tilt of the deflection member 841 is decided. Making the control circuit 70 control the amount of air supplied from the air-amount adjusting unit 811b makes it possible to accurately adjust the tilting angle of the deflection member 841. By this tilting action, the laser beam emitted from the apparatus can scan in the longitudinal (Y-axial) direction an external field outside the a apparatus at each of the angular stepping angular positions along the XY plane, providing the three-dimensional scanning. This scanning results in an easier and more reliable measurement of the three-dimensional direction of each object and the distance therefrom in the same manner described.

Hence, the configuration of this modification provided the same or similar advantages as or to those in the ninth embodiment. In other words, the configuration can be simplified and larger amounts of extension/contraction can be secured easily.

(Second Modification)

FIG. 23 shows a second modification, in which there is provided another type of rotating deflection mechanism 840B.

As shown in FIG. 23, this rotating deflection mechanism 840B is different from the previous one 840 in the oscillation means and the tilt control means. The remaining members are the same at those in the ninth embodiment.

The modification provided in FIG. 23 comprises a transmission member 821 transmitting a push force to the deflection member 841, a reciprocating mechanism 822 reciprocating the transmission member 821, and a motor 823 driving the reciprocating mechanism 822. This motor 823 exemplifies the reciprocating-mechanism drive means. By the reciprocating motion of the transmission member 821, the deflection member 841 can be tilted.

The transmission member 821 is fit into the cylindrical shaft member 842 and can be reciprocated therein in the up and down direction, that is, the Y-axis direction. This transmission member 821 is rotatably coupled with an arm 822a, which is rotatably coupled with another arm 822a. The second arm 822b is driven to rotate by the motor 823. Thus the arms 822a and 822b, transmission member 821, and cylindrical shaft member 842 constitute a crank and piston mechanism to covert the rotation motion to the linear motions. The transmission member 821 is forced to move up and down depending on the rotations of the motor 823, changing amounts of protrusion of the transmission member 821 emerging from the plate member.

A combination of the rotating deflection mechanism 846, transmission member 821, reciprocating mechanism 822, and motor 823 exemplifies the direction changing means and the tilt means. Further, the transmission member 821, reciprocating mechanism 822, and motor 823 exemplifies the oscillation means that oscillates the given part of the deflection member in the up and down direction.

The remaining components are the same as those in the first modification.

Accordingly, the second modification provided the same or similar advantages as or to those in the first modification. The use of the transmission member 821 is effective for pushing the part of the deflection member 841, which is still confined to the simplified structure. The motor 823 is driven by the control circuit 70, which allows the given plate part to oscillate. The tilt of deflection member 841 can thus be controlled with precision, with the result that it is possible to perform an accurate three-dimensional detection of objects.

Tenth Embodiment

Referring to FIGS. 24-27, a laser radar apparatus according to a tenth embodiment of the present invention will now described.

Figure 24:
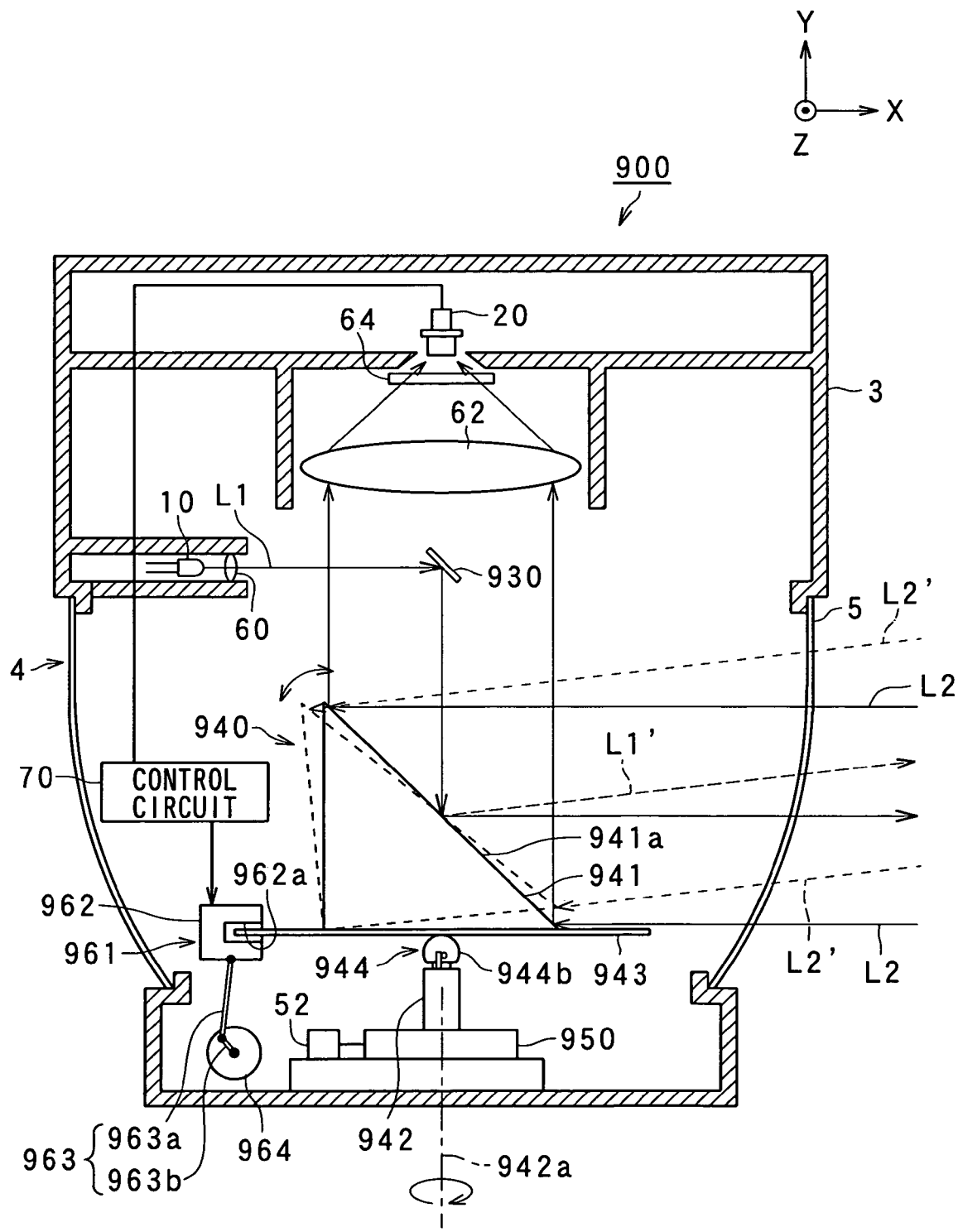
FIG. 24 is a schematic diagram outlining the configuration of a laser radar apparatus according to a tenth embodiment of the present invention.

FIG. 24 outlines the configuration of a laser radar apparatus 900 according to the present embodiment. This configuration is different from that shown in the seventh-ninth embodiments in the rotating deflection means and oscillation means. The remaining parts are the same or similar as or to those in the seventh-ninth embodiments, which are omitted from explaining in detail.

As shown in FIG. 24, the laser radar apparatus 900 is provided with, as some of new components, a rotating deflection mechanism 940, a motor 950 having a shaft member 942, and first and second edge oscillating units 961 and 965. The shaft member 942 is different from that in the first embodiment, but the motor 950 itself is the same as that in the first embodiment.

The rotating deflection mechanism 940 has a central axis 942a on which this mechanism 940 is rotatable. The direction along the central axis 942a is set to the Y-axis and the remaining X- and Z-axis are set to the same as those described already.

To be specific, the rotating deflection mechanism 940 includes a deflection member 941 (serving as the deflection means) which is a mirror and rotatable on the central axis 942a, a shaft member 942, a flat plate-like flange 943 serving as a base plate, and a coupling mechanism 944. The shaft member 942 is driven to rotate by the motor 950. The flange 943 is unified with the deflection member 941 as one unit. The coupling mechanism 944 couples the shaft member 942 and the flange 943.

The deflection member 941 has a flat reflection surface 941a which is oblique to the central axis 942a and located to receive the incident laser beam L1. The reflection surface 941a functions in the same way as that in the first embodiment. The deflection member 941 responds to the oscillation of the oscillation means late described such that the tilting angle of the surface 941a to the central axis 942a is controllably changed. In response to the drive of the moor 950, the deflection member 941 is also rotatable on the central axis 942a which is along the Y-axis.

The flange 943 exemplifies the unified swing member. As shown in FIGS. 25 and 27, the flange 943 is formed to have an almost circular shape having an outer edge which extends more than the outer edge of the deflection member 941. The flange 943 is rigidly coupled with the lower surface portion of the deflection member 941 so that the flange 943 can be rotated and oscillated together with the deflection member 941. Additionally, the flange 943 is linked with the shaft member 942 via the coupling mechanism 944.

The shaft member 942 is produced as the rotation shaft of the motor 950. On the top of the shaft member 942, the coupling mechanism 944 is arranged. As illustrated in FIGS. 25A, 25B and 26A, 26B, the coupling mechanism 944 is a ball joint, which is constructed like shown in FIG. 7. That is, the coupling mechanism 944 includes a spherical portion 944a and a spherical shell portion 944b which are assembled into a spherical bearing stud and socket, which is described in FIG. 7. The flange 943 and the coupling mechanism 944 compose the tilt mechanism which tiltably supports the deflection member 941.

Figure 26A:
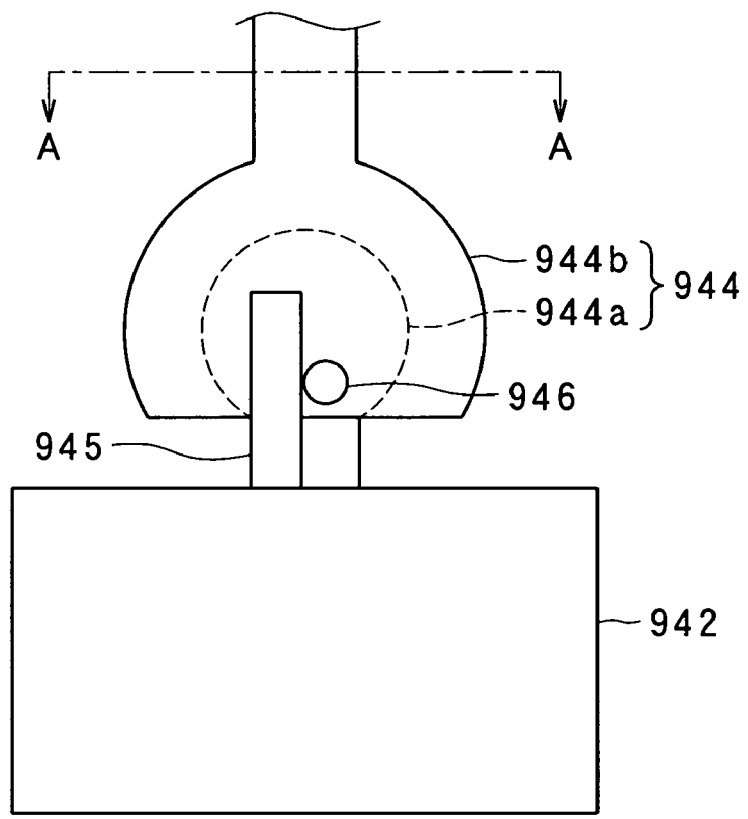
FIGS. 26A and 26B each explain a coupling mechanism by a side view and a sectional view, respectively.
Figure 26B:
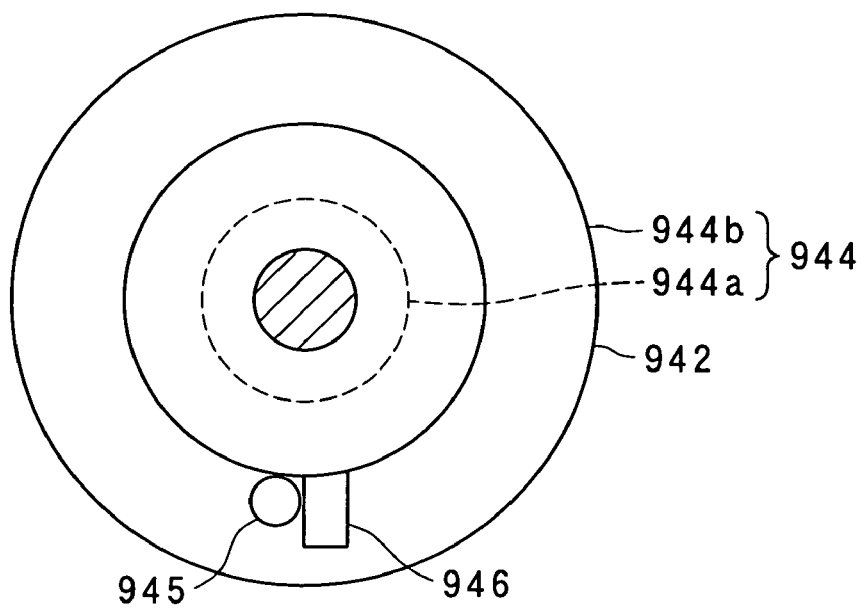

As shown in FIG. 26, the shaft member 942 is provided with a protrusion 945 to transmit the rotation force of the shaft member 942 to the spherical shell portion 944b of the coupling mechanism 944 (practically, to a protrusion 946 on the spherical shell portion 944b). The protrusion 945 from the shaft member 942 forcibly rotates around the spherical shell portion 944b by the rotation of the shaft member 942. The configuration shown in FIGS. 26A and 26B is just one example, so any other configurations can be adopted provided that the flange 943 is swingably held during which time the rotation of the shaft member 942 can be transmitted to the flange 943. By way of example, a universal joint may be employed to couple the flange 943 and the shaft member 942.

Further, as shown in FIGS. 24, 25A, 25B and 27, the first and second edge oscillating units 961 and 965 are provided as the edge oscillating means to oscillate (i.e., lift up and down) the edge of the flange 943. The first edge oscillating unit 961 includes a transmission member 962 transmitting a force to the deflection member 941 via the flange 943, a reciprocating mechanism 963 reciprocating the transmission member 943, and a motor 964 driving the reciprocating mechanism 963. This first edge oscillating unit 961 is in charge of oscillating (i.e., lifting up and down) a first edge position of the flange 943, so that the deflection member 941 can be oscillated up and down in an oblique direction to the central axis 942a.

Figure 27A:
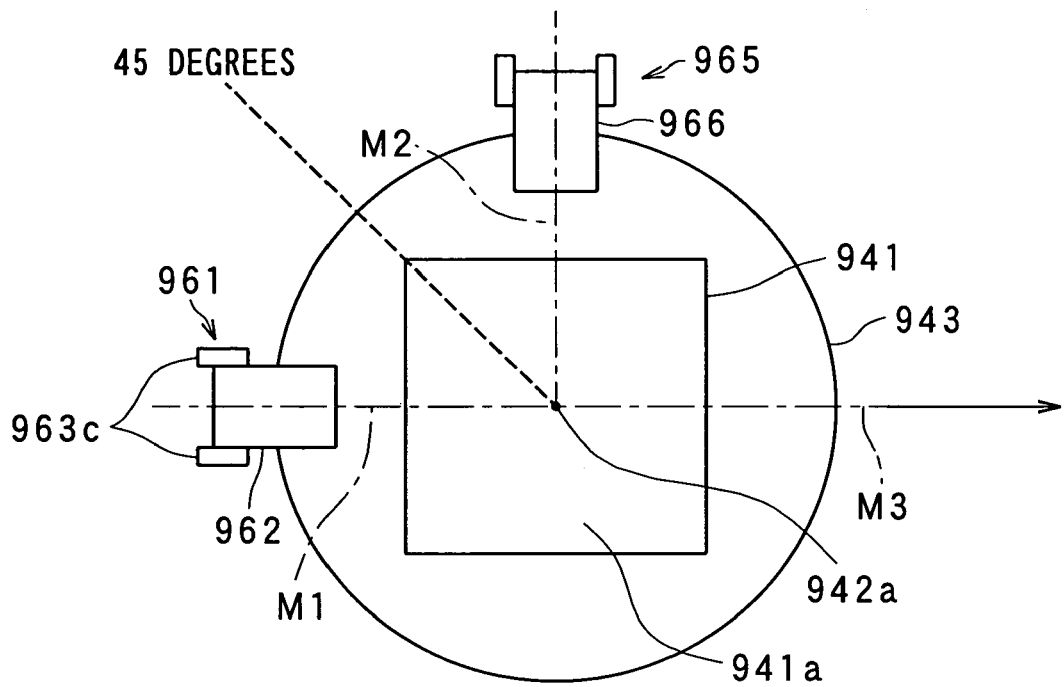
FIGS. 27A and 27B each explain the rotation of a deflection member and the oscillating operations to the deflection member.
Figure 27B:
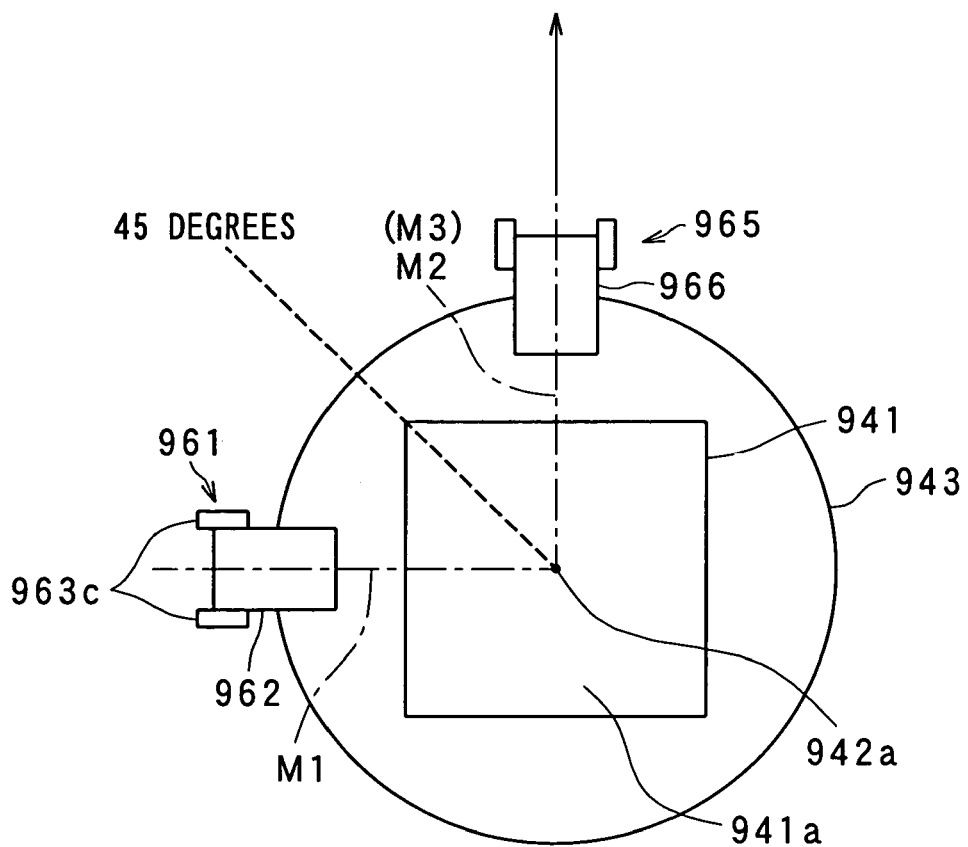

The transmission member 962 is typically shown in FIGS. 25A, 25B, 27A and 27B, in which this member 962 is fit in grooves of both-side guide member 963c arranged at a fixed position in the apparatus 900 (refer to FIGS. 27A and 27B). The guide members 963c are in parallel with the central axis 942a, so that the transmission member 962 can be guided by the guide member 963c so as to be slid in the up and down direction. An arm 963a is rotatably linked with this transmission member 962, and another arm 963b is rotatably linked with this arm 963a (refer to FIGS. 25A and 25B). The arms 963a and 963b and the guide member 963c compose the reciprocating mechanism 963.

Figure 25A:
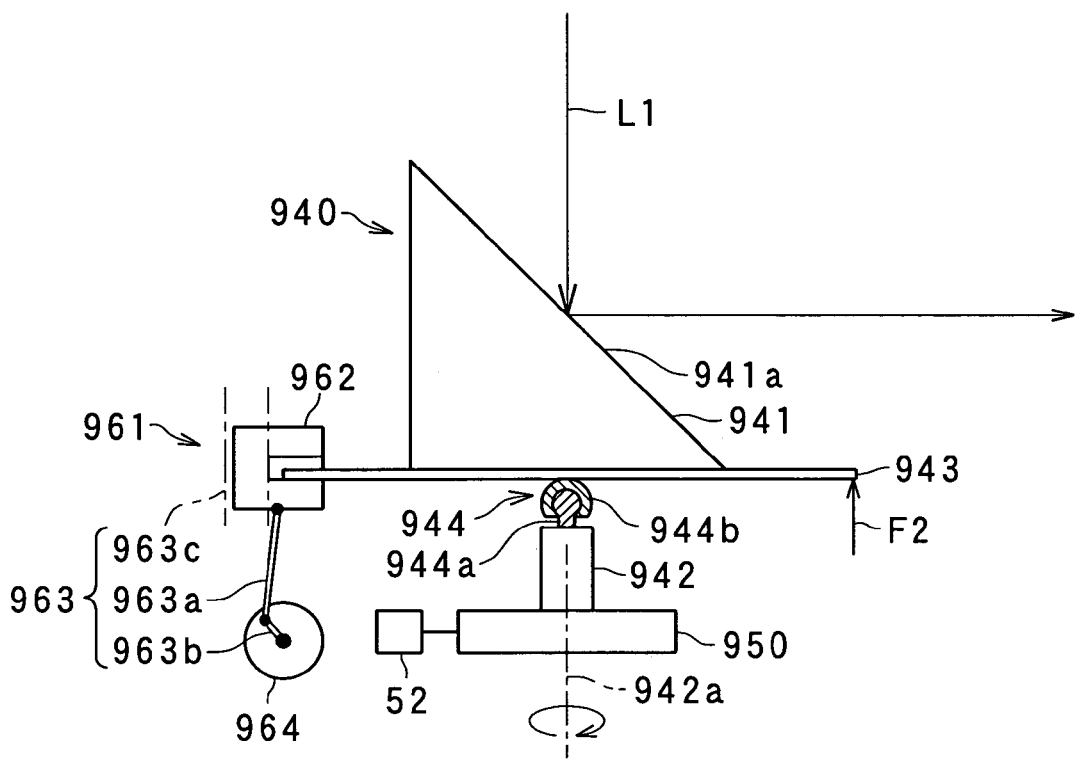
FIGS. 25A and 25B each explain the operations of a rotating deflection mechanism used in the tenth embodiment.
Figure 25B:
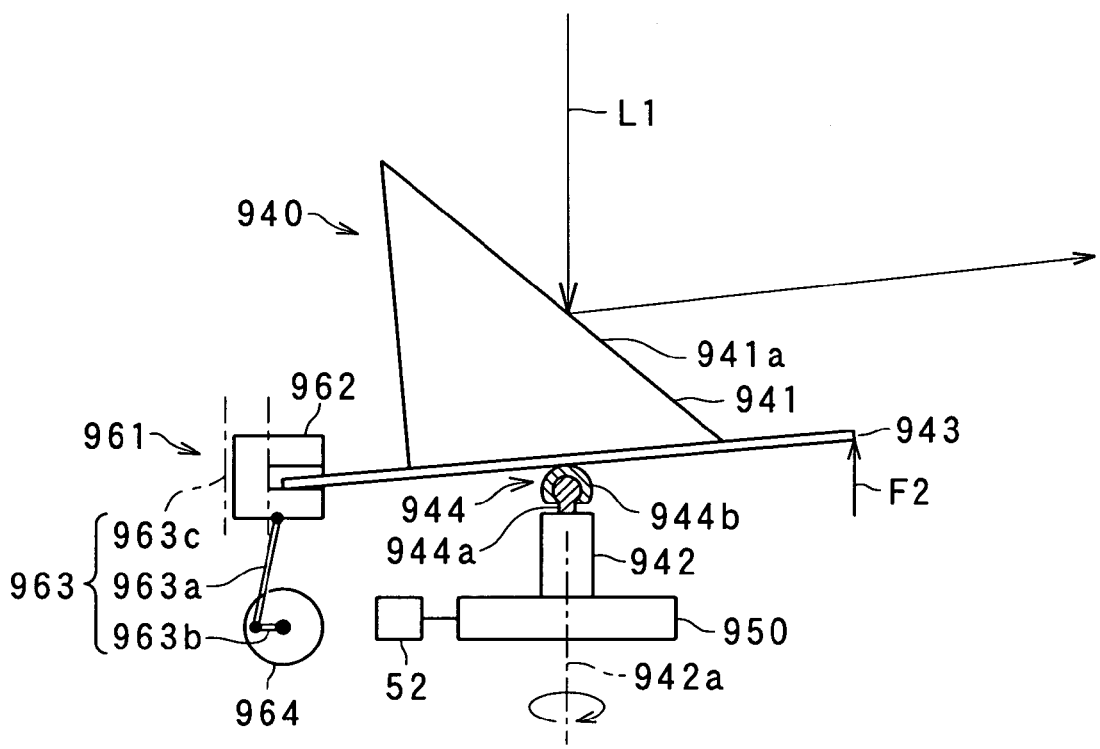

The arm 963b is driven by a motor 964, so that the reciprocating mechanism 963 converts the rotating motion of the motor 964 to the liner motion of the transmission member 962. The transmission member 962 has a groove 962a into which the edge of the flange 943 is located with a predetermined-height clearance left therein. Thus the flange 943 is allowed to rotate in response to the drive of the motor 950 under the condition that its edge is still located in the groove 962a. Hence rotating the motor 964 to a given first rotation position makes the reflection surface 941a of the deflection member 941 keep a first oblique attitude shown in FIG. 25A. Rotating the motor 964 to a given second rotation position allow the reflection surface 941a to keep a second oblique attitude as shown in FIG. 25B. A spring may be placed to push the flange 943 at the opposite position to the transmission member 962 shown by an arrow F2, which gives a stable positioning action to the deflection member 941.

The second edge oscillating unit 965 is shown in FIG. 27A, though part of which is omitted from the drawing. This unit 965 is identical to that of the first edge oscillating unit 961 and includes a transmission member 966 to give a up-and-down push force to the flange 943 as well as a reciprocating mechanism (not shown) and a motor (not shown). The first and second edge oscillating units 961 and 965 are located separately from each other as shown in FIGS. 27A and 27B. The first edge oscillating unit 961 is located at a first edge position shown by M1, while the second one 965 is located at a second edge position shown by M2 which is 90 degrees apart from M1 about the central axis 942a (refer to FIG. 27A). The references M1 and M2 show imaginary planes each including the central axis 942a and passing the transmission member 962 (966).

The control circuit 70 includes a microcomputer with a CPU and memories, as described in the first embodiment, and is configured to perform given software programs for detecting objects and controlling the drive of the various motors or others. Such programs are installed beforehand in a memory of the microcomputer.

In the present laser radar apparatus 900, when the deflection member 941 is located at given rotation positions, the second edge oscillating unit 965 woks to oscillate the flange 943. However, the deflection member 941 is located at rotation positions other than the given rotation positions, the first edge oscillating unit 961 works. This separate operation is achieved by the control circuit 70 which controls the drive of the various motors.

Specifically, the given rotation positions are decided as rotation positions which permits an angle between another imaginary plane M3 and the foregoing imaginary plane M1 to be equal or large to or than a given threshold (for example, 45 degrees), where the third imaginary plane M3 is a plane including the central axis 942a and being perpendicular to the reflection surface 941a. In this case, as shown in FIG. 27B, the second edge oscillating unit 965 oscillates the edge of the flange 943. As shown FIG. 27A, in the cases other than the above, that is, when the angle between the planes M3 and M1 is smaller than the given threshold, the first edge oscillating unit 961 oscillates the edge of the flange 943.

FIG. 24 shows the case in which the angle between the imaginary planes M1 and M3 is smaller than the threshold and the first edge oscillating unit 961 is in operation. That is, when this unit 961 is driven to the state shown in FIG. 24, the deflection member 941 is located as shown by a solid line, so that the laser beam is emitted from the apparatus 900 as a solid line and the reflected light returns as shown by solid lines L2. In this situation, when the unit 961 is driven to a new state to allow the deflection member 941 to be oblique as shown by dashed line in FIG. 24, the path of the laser beam is changed to L1' and the path of the reflected light is changed to L2'.

This means that the laser beam L1 is transmitted in a specified direction in the XZ plane and scanned in the longitudinal (Y-axis) direction in the field outside the apparatus 900. This scanning is carried out repeatedly at the next angular position in the XZ plane using the first or second edge oscillating units 961 or 965, resulting in the three-dimensional scanning of the field.

Thus, the present embodiment provides the same or identical operations and advantages to those in the first embodiment. Additionally, the oscillation means is divided into the first and second edge oscillating units 961 and 965 which selectively work at the different edge positions and at the different angle zone. Hence the rotationally driving mechanism for the deflection mechanism 940 can be made compact in size and less in weight, thus improving accuracy in rotation control and speeding up the rotation. The motor 950 can also be made compact in size. In addition, since the first and second edge oscillating units 916 and 965 oscillates the flange 943 at the different fixed positions in the apparatus 900, so that power supply and control signal transmission can be made easier, compared to the structure in which the oscillation means and deflection means are unified together.

The shaft 942 and the flange 943 can be rotated together, while the oscillation means is divided into the units 961 and 965 so as to oscillate at the different edge portions. Thus the oscillating means and the deflection means can be worked separately, so the oscillation means can be located at given, but desired positions in the apparatus, while still providing the oscillating and deflecting functions. The flange 943 is swung at its edge portions, resulting in that the force for the oscillation becomes smaller, compared to the case where the oscillating force is applied to the central part of the flange. This is effective for producing a compact, lower parts-cost apparatus.

As described, the first and second edge oscillating unit 961 and 965 are separated from each other to oscillate (i.e., apply a force) the first and second edge positions and are selectively used depending on the rotation position of the deflection member 941. As a result, the flange 943 can be swung (tilted up and down) along multiple imaginary planes, not limited to being along a particular pane, increasing the degree of swinging. The deflection member 941, rotated together with the flange 943, can also be swung depending on each rotation position in the XZ (horizontal) plane, leading to a preferred scanning in the Y-axis (longitudinal) direction.

Eleventh Embodiment

Figure 28:
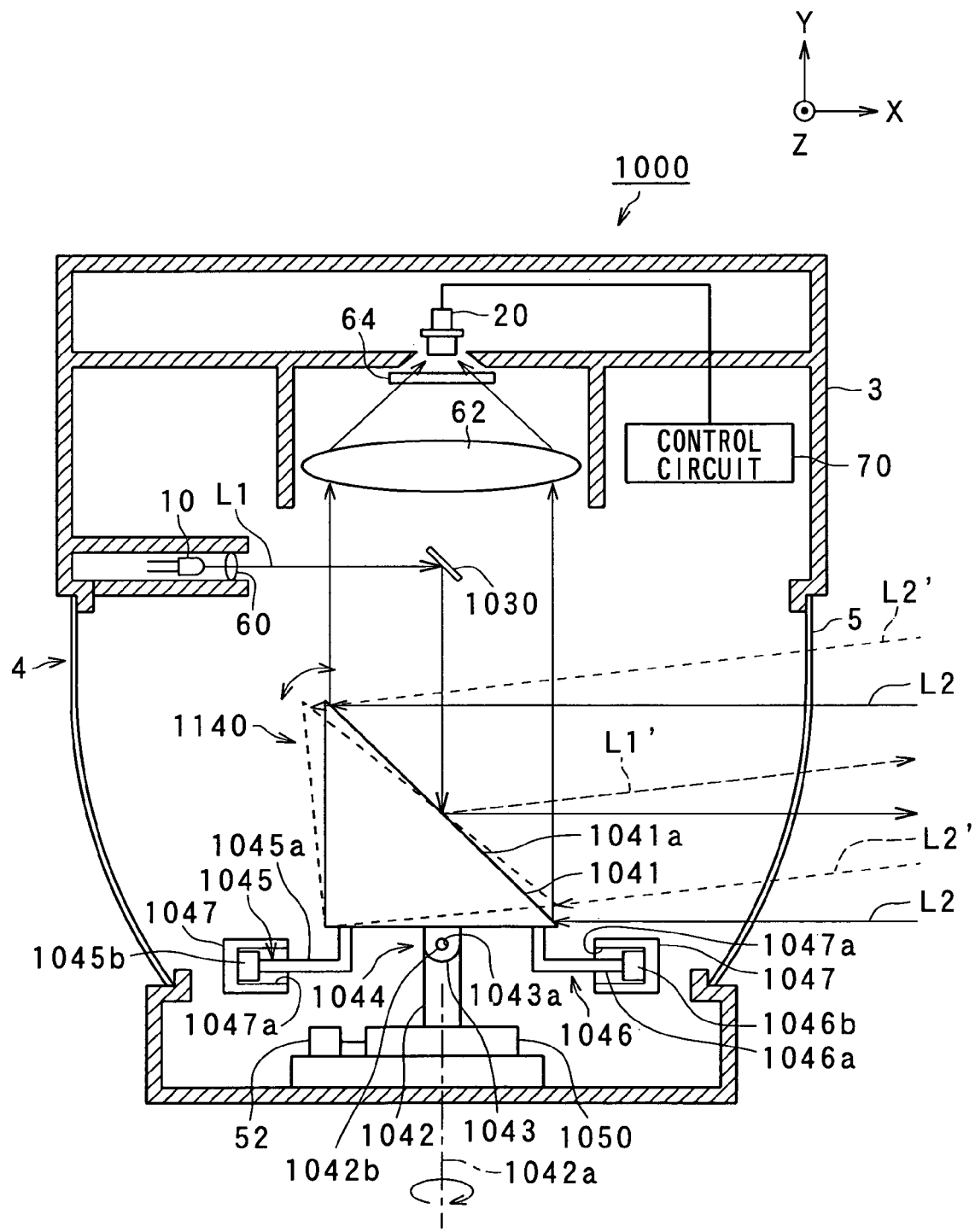
FIG. 28 is a schematic diagram outlining the configuration of a laser radar apparatus according to an eleventh embodiment of the present invention.
Figure 29:
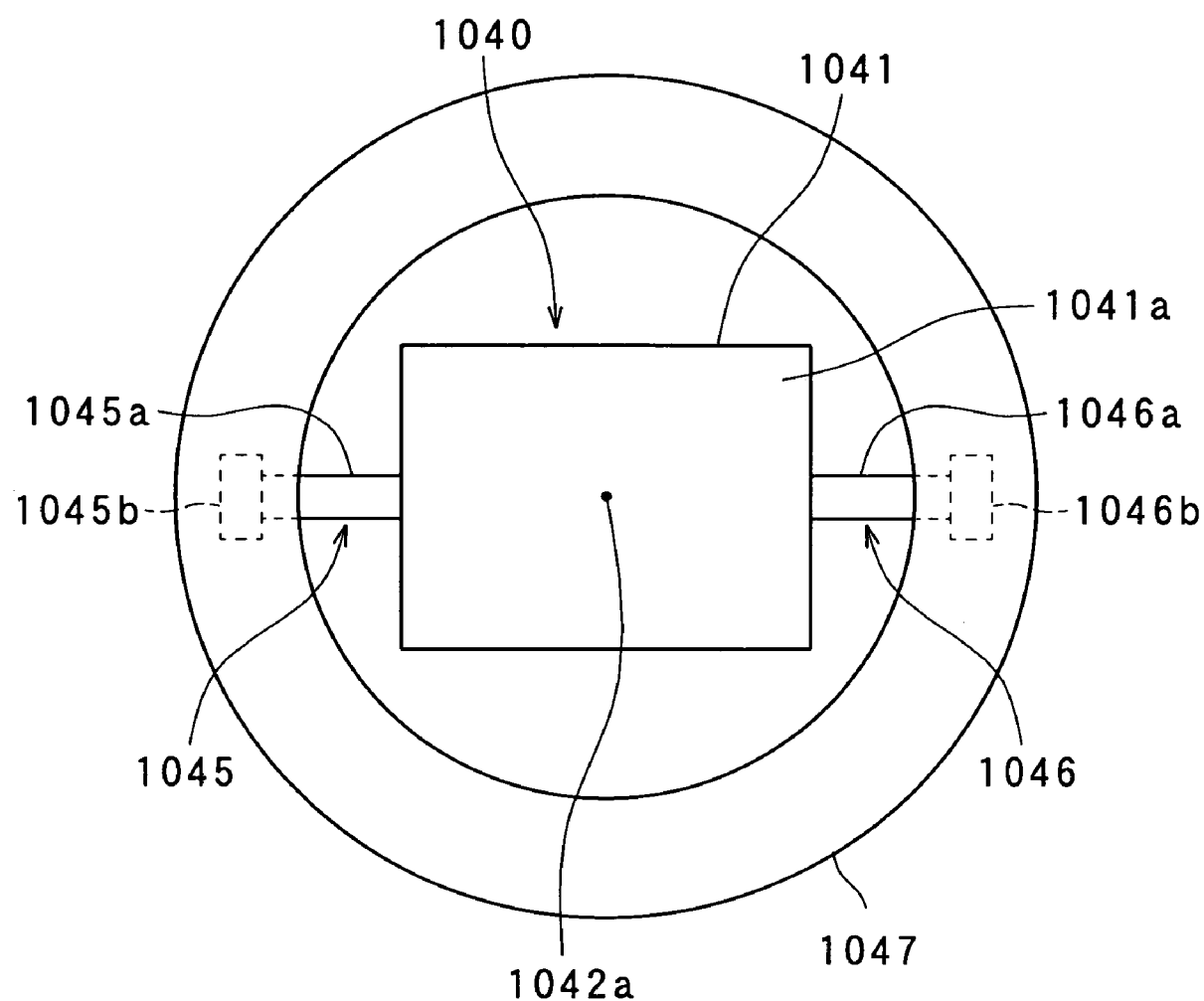
FIG. 29 is a plan view explaining the rotation of a deflection member and the guide for the rotation.
Figure 30:
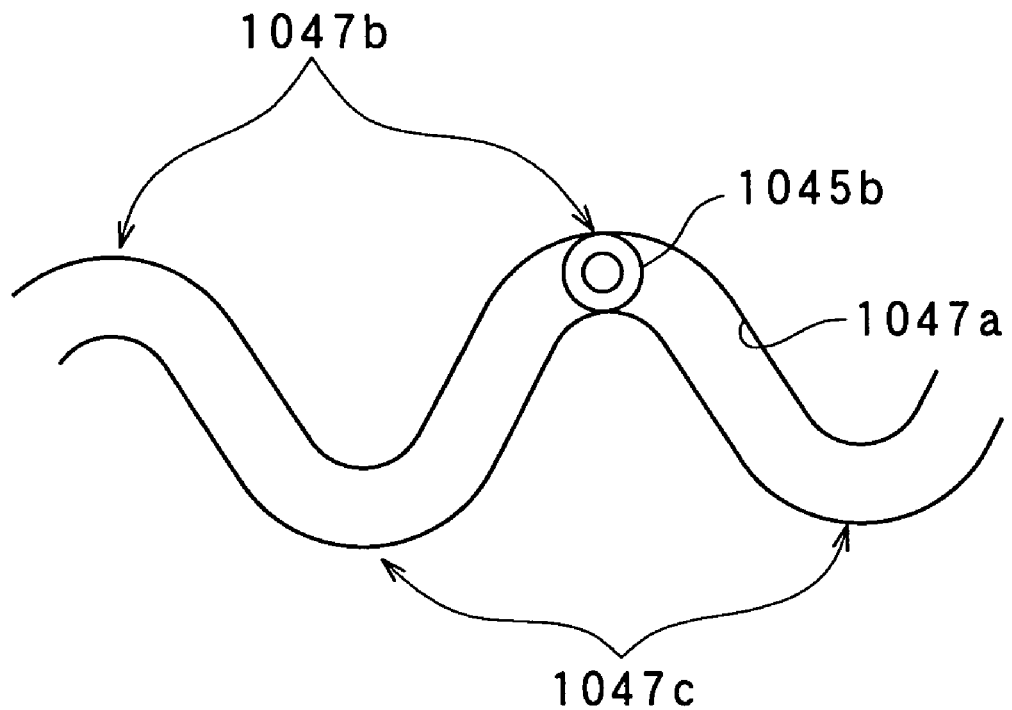
FIG. 30 explains a guide passage used in the eleventh embodiment.

Referring to FIGS. 28-30, a laser radar apparatus according to an eleventh embodiment of the present invention will now described.

FIG. 28 outlines the configuration of a laser radar apparatus 1000 according to the present embodiment. This configuration is different from that shown in the seventh-tenth embodiments in the rotating deflection means. The remaining parts are the same or similar as or to those in the seventh-tenth embodiments, which are omitted from explaining in detail.

As shown in FIG. 28, the laser radar apparatus 1000 is provided with a mirror 1030 and a rotating deflection mechanism 1040 having a deflection member 1041 and a central axis 1042a, to which the Y-axis is assigned like the foregoing apparatuses. The mirror 1030 is arranged to receive the laser beam L1 emitted from the laser diode 10 in the X-axis direction and reflect it almost perpendicularly toward the rotating deflection mechanism 1040. The incident laser beam L1 onto this mechanism 1040 enters a central part of the deflection member 1041.

The rotating deflection mechanism 1040 includes the deflection member 1041 described above, a shaft member 1042, a protruding member 1043 protruding from the deflection member 1041, a coupling mechanism 1044, and a motor 1050 driving the shaft member 1042. The deflection member 1041 is a mirror.

The deflection member 1041 is rotatable on the central axis 1042a by the drive of the motor 1050, and its deflection actions are the same as that described before.

The coupling unit 1044 includes protrusions 1042a protruding from both sides of the shaft member 1042 and a bearing 1043a rotatably supporting the protrusions 1042b, giving a rotatable support between the shaft member 1042 and the protruding member 1043. The coupling unit 1044 serves as a support mechanism for tiltably supporting the deflection member 1041.

The deflection member 1041, which is tiltably supported by the coupling unit 1044, includes a reflection surface 1041a oblique to the central axis 1042a, so that the angle between the reflection surface 1041a and the central axis 1042a changes as the deflection member 1041 is made to tilt. The protrusions 1042b provide a rotation axis on which the protruding member 1043 rotates. This rotation axis is perpendicular to the central axis 1042a, i.e., the Y-axis. Hence, the motor 1050 is driven to rotate, the shaft member 1042 is rotated, and the coupling unit 1044 is rotated, which enables the imaginary rotation axis passing the protrusions 1042b to rotate around the central axis 1042a in the XZ plane.

The laser radar apparatus 1000 is further provided with a pair of rotation units 1045 and 1046, which are arranged below the deflection member 1041 and configured to rotate together with the deflection member 1041. Each of the rotation units 1045 and 1046 extends radially from the rear face of the bottom of the deflection member 1041 so as to step away from the central axis 1042a in the XZ plane lower in level than the deflection member 1041. For this arrangement, each of the rotation units 1045 and 1046 includes a fixed member 1045a (1046a) fixed to the rear race of the bottom of the deflection member 1041 and a rotation member 1045b (1046b) rotatably attached to a distal end of each fixed member 1045a (1046a).

As shown in FIGS. 28 and 29, the present laser radar apparatus 1000 is further provided with an annular guide passage 1047 fixedly arranged to pass the positions of the rotation units 1045 and 1046 by surrounding the rotating deflection mechanism 1040. This guide passage 1047 provides a rail portion guiding the distal end of each rotation unit 1045 (1046). While the rotation of the motor 1050, the rotation units 1045 and 1046 is rotated as well, during which time the guide passage 1047 enables the distal end of each rotation unit positionally to change in the direction of the central axis 1042b, that is, in the Y-axis direction. For realizing this, the guide passage 1047 has a unique guide path, which will now be described.

The guide passage 1047 has an annular trough portion as the guide path, and the trough portion has a box shape with one-end open when being viewed in section. The rotation members 1045b and 1046b of the rotation units 1045 and 1046 are inserted in the trough portion and guided along the guide plane as the deflection member 1041 is rotated. The rotation members 1045b and 1046b are rollers so that the rotation members can be held and rolled in the trough portion of the guide passage 1047.

As shown in FIG. 30, the trough portion of the guide passage 1047 is formed to continuously change in level in the direction of the central axis 1042a, that is, the Y-axis direction. Practically, the trough portion consists of first upward curved portions 1047b and second downward curved portions 1047c, which are arranged alternately to form, for example, a sine-curve path. Thus, this path consists of a gradually-rising path and a gradually-falling path, which come alternately. The displacements (levels) of rising and falling in the Y-axis direction are set to the same.

The rotation units 1045 and 1046 are opposed to each other with the central axis 1042a located therebetween, and inserted into the guide passage 1047. Hence, in consideration of this arrangement, the trough portion of the guide passage 1047 is produced such that each of the first upward curved portions 1047b is opposed to each of the second downward curved portions 1047c with the central axis 1042b located therebetween. Thus, whenever, of two rotation units 1045 and 1046, one rises, the other always falls.

The rotation units 1045 and 1046 and the guide passage 1047 serve as the direction changing means, so that during the rotation of the deflection member 1041 along the XZ plane in response to the rotation of the motor 1050, the distal ends of the rotation units 1045 and 1046 undulate at given cycles in the Y-axis direction along the central axis 1042a. This undulation of the rotation units 1045 and 1046 is converted to swinging (tilting up and down) motions of the deflection member 1041 in the Y-axis direction, giving relative positional changes to the incident laser beam L1, that is, relative changes in its incident direction. In the present embodiment, the undulation is set to cause the deflection member 1041 to tilt between two attitudes shown by a solid line and a dashed line in FIG. 28. As a result, the direction of the laser beam L1 emitting from the deflection member 1041 is changed, i.e., scanned in the Y-axis direction.

The motor 1050 is similar to that in the first embodiment except for the structure of the shaft member 1042. The control circuit 70 is also configured in the same way as that in first embodiment except for the components to be controlled and how to control them. The contents of the control have been explained above. The combination of the motor 1050 and the control circuit 70 functions as the drive means, and the control circuit 70 also functions as the control means.

In the present radar apparatus 1000, when the Y-axis directional positions of the rotation members 1045b and 1046b are the same, the deflection member 1041 takes an attitude shown by the solid line in FIG. 28. In this case, the laser beam L1 travels along the path shown by a solid line, while reflected light L2 returns along solid lines and enters the deflection member 1041. Meanwhile, the deflection member 1041 takes an attitude shown by the dashed line, when this member 1041 is rotated to another angular position in the XZ plane. This is caused due to the undulation path of the guide passage 1047 as described. Thus the laser beam L1 travels along a line L1' into the field outside the apparatus and reflected light L2' returns to the deflection member 1041 along dashed lines.

It is therefore possible that the present embodiment provide the identical or similar advantages to those explained already, which is a preferable three-dimensional detection of objects. In addition, because the rotation units 1045 and 1046 and the guide passage 1047 are combined as above, the relative position of the deflection member 1041 to the laser beam L1 can be changed. It is not necessary to adopt any particular actuator to swing or tilt the deflection member 1041. Thus the power of the motor 1050 can be used for both the rotation and the swing or tilt of the deflection member 1041. This helps to reduce production costs and to lower the apparatus weight.

The annular guide passage 1047 is adopted, in which the undulation path is formed, at least, over a part thereof. This undulation path makes the deflection member 1041 swing or tilt reliably. It is possible to arrange this annular guide passage 1047 so as not to interfere with the rotation of the deflection member 1041 in the apparatus. This arrangement can be made compact. The annular guide passage 1047 provides a stable support and a smooth guide of the rotation units.

(Modifications)

Figure 31:
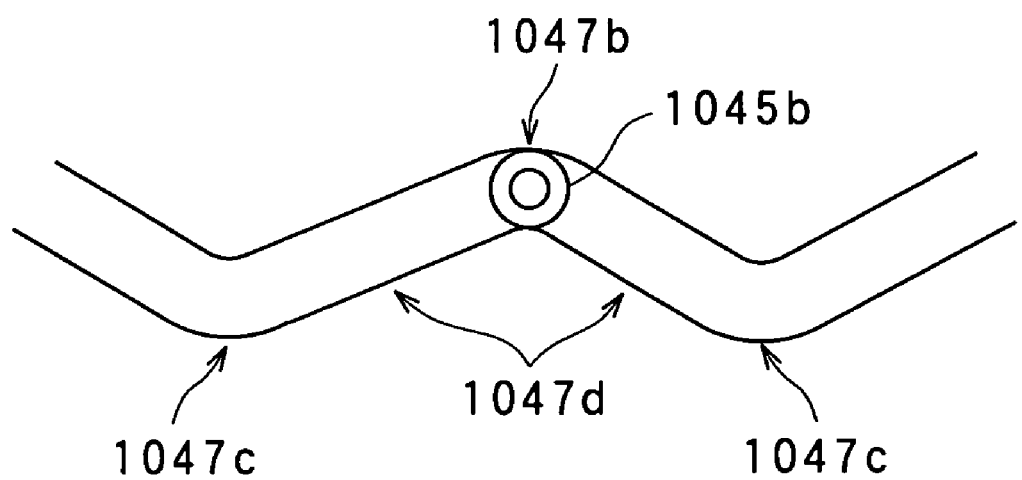
FIG. 31 explains a guide passage according to a modification of the eleventh embodiment.

The form of the guide passage 1047 is not limited to that described in FIG. 30. FIG. 31 show another example, in which there is formed straight segments 1047d each connecting adjacent curved portions 1047b and 1047d. This also provides an undulation path that changes in the Y-axis direction.

Figure 32:
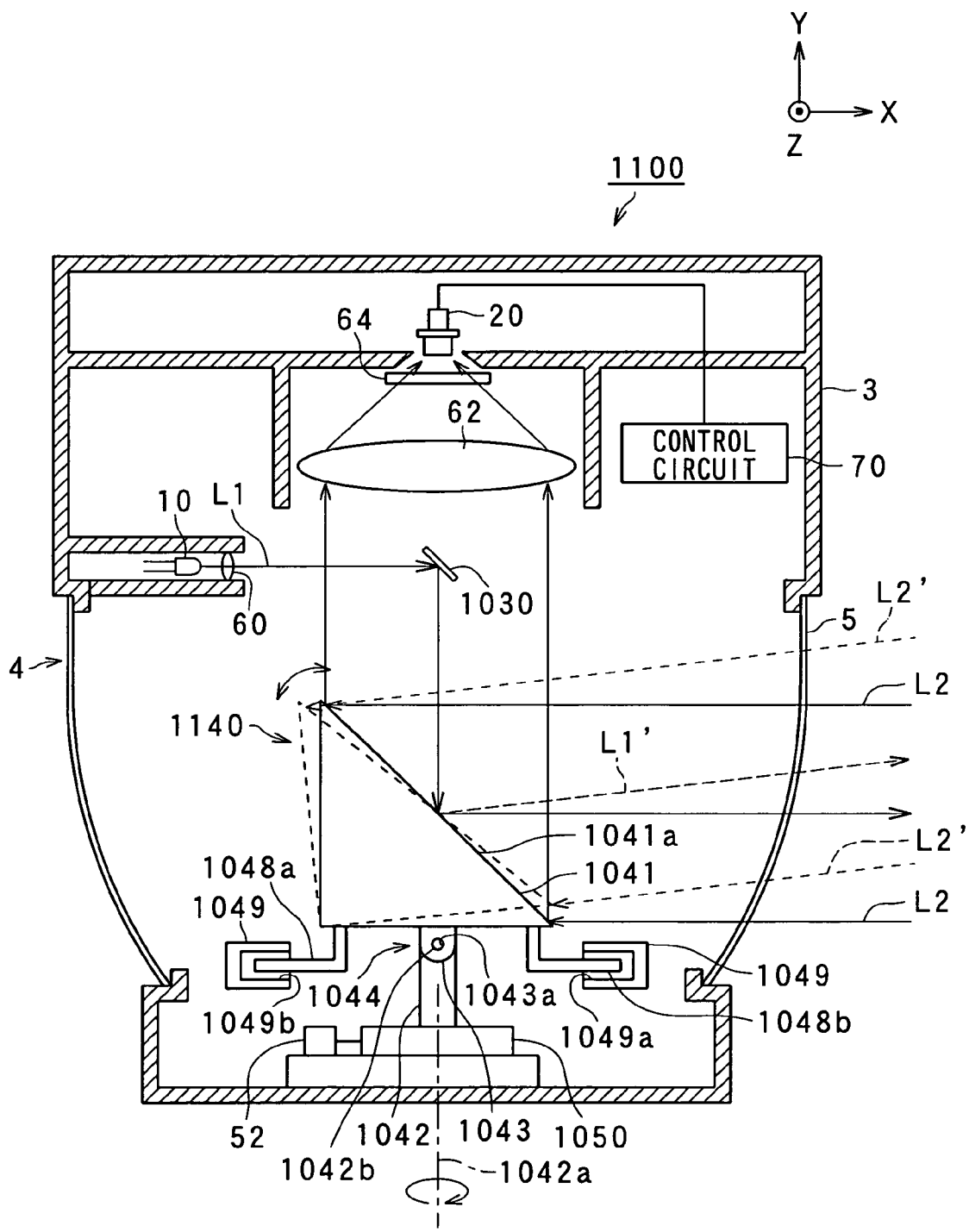
FIG. 32 is a schematic diagram outlining the configuration of a laser radar apparatus according to another modification of the eleventh embodiment.

The configuration shown in FIG. 28 may be replaced by that shown in FIG. 32. The laser radar apparatus 1100 shown in FIG. 32 differs from that in FIG. 28 in that there is provided a rotating deflection mechanism 1140. Practically, the foregoing rotation units 1045 and 1046 are replaced by other rotation units 1048a and 1048b and the trough width of the guide path is made to agree with the sizes of ends of the rotation units 1048a and 1048b. The remaining configurations are the same as those in FIG. 28.

In this configuration, no rotation member is employed by the rotation units 1048a and 1048b. That is, the rotation units 1048a and 1048b are just formed into an arm with no rotation member, unlike the ones shown in FIG. 28. The arm-like distal end is directly fit into the trough of a guide passage 1049. This guide passage 1049 is identical in the shape and sine-curve guide path to the foregoing guide passage 1047, like shown in FIG. 30A, except for the trough width.

Thus when the motor 1050 is driven to rotate, the deflection member 1041 and the rotation units 1048a and 1048b rotates together, whereby the distal ends of both units 1048a and 1048b slide along the inner walls (guide path) of the guide passage 1049. It is therefore possible to provide the same operations and advantage as those gained in the previous embodiment. The guide passage 1047 provides a smooth and stable, but undulated slide motion to the rotation units 1048a and 1048b, which gives the deflection member 1041 smooth and reliable swing (tilt) operations.

Twelfth Embodiment

Figure 33:
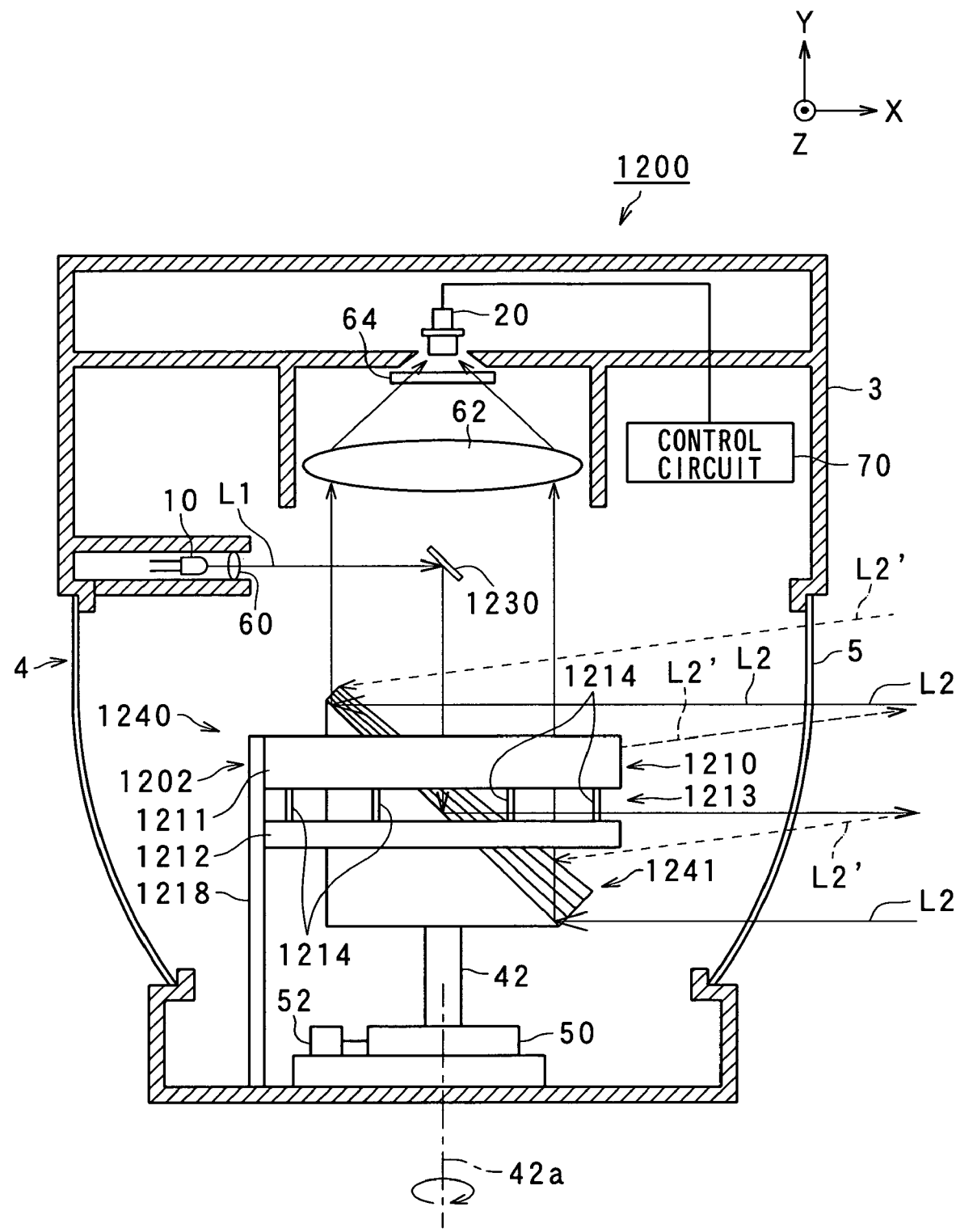
FIG. 33 is a schematic diagram outlining the configuration of a laser radar apparatus according to a twelfth embodiment of the present invention.
Figure 34:
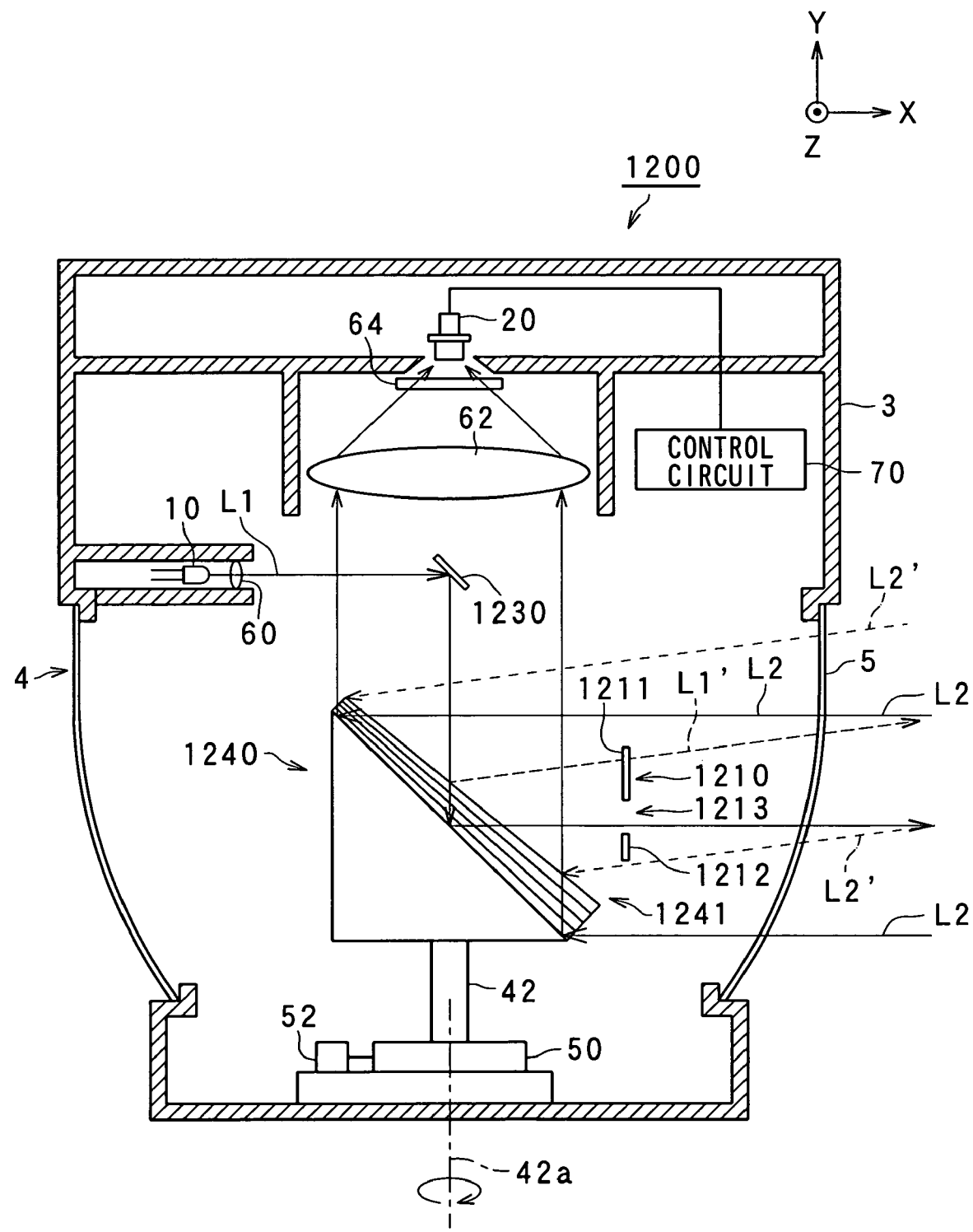
FIG. 34 explains the laser beam emission and the reflected light reception in the twelfth embodiment.
Figure 35:
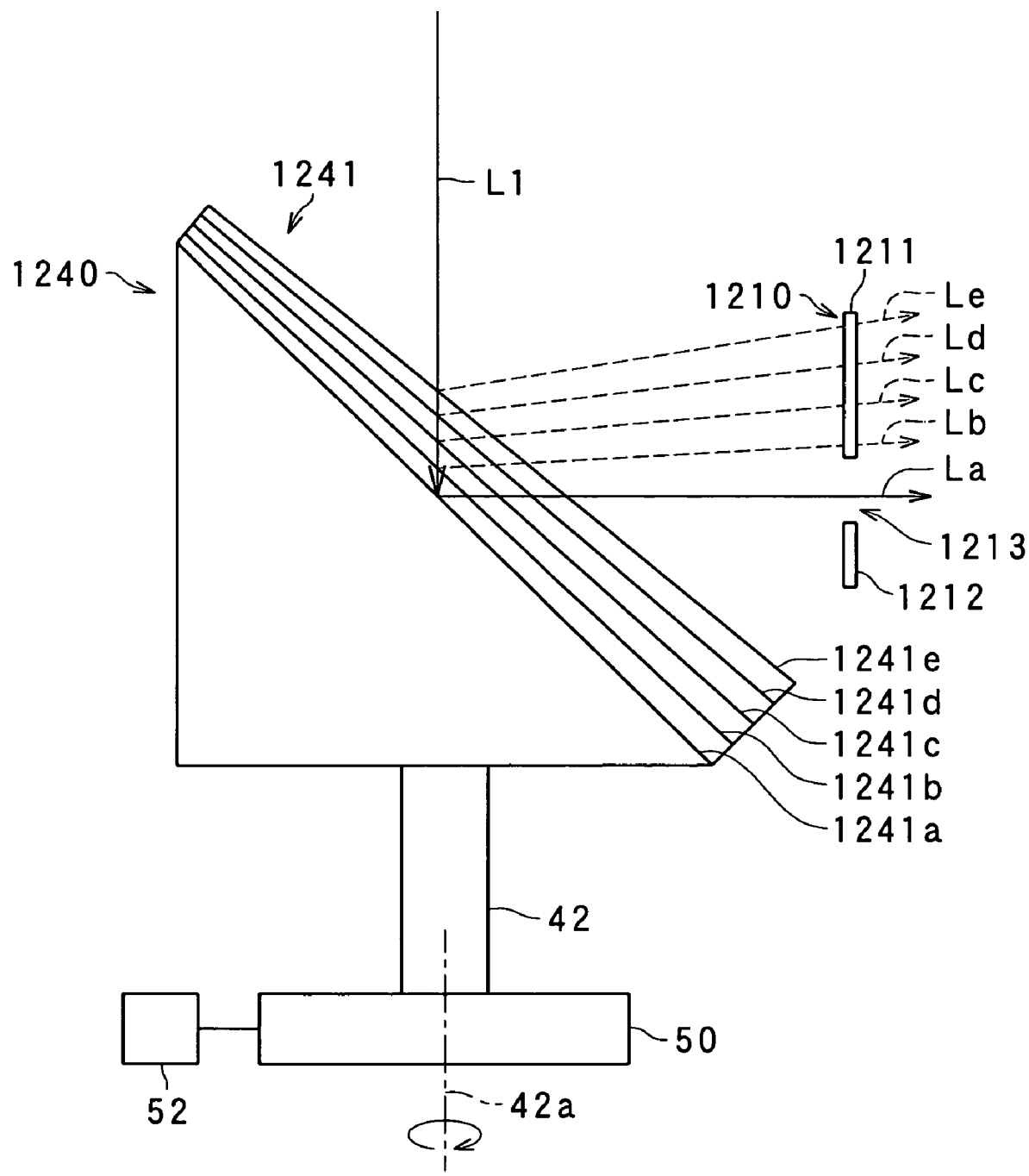
FIG. 35 explains the selection of the laser beam to be emitted toward a field to be observed.

Referring to FIGS. 33-35, a laser radar apparatus according to a twelfth embodiment of the present invention will now described.

FIG. 33 outlines the configuration of a laser radar apparatus 1200 according to the present embodiment. This configuration is different from that shown in the first embodiment in the rotating deflection means. The remaining parts are the same or similar as or to those in the first embodiment, which are omitted from explaining in detail.

The laser radar apparatus 1200 is provided with a rotating deflection mechanism 1240 to which the central axis 42a is given. The direction of this central axis 42a corresponds to the Y-axis, as in the first embodiment. This mechanism 1240 comprises a deflection member 1241 which is rotatable on the central axis 42a.

In addition to the laser diode 10 and the photodiode 20, the laser radar apparatus 1200 is further provided with a mirror 1230 to reflect the laser beam L1 from the laser diode 10 almost at the right angle. The reflected laser beam L1 enters a central part of the deflection member 1241. The rotating deflection mechanism 1240 includes the deflection member 1241 driven to rotate by the motor 50 so that the member 1241, that is, the mechanism 1240 is rotatable on the central axis 42a.

As shown in FIGS. 34 and 35, the deflection member 1241 is provided with a plurality of reflection layers 1241a-1241e laminated at the beam-incident position of the laser beam L1 from the mirror 1230. The lowest reflection layer 1241a is composed of a mirror and the remaining reflection layers 1241b-1241e are composed of a half-silvered mirror. Thus, the laser beam L1 reflected by the mirror 1230 is reflected by and transmitted through the remaining reflection layers 1241b-1241e other than the lowest reflection layer 1241a, and reflected by the lowest reflection layer 1241a. Additionally, as shown in FIG. 35, the respective reflection layers 1241a-1241e are set to have different reflecting directions for the laser beam L1. These different reflecting directions are realized by, for example, changing the thickness of each reflection layer so as to become thicker as advancing to its end.

The laser radar apparatus 1200 is further provided with a laser beam selector 1202 to select any from a plurality of reflected laser beams La-Le of different reflection angels produced by the plural reflection layers 1241a-1241e. This laser beam selector 1202 includes a light-shielding unit 1210 and a liner actuator 1218 linearly driving the light-shielding unit 1210. Driving the light-shielding unit 1210 by the linear actuator 1218 permits not only any of the reflected laser beams La-Le to be emitted toward the side of a filed to be observed for objects but also the remaining ones to be shut off. That is, the selector 1202 is able to selectively perform a switchover among the reflected laser beams La-Le so as to select a laser beam for use in the detection in the field. The laser beam selector 1202 exemplifies the laser beam selecting means.

The light-shielding unit 1210 is provided with a pair of annular light-shielding member 1211 and 1212 and connectors 1214. These shielding members 1211 and 1212 are located a given distance apart in the Y-axis direction along the central axis 42a and connected to each other by the connectors 1214. A slit 1213, which permits any of the reflected laser beams La-Le to pass therethrough, is thus formed between the shielding members 1211 and 1212 so as to surround the whole deflection member 1241.

The linear actuator 1218 exemplifies the displacement means and responds to a command from the control circuit 70 to displace the pair of annular light-shielding unit 1211 and 1211 as one unit. The laser beam selector 1202 responds to the drive of the linear actuator 1218 to displace the light-shielding unit 1210 by positionally changing the slit 1213.

Thus when the position of the slit 1213 is changed, the reflected laser beams La-Le can be selected to one for detecting objects, whereby the direction of the laser beam emitted from the deflection member for the detection can be changed (scanned) in the Y-axis direction. The example shown in FIG. 33 illustrates that a reflected laser beam La from the lowest reflection layer 1241a is selected. Meanwhile, the reflected light L2 from an object enters the deflection member 1241.

When the light-shielding unit 1210 is displaced to select the reflected laser beam Le from the reflection layer 1241e, the travel path of the laser beam L1 is formed as shown by L1'.

In this case, the return path of the reflected light L2 to the deflection member 1241 is shown by L2'.

The control circuit 70 is the same in its physical configuration as that explained in the first embodiment, but software programs for the above control can be installed in its memory in advance.

In the present embodiment, like the foregoing various embodiments, the laser beam can be emitted toward a field to be observed and scanned three-dimensionally for detection of objects in a simple, but effective and reliable manner. In particular, as the deflection means, a plurality of reflection layers are used to produce a plurality of laser beams of different reflection angles on the reflection on each layer. Any of the laser beams of different reflection angles is selected to solely be emitted toward the field in a controlled manner. Since the selection is made such that the selected laser beam is for scanning in the Y-axis direction in the field, with the result that the laser beam is scanned in the longitudinal (the Y-axis) direction. In addition, the deflection member 1241 is rotated along the XZ plane like the first embodiment. Accordingly, the three-dimensional detection for objects can be performed reliably.

Further, the laminated reflection layers except for the lowest one is composed of a half-silvered mirror, which provides a simple and reliable light-reflection/transmission optical system.

The pair of pair of annular light-shielding member 1211 and 121 are arranged to form the slit 1213. The paired members 1211 and 1212 are displaced as a unified unit in a controlled manner. Accordingly, the switchover among the reflected laser lights at the deflection member 1241 can be performed quickly and smoothly. Particularly, whatever the deflection member 1241 is at any rotation position along the XZ plane, the reflected laser lights can be selected smoothly from the deflection member 1241, providing a stable detection of objects around the apparatus.

Other Embodiments

In the forth embodiment in FIG. 5, the laser diode 10 and the photodiode 20 are arranged to be opposed to each other with the first deflection member 343 located therebetween along the central axis 342a. However, this is not a decisive list. For example, the laser diode 10 may be disposed to emit the laser beam to the first deflection member 343 from the same side as the side in which the photodiode 20 is disposed.

In the foregoing embodiments, on the optical path of the reflected light from the rotating deflection means to the optical detection means, the light-collecting means (lens) to collect the reflected light is disposed. Alternatively, this light-collecting means may be omitted from the path, while a relatively large aperture optical detector may be disposed instead.

The foregoing embodiments have adopted the optical selecting means (optical filter) disposed on the optical path of the reflected light from the rotating deflection means to the optical detection means. However, this optical selecting means may be removed from the path, if necessary.

In FIG. 4, the explanation of the structure for tiltably supporting the deflection member 241 has been simplified. By way of example the tilting mechanism shown in FIG. 14A can be applied as the tiltably supporting mechanism for the deflection member 241.

In the fifth embodiment shown in FIG. 6, a plurality of piezoelectric actuators other than four may be used as actuators for the deflection means. In addition, only one piezoelectric actuator may be used.

Furthermore, a modification for the eighth embodiment in FIG. 8 can be provided in the following.

Figure 36A:
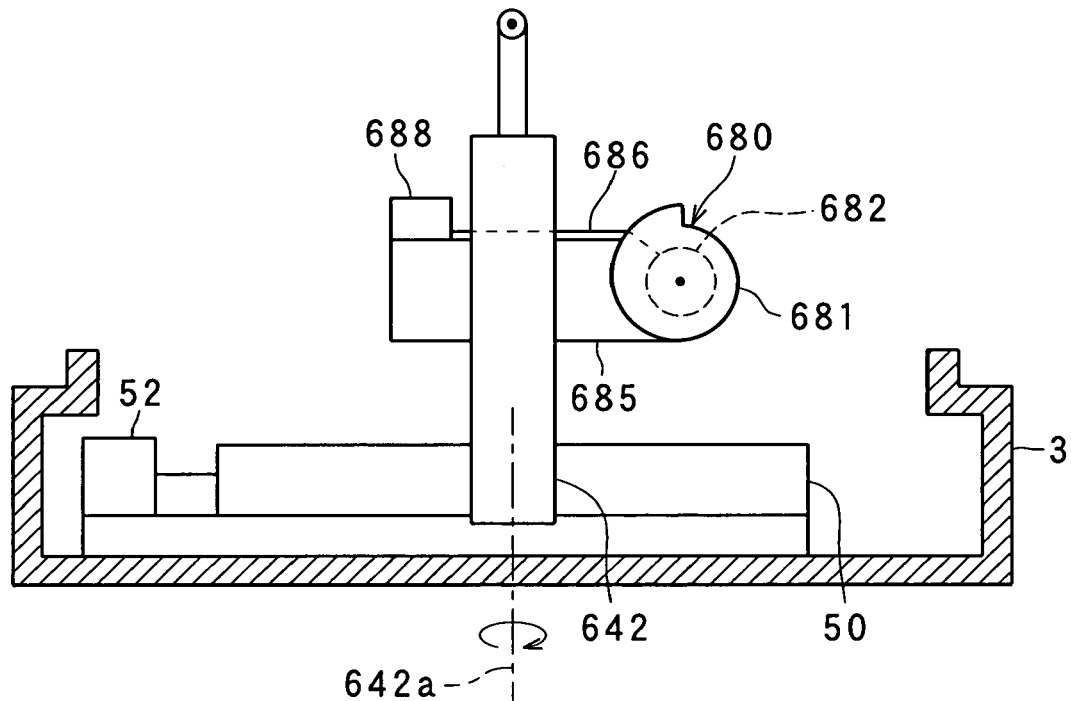
FIGS. 36A and 36B each show modifications of wiring of the power line.

This modification concerns the connection of the oscillation means (the cam mechanism 680 and motor 682) with the external power supply. In the eighth embodiment, the external power supply is designed not to rotate together with the deflection means. This is just an example, and may be modified into the following. That is, as shown in FIG. 36A, a battery powering the oscillation means is provided, which is rotatable as one unit with the deflection means. The configuration shown in FIG. 36A differs from the eight embodiment in only the powering structure for the oscillation means (the cam mechanism 680 and motor 682).

Practically, the power line 686, the frame 685, a battery 688 are arranged differently from those in the eighth embodiment. The battery 688 as well as the oscillation means (the cam mechanism 680 and motor 682) are designed to be rotatable together with the deflection member 641. The motor 682 and the battery 688 are mounted on the frame 685 attached to the shaft member 642. Further, the power line 686 are wired on and along the frame 685 from the battery 688 to the motor 682. The battery 688 is made up of either a primary battery such as a manganese dioxide battery or alkaline battery or a secondary battery such as a lithium-ion battery or a nickel battery.

Hence, employing this powering configuration eliminates the need or wiring the power line bridging the rotated and fixed component parts, thus simplifying the wiring structure and making it possible not use complex control for the powering, thus improving the powering configuration.

Figure 36B:
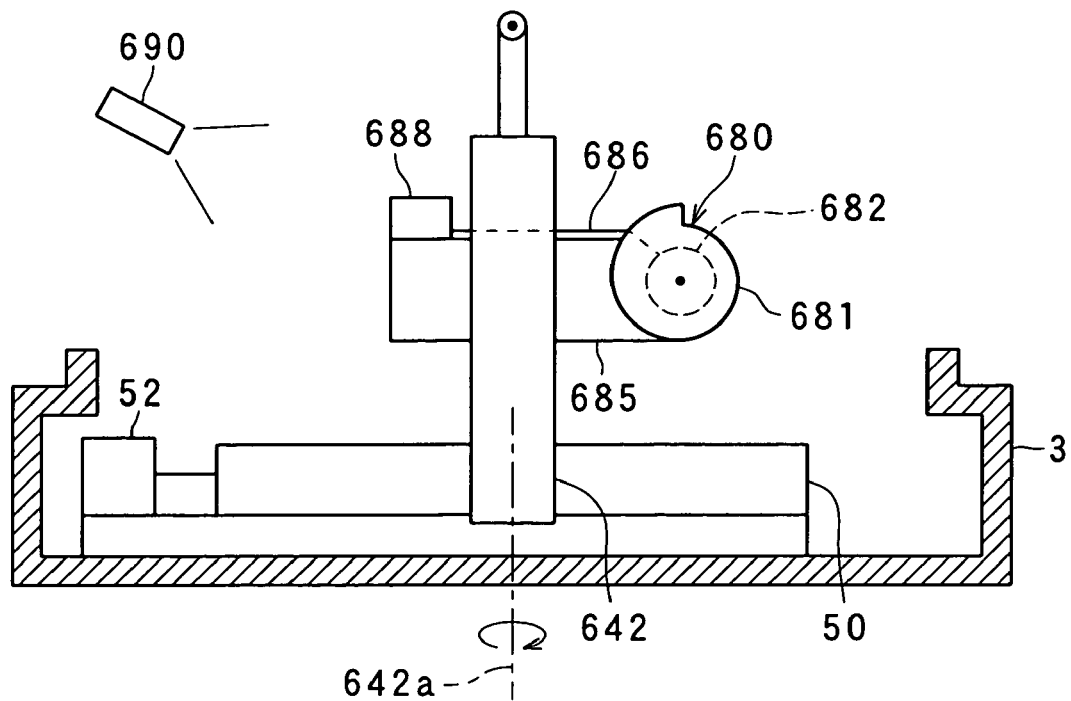

Incidentally, the foregoing modification can be modified further into the powering configuration shown in FIG. 36B.

As shown in FIG. 36B, the configuration shown in FIG. 19A is modified to have a light source 690 that emits light onto a solar cell 689 serving as the battery. Like the foregoing, the solar cell 689 is mounted on the frame 685. In addition, at a fixed position in the casing 3, the light source 690 is located fixedly to emit the light to the solar cell 689. The light source 690 is powered by an external power supply (e.g., commercial power supply) fixedly placed outside the apparatus. The light source 690 is for example an LED (light-emitting diode) or other lighting means.

Hence, it is possible to have the same advantages stated above with the modification in FIG. 36A. Additionally, to use the solar cell makes it possible to stably power the motors or others within the rotating structure for a long time.

The configurations stated in FIGS. 36A and 36B may be applied to the eighth embodiment shown in FIG. 17.

The laser radar apparatuses shown in the foregoing various embodiments and modifications provide a high availability when they are used as an area sensor or a safety sensor detecting obstacles in the surrounding.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A laser radar apparatus comprising:
a laser beam generator that generates a laser beam;
an optical detector that detects reflected light that has been reflected from a field to be observed;
a deflection member that has a surface deflecting the laser beam toward the field and deflection the reflected light toward the optical detector;
a support member that has a central axis, supports the deflection member, and is rotatable on the central axis;
a drive means that drives the support member so that the support member is rotated on the central axis;
changing means that changes an incidence direction of the laser beam onto the deflection member relatively to the surface of the deflection member so that the laser beam deflected from the deflection member is scanned in a direction along the central axis; and
control means that controls the changing means so as to allow the laser beam deflected from the deflection member to scan the field in the direction at all rotated positions of the support member.

2. The laser radar apparatus of claim 1, wherein
the changing means includes a light deflection means that deflects the laser beam from the laser beam generator toward the deflection member and that has an axis on which the light deflection means is swingable, and
the control means is a swing control means that controls a swing action of the light deflection means.

3. The laser radar apparatus of claim 2, wherein
the light deflection means comprises
a light deflector that deflects the laser beam,
a swing mechanism that swingably supports the light deflector, and
an actuator that drives the light deflector supported by the swing mechanism, and
the swing control means is adapted to control a state of the light deflector driven by the actuator.

4. The laser radar apparatus of claim 3, wherein
the actuator consists of one or more piezoelectric actuators that change a position of a specific portion of the deflection member, and
the swing control means is adapted to control movement of the piezoelectric actuator to control a spatial attitude of the deflector to the laser beam.

5. The laser radar apparatus of claim 3, wherein
the swing mechanism includes a holding member that holds the light deflector and a ball joint that links the light deflector and the holding member by using a spherical bearing stud and socket.

6. The laser radar apparatus of claim 2, wherein
the swing control means is adapted to change a swing control given to the light deflection means based on the rotated positions of the support member.

7. The laser radar apparatus of claim 2, wherein the deflection member is given a first deflection range in which the deflection member deflects the reflected light and the light deflection means is given a second deflection range in which the light deflection means deflects the laser beam, the first deflection range being greater than the second deflection range.

8. The laser radar apparatus of claim 1, wherein
the changing means comprises
a mirror unit equipped with a plurality of mirrors, and
a displacement mechanism that displaces the mirror unit so that the plurality of mirrors are arranged in turn at a laser-beam incidence position where the laser beam arrives from the laser beam generator, wherein
the mirrors of the mirror unit have reflection surfaces whose oblique angles are different from each other,
the mirror unit is arranged at the laser-beam incidence position by the displacement mechanism, and the control means is adapted to control the displacement mechanism so as to switch the mirrors to be located at the laser-beam incidence position, whereby a relative incidence direction of the laser beam to the deflection member is changed.

9. The laser radar apparatus of claim 8, wherein
the mirror unit which is rotatable on a given rotation axis thereof and which is formed such that the plurality of mirrors are located circularly around the given rotation axis and the oblique angles of the reflection surfaces of the respective mirrors are different from each other to the given rotation axis,
the displacement mechanism is a rotation mechanism that rotates the mirror unit on the given rotation axis, and
the control means is adapted to control rotation of the rotation mechanism so as to switch the mirrors to be located in turn at the laser-beam incidence position.

10. The laser radar apparatus of claim 9, wherein
the drive means is configured to rotate the deflection member every given angle, and
the control means is adapted to control the rotation of the rotation mechanism such that all the plurality of mirrors are located in turn at the laser-beam incidence position every time the deflection member is rotated every given angle, whereby the direction of the central axis is scanned at each rotated angle position of the deflection means.

11. The laser radar apparatus of claim 1, wherein the changing means is formed as output direction changing means that displaces the laser beam generator so as to change an output direction of the laser beam generated from the laser beam generator, and
the control means is formed as displacement control means that controls an amount of displacement of the laser beam generator.

12. The laser radar apparatus of claim 1, wherein
the changing means is formed as tilt means that tilts at least a portion of the deflection member onto which the laser beam comes, and
the control means is formed as tilt control means that tilts a tilt action of the tilt means.

13. The laser radar apparatus of claim 12, wherein
the deflection means includes a first deflection means that deflects the laser beam from the laser beam generator and second deflection means that deflects the reflected light from the field, and
the tilt means is adapted to tilt the first deflection member independently of the second deflection means.

14. The laser radar apparatus of claim 13, wherein
the second deflection member is given a deflection range in which the second deflection member deflects the reflected light and the first deflection member is given a deflection range in which the first deflection means deflects the laser beam, the deflection range given to the second deflection member being greater than the deflection range given to the first deflection member.

15. The laser radar apparatus of claim 12, wherein
the laser beam generator and the optical detector are arranged to allow the deflection member to be located therebetween in the central axis.

16. The laser radar apparatus of claim 12, wherein
the tilt means comprises
a tilt mechanism that tiltably supports the deflection means and
an oscillation means that oscillates a given part of the deflection member at which the deflection member is supported by the tilt mechanism, and
the tilt control means is adapted to control an oscillation of the given part of the deflection means which is oscillated by the oscillation means.

17. The laser radar apparatus of claim 16, further comprising
a limiting means that limits the given part of the deflection member from oscillating in excess of a given oscillation range.

18. The laser radar apparatus of claim 16, wherein
the oscillation means comprises
a cam mechanism that has a cam rotatable with touching the given part of the deflection means and making the cam rotate to provide the given part of the deflection member with a liner movement and
a cam-mechanism drive means that drives the cam mechanism, and
the tilt control means is adapted to control the cam-mechanism drive means to control the oscillation at the given part of the deflection means.

19. The laser radar apparatus of claim 16, wherein
the oscillation means comprises
a transmission member that transmits a force to the deflection means,
a reciprocating mechanism that reciprocates the transmission member, and
a reciprocating-member drive means that drives the reciprocating mechanism, and
the tilt control means is adapted to control the reciprocating-member drive means to control the oscillation at the given part of the deflection member.

20. The laser radar apparatus of claim 16, wherein
the oscillation means comprises
an extension member that composes a part to transmit a force to the deflection member and that is extendable and
an extension member drive means that extends and contracts the extension member, and
the tilt control means is adapted to control the extension member drive means to control the oscillation at the given part of the deflection member.

21. The laser radar apparatus of claim 20, wherein
the extension member is a piezoelectric actuator.

22. The laser radar apparatus of claim 20, wherein
the extension member is formed as a size-changeable member having an inner space in which a gas is charged and of which outer size is changeable depending on an amount of the gas to be charged, and
the extension member drive means is formed as a gas-amount adjustment means that adjusts the amount of the gas charged in the size-changeable member.

23. The laser radar apparatus of claim 16, wherein
the oscillation means is configured to be rotatable together with the deflection member as one unit and to be powered by an external power supply that is not rotated together with the deflection means,
the deflection member and the external power supply are mutually electrically connected by a power supply line, and
the drive means is adapted to drive the rotation of the deflection performing means so as to allow the deflection means to reciprocate within a predetermined rotation range.

24. The laser radar apparatus of claim 16, wherein
the oscillation means are configured to be rotatable together with the deflection member as a one unit and to be powered by a battery that is rotated together with the deflection means.

25. The laser radar apparatus of claim 24, wherein
the battery is a solar battery and
the laser radar apparatus comprises a light source that emits light to the solar battery in reply to the power supply from the external power supply that is not rotated together with the deflection member, the light source being located at a position which is not rotated together with the deflection member.

26. The laser radar apparatus of claim 16, wherein
the deflection member is configured to be rotatable independently of the oscillation means and
the oscillation means is configured to make the deflection member oscillate at a given position in the apparatus.

27. The laser radar apparatus of claim 26, wherein
the deflection performing member comprises
a cylindrical shaft member which is cylindrical to have a cylindrical bore and driven by the drive means and
a support base which is arranged on one end side of the cylindrical shaft member so as to be rotatable together with the cylindrical shaft member and which supports the deflection member so as to rotate on a position shifted from the central axis, and
the oscillation means is arranged in a cylindrical bore of the cylindrical shaft member and configured to press the deflection means.

28. The laser radar apparatus of claim 26, wherein
the deflection performing means comprises
a shaft member driven by the drive means and
a swing member having a substantially circular outer edge portion, being formed to rotate together with the deflection member, and being swingable relatively to the shaft member, and
the oscillation means is formed as an edge oscillation means for oscillating the edge of the swing member at the given position in the apparatus.

29. The laser radar apparatus of claim 28, wherein
the edge oscillation means comprises
a first oscillation means that oscillates the edge of the swing member at a first position in the apparatus and
a second oscillation means that oscillates the edge of the swing member at a second position in the apparatus, the second position being different from the first position, and the first and second positions serving as the given position in the apparatus.

30. The laser radar apparatus of claim 29, wherein
the tilt control means is adapted to enable at least the second oscillation means to oscillate when the deflection member are at a given rotation position and to enable at least the first oscillation means to oscillate when the deflection means is at the rotation positions other than the given rotation position.

31. The laser radar apparatus of claim 1, wherein
the support means is configured to tiltably support the deflection member, and
the changing means comprises
a rotating portion that is rotatable together with the deflection member, and
a guide means that guides the rotating portion so that part of the rotating portion positionally changes toward the central axis during a rotation of the rotating portion, by deciding part of a guide plane along which the rotating portion rotates, whereby the positional change of the part of the rotating portion allows both the rotating portion and the deflection member to be swung to change a relative position of the deflection member to the laser beam when the deflection member is driven to rotate by the drive means.

32. The laser radar apparatus of claim 31, wherein
the rotating portion has a base end oriented to the deflection member and is elongated from the base end,
the guide means includes an annular guide passage arranged to encircle the rotating portion and formed to guide a distal end of the rotating portion, and
the guide passage is formed such that a position of at least part of the guide passage in a direction of the central axis is changed.

33. The laser radar apparatus of claim 32, wherein
the rotating portion comprises
a fixed member fixed to the deflection means and
a rotation member rotatably attached to the fixed member, and
the guide passage is formed to guide the rotation member, wherein
the rotation member is formed to be supported on a wall surface of the guide passage and is formed to roll along the wall surface when the rotation member is guided by the guide passage.

34. The laser radar apparatus of claim 33, wherein
the guide passage comprises a first curved portion convexed toward a first direction along the central axis and a second curved portion convexed toward a second direction along the central axis, the second direction being opposite to the first direction, the first and second curved portions being arranged alternately along the guide passage.

35. The laser radar apparatus of claim 1, wherein
the direction changing means includes means for changing an incidence direction of the laser beam to the deflection means.

36. The laser radar apparatus of claim 1, wherein
the changing means includes means for changing a deflection angle of the deflection member, the laser beam being deflected from the deflection member by the deflection angle.

37. The laser radar apparatus of claim 1, wherein
a light collecting means that collects the reflected light on an optical path of the reflected light between the deflection member and the optical detector.

38. The laser radar apparatus of claim 1, wherein
a light selecting means that selected the reflected light by enabling the reflected light to be transmitted therethrough and shutting off light other than the reflected light, the light selecting means being disposed on an optical path of the reflected light between the deflection member and the optical detector.

39. A laser radar apparatus comprising:
a laser beam generator that generates a laser beam;
an optical detector that detects reflected light that has been reflected by an object in a field to be observed;
a deflection member that has a surface deflecting the laser beam toward the field and deflecting the reflected light toward the optical detector; a support member that has a central axis, supports the deflection member, and is rotatable on the central axis; and
a drive means that drives the support member to rotate so that the support member is rotated on the given central axis, wherein
the deflection means comprise
a plurality of reflection layers laminated on one another at an incident position of the laser beam and produced to reflect the laser beam at different directions, wherein, of the reflection layers, only reflection layers other than a lowest reflection layer performs the reflection and transmission of the laser beam, a laser beam selecting means that selects only a one laser beam from laser beams reflected by the plurality of reflection layers, the selected one laser beam being emitted into the field for detection of an object, and a control means that controls a selection carried out by the laser beam selecting means so that the selected laser beam is scanned in a direction of the central axis such that the laser beam is deflected from the deflection member to scan the field in the direction at all rotated positions of the support member.

40. The laser radar apparatus of claim 39, wherein the reflection layers other than the lowest reflection layer are formed as half-silvered mirrors.

41. The laser radar apparatus of claim 39, wherein the laser beam selecting means comprises a pair of annular light-shielding members arranged around the deflection member to be located along the direction of the central axis with a given space apart from each other so as to produce a slit therebetween, and a displacement means that displaces the pair of annular light-shielding members together, wherein the control means includes means for controlling a displacement carried out by the displacement means.

42. The laser radar apparatus of claim 39, wherein a light collecting means that collects the reflected light on an optical path of the reflected light between the deflection performing member and the optical detector.

43. The laser radar apparatus of claim 39, comprising a light selecting means that selected the reflected light by enabling the reflected light to be transmitted therethrough and shutting off light other than the reflected light, the light selecting means being disposed on an optical path of the reflected light between the deflection member and the optical detector.

* * * * *